United States Patent
Sahashi et al.

(10) Patent No.: US 6,497,515 B1
(45) Date of Patent: Dec. 24, 2002

(54) BEARING APPARATUS FOR WHEEL

(75) Inventors: Koji Sahashi, Shizuoka-ken (JP);
Kazuhiko Hozumi, Shizuoka-ken (JP);
Keisuke Sone, Shizuoka-ken (JP);
Masahiro Ozawa, Shizuoka-ken (JP);
Hisashi Ohtsuki, Shizuoka-ken (JP);
Syougo Suzuki, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/591,484

(22) Filed: Jun. 12, 2000

(30) Foreign Application Priority Data

Jun. 18, 1999 (JP) .......................... 11-172866
Jul. 6, 1999 (JP) .......................... 11-192154
Jul. 6, 1999 (JP) .......................... 11-192155

(51) Int. Cl.$^7$ .......................... F16C 13/04; F16C 19/08; F16C 43/08
(52) U.S. Cl. .................. 384/544; 384/589; 464/178; 29/898.062
(58) Field of Search ................ 384/544, 589, 384/504; 301/105.1; 464/178, 906; 29/898.061, 898.062, 898.064, 898.07, 724

(56) References Cited

U.S. PATENT DOCUMENTS

| | | | | |
|---|---|---|---|---|
| 3,583,511 A | * | 6/1971 | Asberg .................. 384/544 X |
| 4,571,099 A | * | 2/1986 | Balken et al. .............. 384/513 |
| 4,835,829 A | * | 6/1989 | Welschof et al. .... 301/105.1 X |
| 4,887,917 A | * | 12/1989 | Troster et al. .............. 384/543 |
| 5,822,859 A | * | 10/1998 | Kessen et al. ......... 29/898.061 |
| 5,911,458 A | * | 6/1999 | Bywalez et al. ....... 29/898.062 |
| 5,975,765 A | * | 11/1999 | Kawamura .................. 384/537 |
| 6,280,096 B1 | * | 8/2001 | Miyazaki et al. ........... 384/544 |

* cited by examiner

Primary Examiner—Thomas R. Hannon
(74) Attorney, Agent, or Firm—Arent Fox Kintner Plotkin & Kahn, PLLC

(57) ABSTRACT

In a bearing apparatus for a wheel in which a hub, a constant velocity universal joint and double rows of bearings are united and one inner raceway of double rows of inner raceways, of the double rows of bearings is integrally formed with an outer joint member of the constant velocity universal joint, a stem portion of the outer joint member is fitted to the hub, an unevenness portion is formed on an inner peripheral surface of the hub or an outer peripheral surface of the stem portion or both thereof, and the hub and the outer joint member are plastically connected by expanding the hollow stem portion from an inner diameter side to an outer diameter side by caulking. Accordingly, the fitted portions of the hub and the outer joint member are prevented from being loosened.

24 Claims, 44 Drawing Sheets

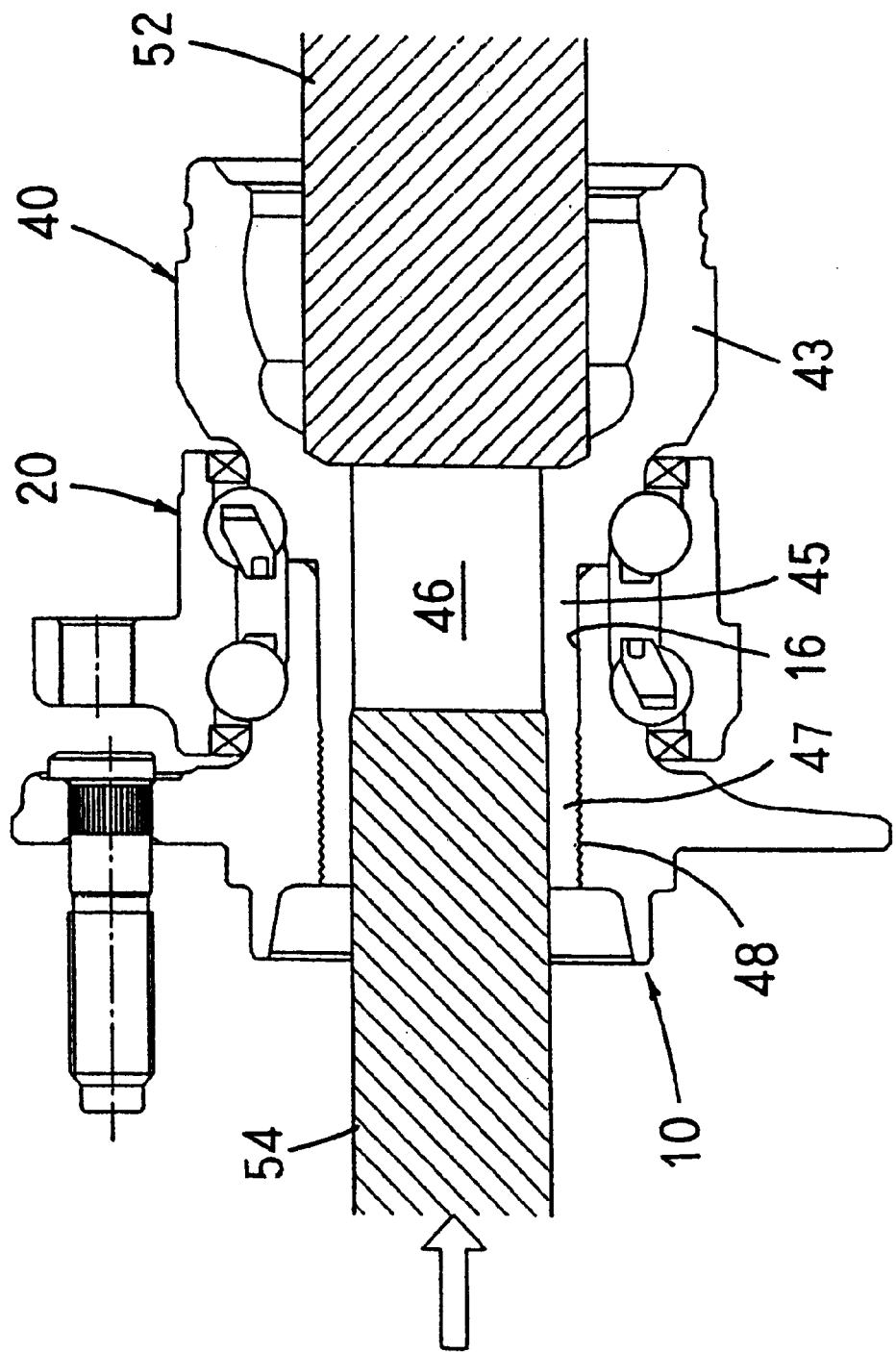

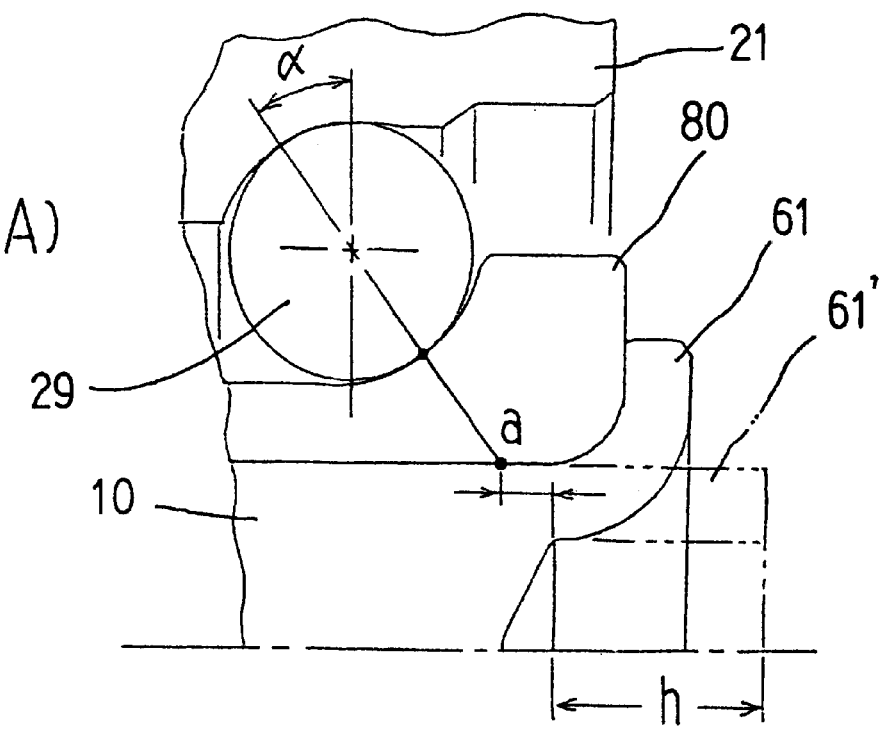
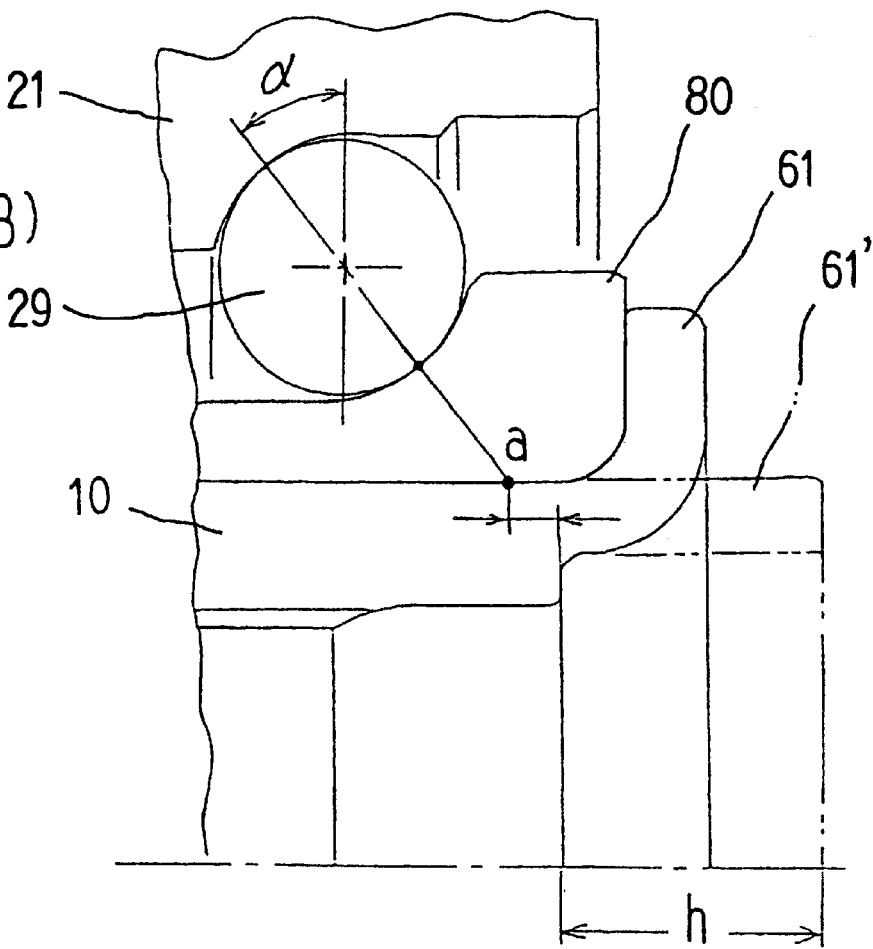

BEARING APPARATUS FOR WHEEL

BACKGROUND OF THE INVENTION

The present invention relates to a bearing apparatus for a wheel for supporting a wheel of an automobile, and more particularly to a bearing apparatus for a wheel of a type that a hub, an outer joint member of a constant velocity universal joint and double rows of wheel bearings are united and at least one of the double rows of inner raceways is integrally formed in the outer joint member, or of a type that one of the inner raceways is directly formed in the hub and another of the inner raceways is formed in an inner race fitted to the hub.

Driving wheels of the automobile such as rear wheels of an FR vehicle, front wheels of an FF vehicle and all wheels of a 4WD vehicle are supported to a suspension apparatus by a bearing apparatus for wheels. The bearing apparatus mentioned above is structured, as shown in FIG. 43, such that a hub 10, a bearing 20 and a constant velocity universal joint 30 are united, one inner raceway 12 of double rows of inner raceways is formed in the hub 10, and another inner raceway 42 is formed in an outer joint member 40 of the constant velocity universal joint 30.

The hub 10 has a flange 14 for supporting the wheel, and the inner raceway 12 is formed on an outer peripheral surface close to the flange 14. The outer joint member 40 of the constant velocity universal joint 30 is constituted by a bowl-shaped mouth portion 43 and a solid stem portion 45, and is serration fitted to the hub 10 at the stem portion 45 and a shoulder surface 44 thereof is brought into contact with an end surface of the hub 10. The inner raceway 42 is formed on an outer peripheral surface close to the stem portion 45 in the mouth portion 43 of the outer joint member 40. Double rows of outer raceways 22 opposing to the inner raceways 12, 42 are formed on an inner peripheral surface of an outer member 21 (hereinafter, refer to as an outer race) of the bearing 20. Rolling elements 29 are assembled between the inner raceways 12, 42 and the outer raceways 22.

As shown by a reference numeral 45', an axial end of the stem portion 45 protruding from the hub 10 is caulked, thereby connecting between the hub 10 and the stem portion 45, and the outer race 21 is fixed to the suspension apparatus by a flange 24 formed on the outer peripheral surface of the outer race 21, whereby the wheel is fixed to the flange 14 of the hub 10.

In the bearing apparatus mentioned above, a torque from an engine is transmitted to the hub 10 via the constant velocity universal joint 30 so as to rotate the wheel. Accordingly, it is necessary that the outer joint member 40 and the hub 10 are connected at a high reliability. However, since a great moment load is applied to the bearing portion particularly when the automobile turns, there is a disadvantage that the caulked portion is loosened in the case of caulking the axial end of the stem portion 45 of the outer joint member 40.

The bearing apparatus mentioned above is that one inner raceway 42 of the double rows of inner raceways 12, 42 is integrally formed with the outer joint member 40, however, as a bearing apparatus having another construction, there is a bearing apparatus structured such that one inner raceway is directly formed in the hub and another inner raceway is formed in an inner race fitted to the hub as an independent element from the hub.

FIGS. 44A and 44B show a representative embodiment of the bearing apparatus, in which FIG. 44A shows the bearing apparatus for a driving wheel and FIG. 44B shows the bearing apparatus for a driven wheel. Since a basic structure is common between the bearing apparatus for the driving wheel and the bearing apparatus for the driven wheel, a brief description will be given of a construction of the bearing apparatus for the driven wheel in accordance with FIG. 44A. The bearing apparatus is structured such that the hub 10, an inner race 80, the outer race 21, the double rows of rolling elements 29 and the constant velocity universal joint 30 are united. One inner raceway 12 of the double rows of inner raceways 12, 42 is directly formed in the hub 10 and another inner raceway 42 is formed in the inner race 80 fitted to the hub 10 as an independent element from the hub 10.

The hub 10 is structured such that the inner raceway 12 is formed in the outer peripheral portion and the flange 14 for supporting the wheel is formed in the end portion close to an outboard side. In this case, a side close to an outer side of the vehicle in a state of being assembled in the vehicle is called as an outboard side (a left side in the drawing) and a side close to a center portion of the vehicle is called as an inboard side (a right side in the drawing). A small diameter step portion 59 having a reduced outer size is formed in the inboard side end portion of the hub 10, and the inner race 80 independent from the hub 10 and having the inner raceway 42 formed on the outer peripheral surface is fitted to the small diameter step portion 59. Double rows of outer raceways 22 opposing to the inner raceways 12, 42 are formed on the inner peripheral surface of the outer race 21. The rolling elements 29 are interposed to be freely rotatable between the inner raceways 12, 42 and the outer raceways 22.

The outer race 21 is fixed to the suspension apparatus by the flange 24 (in FIG. 44, only a part thereof appears) formed on the outer peripheral surface of the outer race 21, whereby the wheel is fixed to the flange 14 of the hub 10. The stem portion 45 of the outer joint member 40 is serration fitted to a serration hole 63 of the hub 10, thereby transmitting a rotational drive force to the wheel fixed to the hub 10. A nut 69 is screwed to a male screw portion 67 at the front end portion of the stem portion 45, thereby connecting the bearing 20 and the constant velocity universal joint 30.

This kind of bearing apparatus is normally used by applying a pre-load to the bearing 20, and an accurate pre-load control is performed at a time of assembling. However, since the inner raceways 12, 42 are distributed to the hub 10 and the inner race 80, a change of a positional relation in an axial direction between the hub 10 and the inner race 80 results in a change of a size between the inner raceway 12 and the inner raceway 42, so that the bearing clearance changes and causes a pre-load omission. Accordingly, it is necessary that the hub 10 and the inner race 80 are connected to each other at a high reliability.

However, since a great moment load is applied to the bearing portion particularly when the automobile turns, there is a disadvantage that the caulked portion is loosened due to a spring back of the caulked portion or the other reasons in the case of caulking the axial end of the small diameter step portion 59 in the conventional hub 10. Further, the hub 10 a nd the inner race 80 has a relation pressure fitting with a interference, however, no specific device has been conventionally provided so as to prevent a relative rotation. Accordingly, when the relative rotation, that is, a creep is generated due to some reason, there is generated a problem that a damage is generated on the fitting surface between the hub 10 and the inner race 80, a seizure is generated and a interference is increased, whereby a service life is reduced.

SUMMARY OF THE INVENTION

A first object of the present invention is to prevent the hub and the constant velocity universal joint from being loosened. To achieve the foregoing object, the invention provides a bearing apparatus for a wheel which comprises a hub, a constant velocity universal joint and a bearing, these elements being united and at least one of double rows of inner raceways of the bearing being integrally formed with an outer joint member of the constant velocity universal joint, wherein the hub and the outer joint member are fitted to each other, and the fitted portion is at least partly expanded or contracted by caulking.

Embodiments for fitting between the hub and the outer joint member include a case of fitting a small diameter cylinder portion of the hub to a through hole of the outer joint member and a case of fitting a stem portion of the outer joint member in which at least an axial end portion is formed in a hollow cylindrical shape to a through hole of the hub.

The caulking operation by expanding the inner fitting member or contracting the outer fitting member can be performed by a hydroforming in addition to a press formation. For example, the caulking operation is performed by expanding the stem portion of the outer joint member to an outer diameter side from an inner diameter side. Otherwise, the caulking operation may be performed by contracting the hub to the inner diameter side from the outer diameter side.

The invention provides a bearing apparatus for a wheel wherein an uneven portion is formed in any one or both of the fitted surface of the hub and the fitted surface of the outer joint member.

As a result of the caulking operation due to the expansion of the inner fitting member or the contraction of the outer fitting member, the uneven portion on one fitted surface eats into another fitted surface so as to generate a plastic deformation, so that a firm connection can be achieved and a loosening can be prevented. As a concrete embodiment of the uneven portion, for example, there can be listed up a spiral shape such as a screw, a double-cut knurled shape, a serration or spline shape (hereinafter, the serration or spline is totally called as a serration) or the like.

The uneven portion mentioned above, a work hardening is generated due to an uneven formation, however, it is possible to further apply a hardening treatment to the uneven portion due to a heat treatment. Accordingly, the uneven portion is hard to be crushed and firmly eats into the fitted surface in an opposite side, so that a firm plastic connection can be achieved.

The hub and the stem portion can be securely connected by welding both elements in the end portion in an axial direction of the fitted portion so that it is possible to more securely prevent the loosening. One or two or more welding points may be dispersed in a circumferential direction in addition to welding all the periphery.

The invention provides a bearing apparatus for a wheel wherein a taper angle that a diameter is increased in the axial end side is given to the fitted surface of the hub or the fitted surface of the outer joint member. Since the diameter of the axial end side of the fitted surface is increased, a come-out prevention operation can be achieved.

The invention provides a bearing apparatus for a wheel wherein a projection is provided on the fitted surface of the hub or the fitted surface of the outer joint member. For example, an annular projection continuously extending all around the periphery can be exemplified, however, the projection is not always to be continuously provided in a circumferential direction. Further, a spirally extending projection may be employed.

As an embodiment of forming the unevenness on both of the fitted surfaces, there can be exemplified a case that a serration hole of the hub and a serration shaft of the stem portion in the outer joint member are fitted. The invention provides a bearing apparatus for a wheel wherein a cross sectional shape of the fitted surfaces of the hub and the outer joint member fitted to each other is formed in a polygonal shape or a serration shape.

In the case of fitting the stem portion of the outer joint member to the through hole of the hub, the structure may be made such that a clip for come-out prevention is attached to an end portion of the stem portion protruding from the hub. Further, the structure may be made such that the axial end portion of the stem portion is caulked to the end surface of the hub so as to prevent coming out.

The invention provides a bearing apparatus for a wheel wherein a reinforcing member is pressure fitted into the through hole of the stem portion. Since a rigidity of the hollow stem portion, particularly of the caulked portion is increased, the loosening can be prevented. The reinforcing member may be formed in a cylindrical shape, a ring shape or a solid short shaft shape. In the case of a cylindrical shape with a bottom or a solid member, it is preferable to provide a small hole communicating with a bottom of the mouth portion. Otherwise, in order to compensate for a reduction of rigidity due to a hollow construction, a solid portion may be provided in a part of the stem portion, for example, an area close to the mouth portion. In this case, it is desirable to provided a ventilating small hole communicating with the bottom of the mouth.

It is possible to obtain an effect of radiating a heat generated by a heat generation of the inner race portion and a heat generation of the mouth portion of the constant velocity universal joint to the outside since the through hole communicating with the bottom of the mouth portion is provided in the stem portion so as to make the stem portion hollow. In this case, in order to prevent a grease charged into the mouth portion from leaking, an end plate is attached to the bottom of the mouth portion. It is desirable to provide a ventilating small hole in the end plate.

The invention provides a bearing apparatus for a wheel wherein a cooling fin member is attached within the stem portion. Since a radiating effect can be further improved by attaching the cooling fin member to the hollow portion, it is very useful for improving a durability of the bearing apparatus for the wheel.

The invention provides a bearing apparatus for a wheel wherein the hub and the outer joint member are serration fitted at an axial position which is different from the caulked portion to be expanded or contracted. In this case, a torque transmission between the hub and the outer joint member is performed by the serration portion and a come-out prevention is applied to the caulked portion.

The invention provides a bearing apparatus for a wheel wherein an area closer to the axial end side than the serration portion of the stem portion in the outer joint member is expanded by caulking. The hub and the outer joint member are fixed in an axial direction by the caulked portion and a come-out prevention is performed.

The invention provides a bearing apparatus for a wheel wherein the caulked portion is partly extended to the serration portion. The caulked portion can be utilized as a play insert for the serration by caulking so that the caulked portion is extended to the serration end portion in the hub side.

The invention provides a bearing apparatus for a wheel wherein the serration portion of the stem portion is expanded from an inner diameter side by caulking. Accordingly, any play in the serration portion is lost, and a loosening prevention effect can be further increased.

The invention provides a bearing apparatus for a wheel wherein a portion changing to the caulked portion from the serration portion of the stem portion is gradually expanded.

The invention provides a bearing apparatus for a wheel wherein a spacer ring is interposed between the fitted surfaces of the stem portion and the hub. It is possible to apply an unevenness formation on an outer peripheral surface of the stem portion, an inner peripheral surface of the spacer ring or both of these. Further, an unevenness formation may be applied to an outer peripheral surface of the spacer ring, an inner peripheral surface of the hub or both of these surfaces.

The invention provides a bearing apparatus for a wheel wherein an annular groove is provided on an inner peripheral surface of the hub and the swelled portion of the stem portion in the outer joint member is eaten into the annular groove. Since the swelled portion and the annular groove are engaged and a rigidity of the caulked portion becomes higher than that of a simple cylindrical shape due to the swelled portion, a more secure come-out prevention can be achieved.

A second object of the present invention is to prevent the hub and the inner race from being loosened. To achieve the foregoing object, the invention provides a bearing apparatus for a wheel which comprises an outer race having a flange for mounting to a vehicle body and double rows of outer raceways, a hub having an inner raceway opposing to one of the double rows of outer raceways of the outer race and a wheel mounting flange, an inner race having an inner raceway opposing to another of the double rows of outer raceways of the outer race and fitted to the hub, double rows of balls interposed between the outer raceways of the outer race and the inner raceways of the hub and the inner race, wherein an uneven portion is formed on any one of fitted surfaces of the hub and the inner race or both of them and both of the hub and the inner race are plastically connected by expanding the fitted portions or contracting the fitted portions. Since a connection strength can be increased due to the plastic connection in comparison with the conventional caulking operation, a problem that the hub and the inner race are loosened can be solved and a preload omission can be prevented.

Embodiments for fitting between the hub and the inner race include a case that the hub corresponds to an inner fitting member and the inner race corresponds to an outer fitting member and a case that the inner race corresponds to the inner fitting member and the hub corresponds to the outer fitting member.

In the case that a small diameter cylinder portion is formed in one end of the hub and the inner race is fitted to an outer peripheral surface of the small diameter cylinder portion, the uneven portion is formed on fitted surface of the inner fitting member, that is, the outer peripheral surface of the small diameter cylinder portion of the hub, the fitted surface of the outer fitting member, that is, the inner peripheral surface of the inner race or both thereof.

In the case that a small diameter cylinder portion is formed in one end of the inner race and the hub is fitted to an outer peripheral surface of the small diameter cylinder portion, the uneven portion is formed on fitted surface of the inner fitting member, that is, the outer peripheral surface of the small diameter cylinder portion of the inner race, the fitted surface of the outer fitting member, that is, the inner peripheral surface of the hub or both thereof.

As embodiments of the uneven portion formed on the fitted surface, there can be exemplified a spiral shape such as a screw, a double-cut knurled shape, a serration or the like. Then, the uneven portion on one fitted surface eats into another fitted surface by expanding or contracting the fitted portion, whereby the hub and the inner race are plastically connected. After fitting the hub and the inner race, the fitted portion of the inner fitting member is expanded or the fitted portion of the outer fitting member is contracted.

In the case of fitting the inner race to the outer peripheral surface of the small diameter cylinder portion of the hub, the fitted portion of the small diameter cylinder portion of the hub is expanded or the fitted portion of the inner race is contracted. In the case of fitting the hub to the outer peripheral surface of the small diameter cylinder portion of the inner race, the fitted portion of the small diameter portion of the inner race is expanded or the fitted portion of the hub is contracted.

The invention provides a bearing apparatus for a wheel, wherein the inner fitting member has an axial through hole. A through hole extending all along the axial length is provided in the hub when the hub is the inner fitting member, and a through hole extending all along the axial length is provided in the inner race when the inner race is the inner fitting member. According to the structure mentioned above, since the whole of the bearing apparatus has a hollow structure, a heat radiating effect can be increased and a durability can be improved by restricting an amount of temperature increase in the bearing portion.

The invention provides a bearing apparatus for a wheel, wherein hardening treatment by heat treatment is applied to the caulked portion between the hub and the inner race. The uneven portion has a higher hardness than the other portions due to a work hardening caused by the unevenness formation, however, since an elastic deformation after the caulking operation according to the expansion or the contraction is reduced by applying the hardening treatment by the heat treatment, it is possible to increase the loosening prevention effect.

The invention provides a bearing apparatus for a wheel, wherein the end portions of the fitted portions of the hub and the inner race are welded. Accordingly, it is possible to further securely connect the hub to the inner race. The structure may be made such that the welding operation is performed all around the periphery or one or two or more welding points are dispersed in a circumferential direction.

The invention provides a bearing apparatus for a wheel, wherein a clip is attached to the end portion of the inner fitting member so as to fix the hub to the inner race in an axial direction. When the hub is the inner fitting member, the clip is attached to an annular groove formed on the outer peripheral surface of the small diameter cylinder portion in the hub so as to be engaged with the end surface of the inner race, and when the inner race is the inner fitting member, the clip is attached to an annular groove formed on the outer peripheral surface of the small diameter cylinder portion in the inner race so as to be engaged with the end surface of the hub. Accordingly, it is possible to further securely connect the hub to the inner race.

The invention provides a bearing apparatus for a wheel, wherein a reinforcing member is pressure fitted into the caulked portion between the hub and the inner race. According to the reinforcing member, it is possible to increase a rigidity of the caulked portion to be expanded or contracted, and it is possible to prevent the caulked portion from being loosened due to a spring back of the caulked portion or the other reasons.

The invention provides a bearing apparatus for a driving wheel which comprises an outer member having a flange for mounting to a vehicle body and double rows of outer raceways, a hub having an inner raceway opposing to one of the double rows of outer raceways of the outer race and a wheel mounting flange, an inner race having an inner raceway opposing to another of the double rows of outer raceways of the outer race, an outer joint member of a constant velocity universal joint fitted to the hub and the inner race, double rows of balls interposed between the outer raceways of the outer race and the inner raceways of the hub and the inner race, wherein an uneven portion is formed on any one of fitted surfaces of the hub and the outer joint member or both of them and both of the hub and the outer joint member are plastically connected by expanding the fitted portions or contracting the fitted portions. It is possible to prevent the hub and the inner race from being loosened by expanding or contracting the fitted portions between the hub and the outer joint member so as to plastically connect both of them.

Further, a third object of the present invention is to prevent a creep of an inner race in a bearing apparatus for a wheel of caulking an end portion of a hub so as to fix an inner race. To achieve the foregoing object, the invention provides a bearing apparatus for a wheel which comprises an outer race having a flange for mounting to a vehicle body and double rows of outer raceways on an inner peripheral surface, a hub having a wheel mounting flange in an outboard side, structured such as to pressure fit an inner race into an inboard side, directly form an inner raceway in the outboard side of double rows of inner raceways opposing to the double rows of outer raceways of the outer race on an outer peripheral surface and form an inner raceway in an inboard side on the inner race, double rows of rolling elements interposed between the outer raceways of the outer race and the inner raceways of the hub and the inner race, the inboard side end portion of the hub being caulked to the outer diameter side so as to fix the inner race, wherein a preventing means for preventing a relative rotation by directly or indirectly engaging the hub with the inner race is provided. The creep can be prevented and a durability can be improved by preventing the relative rotation between the hub and the inner race.

The invention provides a bearing apparatus for a wheel, wherein the preventing means for preventing the relative rotation between the hub and the inner race is a recess groove provided in an inner diameter of the end surface portion of the inner race. By providing the recess groove, the hub eats into the recess groove of the inner race when caulking the inner end portion of the hub, whereby a kind of key operation can be obtained. Accordingly, the hub and the inner race are locked in a rotational direction, whereby the creep can be prevented. The number of the recess groove is one or two or more, and when a multiplicity of recess grooves are arranged all around the periphery, they form a so-called serration.

The invention provides a bearing apparatus for a wheel, wherein the preventing means for preventing the relative rotation between the hub and the inner race is a recess portion formed in the end surface portion of the inner race and having a peripheral wall in which a distance from an axial core of the inner race is not uniform in a circumferential direction. In this case, when caulking the inner end portion of the hub, the hub is expanded along the recess portion. Since in the peripheral wall of the recess portion, the distance from the axial core of the inner race is not uniform, the hub and the inner race are locked in the rotational direction, whereby it is possible to prevent the creep. Exemplifying a concrete shape of the recess portion having the peripheral wall in which the distance from the axial core of the inner race is not uniform in the circumferential direction, there are a structure in which a contour of the peripheral wall is an oval shape, and a structure in which a contour of the peripheral wall is a complete round eccentrically formed with the axial core of the inner race. The peripheral wall may be parallel to an axis of the inner race or may extend in a direction crossing to the axis of the inner race such as a so-called bevel.

The invention provides a bearing apparatus for a wheel, wherein the preventing means for preventing the relative rotation between the hub and the inner race includes a spacer interposed between the caulked portion of the hub and the inner race, and the spacer is engaged with both of the hub and the inner race. The invention provides a bearing apparatus for a wheel, wherein the spacer is formed in an annular shape, and has a flat surface engaging with a flat surface formed in the outer peripheral portion of the hub in an inner peripheral portion thereof and a flat surface engaging with a flat surface formed in the outer peripheral portion of the inner race in an outer peripheral portion thereof. Accordingly, it is possible to prevent the both from relatively rotating by indirectly engaging the hub with the inner race, whereby it is useful for preventing the creep of the inner race.

This invention can be applied to both of the bearing apparatuses for the driven wheel and the driving wheel. Then, in the bearing apparatus for the driven wheel, the hub is not connected to the drive shaft whichever the hub is a solid one or a hollow one. On the contrary, in the bearing apparatus for the driving wheel, the outer joint member of the constant velocity universal joint is connected to the hub. Further, the structure can be made such that the outer joint member is connected to the serration hole of the hub by a serration formed in the stem portion thereof, the hub and the outer joint member are fixed to each other by fastening a nut to a screw formed in the stem portion.

The invention provides a bearing apparatus for a wheel or 47, wherein an annular recess portion for receiving a caulked end portion of the hub is formed in an inner diameter side of a shoulder surface of the outer joint member of the constant velocity universal joint. Accordingly, since the annular shoulder surface in the outer diameter side of the recess portion is brought into contact with the side surface of the inner race without being interfered with the caulked end portion of the hub and an axial positioning of the inner race is performed, there is no fear that a bearing clearance is changed and a pre-load is omitted.

The invention provides a bearing apparatus for a wheel, wherein an inner end of a thin cylinder portion formed in an inboard side end portion of the hub is set to be closer to the axial end side than a crossing point between a load application line of the inboard side rolling element and an inner diameter surface of the inner race. Accordingly, since the thin caulked portion is disposed at a position shunting from the load application line, it is useful for maintaining a desired rigidity and preventing a creep of the inner race. In this case, in the bearing apparatus for the wheel shown in FIG. 44, a thin cylinder portion 61' having a depth h is provided in an inboard side end portion of the hub 10 in order to facilitate the caulking operation, in this case, the thin cylinder portion 61' partly extend to a fitted area between the thin cylinder portion 61' and the inner race 80. In the wheel bearing of the automobile, a great moment load is applied to the bearing portion due to a swirling motion or the like, however, in particular, since the thin cylinder portion 61' is provided in the inboard side, there is left a problem of a creep of the inner race 80 due to an insufficiency of rigidity as a problem to be solved.

BRIEF DESCRIPTION OF THE DRAWINGS

FIG. 2 is a vertical cross sectional view for explaining a caulking process;

FIG. 41 is a partly cross sectional view of a bearing apparatus for a wheel in which an inner race is fixed by caulking a hub;

DESCRIPTION OF THE PREFERRED EMBODIMENTS

Figure 1:
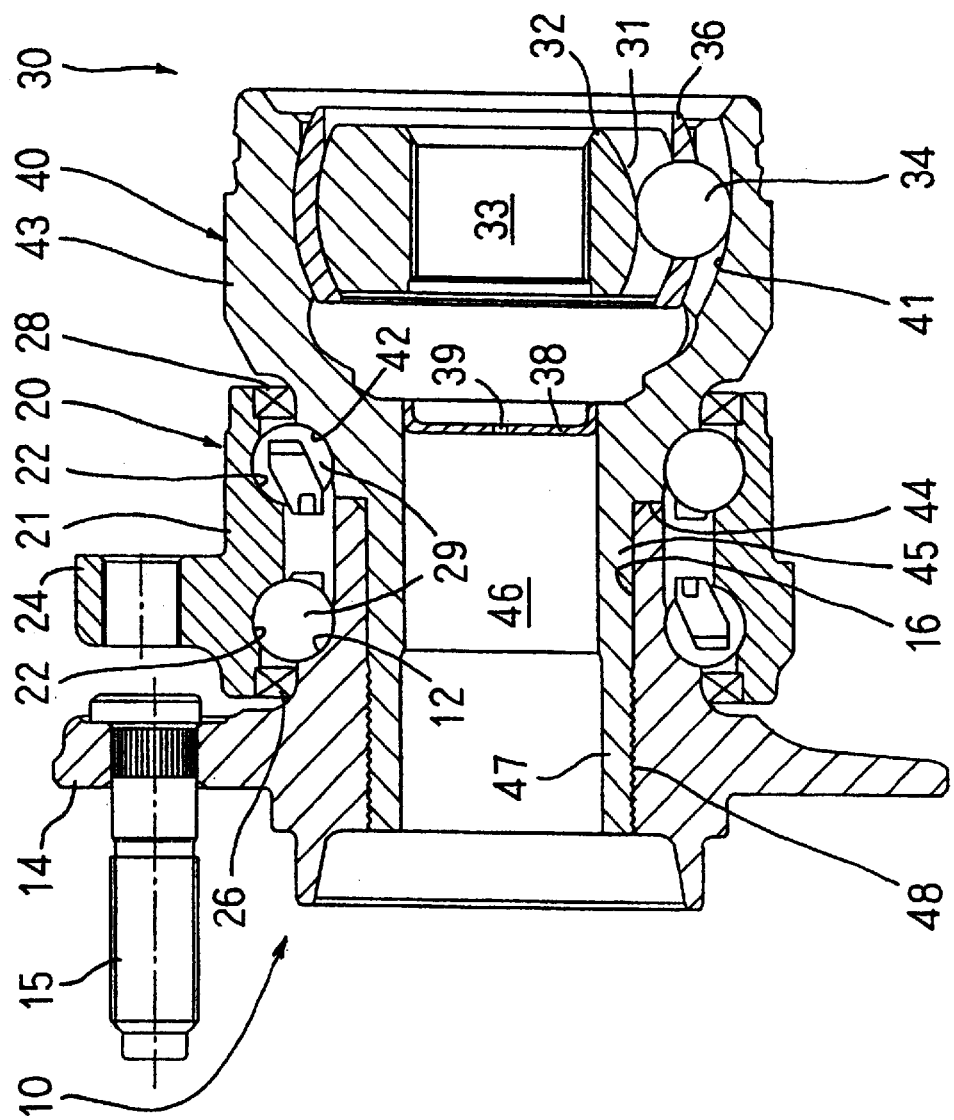
FIG. 1 is a vertical cross sectional view of a bearing apparatus for a wheel showing an embodiment.

An embodiment according to the present invention will be described with reference to the accompanying drawings.

At first, a basic structure will be described with reference to FIG. 1. A bearing apparatus for a wheel has a hub 10, a bearing 20 and a constant velocity universal joint 30 as main constituting elements. In this case, a side close to an outer side of a vehicle in a state of being assembled in the vehicle is called as an outboard side (a left side in the drawing), and a side close to a center of the vehicle is called as an inboard side (a right side in the drawing).

The hub 10 is provided with a flange 14 for mounting a wheel (not shown) at an end portion in the outboard side, and a hub bolt 15 for fixing a wheel disc to each of positions arranged at a uniform interval in a circumferential direction of the flange 14 is provided. An inner raceway 12 in the outboard side is formed on an outer peripheral surface close to the flange 14 of the hub 10. The hub 10 has an axial through hole 16 in an axial core portion.

The constant velocity universal joint 30 is constituted by an inner joint member 32 provided with a track groove 31 in an outer peripheral portion, an outer joint member 40 provided with a track groove 41 in an inner peripheral portion, a ball 34 interposed between the track groove 31 of the inner joint member 32 and the track groove 41 of the outer joint member 40, and a cage 36 for holding all the balls 34 within the same plane.

The inner joint member 32 has an axial through hole 33 and is structured such as to be serration connected to a drive shaft connected to a constant velocity universal joint (not shown) arranged in an engine side. The outer joint member 40 is constituted by a mouth portion 43 and a stem portion 45 and is fitted to the through hole 16 of the hub 10 in the stem portion 45. An inner raceway 42 in the inboard side is formed on an outer peripheral surface close to a shoulder surface 44 of the mouth portion 43. The shoulder surface 44 of the mouth portion 43 is brought into contact with the end surface of the hub 10, whereby the hub 10 and the outer joint member 40 are positioned in an axial direction and a size between the inner raceways 12, 42 is defined. The stem portion 45 is made hollow by providing an axial through hole 46 communicating with a bottom of the bowl-shaped mouth portion 43.

The bearing 20 includes an outer race 21 and double rows of rolling elements 29. The outer race 21 is provided with a flange 24 for mounting to the vehicle body (not shown), and double rows of outer raceways 22 are formed on an inner peripheral surface thereof. The double rows of rolling elements 29 are assembled between the inner raceway 12 of the hub 10, the inner raceway 42 of the outer joint member 40 and the double rows of outer raceways 22 of the outer race 21.

In this case, the double rows of angular ball bearings using balls for the rolling element is illustrated, however, in the case of a bearing apparatus for a wheel of an automobile having a heavy weight, there is a case of employing the double rows of conical roller bearings using conical rollers for the rolling element 29. Seals 26 and 28 are attached to both end opening portions of the outer race 21, thereby preventing a grease charged within the bearing from leaking and a water or a foreign material from entering from outside.

Further, since the through hole 46 of the stem portion 45 is communicated with the mouth portion 43 as mentioned above, an end plate 38 is attached to an end portion in the mouth portion 43 side of the through hole 46 for preventing the grease charged within the mouth portion 43 from leaking out. The end plate 38 is preferably made of a material having a light weight and a good heat conductivity such as an aluminum. Further, it is possible to restrict a temperature increase of the mouth portion 43 by providing a small hole 39 for ventilation in the end plate 38.

FIG. 1 shows an embodiment structured such that the stem portion 45 of the outer joint member 40 having an uneven portion 48 formed on an outer peripheral surface of the axial end portion is fitted to the through hole 16 of the hub 10. Then, by expanding a portion of the stem portion 45 in which the uneven portion 48 is formed, from an inner diameter side to an outer diameter side as shown by a reference numeral 47, the uneven portion 48 eats into the inner peripheral surface of the through hole 16 of the hub 10, thereby plastically connecting the hub 10 to the outer joint member 40.

In the case that the expansion mentioned above is performed by a press formation, for example, after pressure fitting the stem portion 45 of the outer joint member 40 to the through hole 16 of the hub 10 as shown in FIG. 2, the stem portion 45 is expanded from the inner diameter side to the outer diameter side by pressure fitting the stem portion 45 of the outer joint member 40 into the through hole 46 by moving a caulking jig 54 having a diameter greater than an inner diameter of the through hole 46 in a direction of an arrow in a state of supporting a bottom of the mouth portion 43 of the outer joint member 40 by means of a backup jig 52. A portion of the stem portion 45 caulked by the expansion, that is, a caulked portion is denoted by reference numeral 47. Accordingly, the uneven portion 48 of the stem portion 45 eats into the inner peripheral surface of the through hole 16 of the hub 10, whereby the hub 10 and the outer joint member 40 are plastically connected.

In this case, an illustration is omitted, however, it is possible to perform an accurate caulking process by employing a jig for restricting the outer diameter of the hub when expanding the uneven portion 48 from the inner diameter side by caulking, on the contrary, employing a jig for restricting the inner diameter of the through hole 46 of the stem portion 45 when contracting the hub 10 from the outer diameter side by caulking.

Figure 3A:
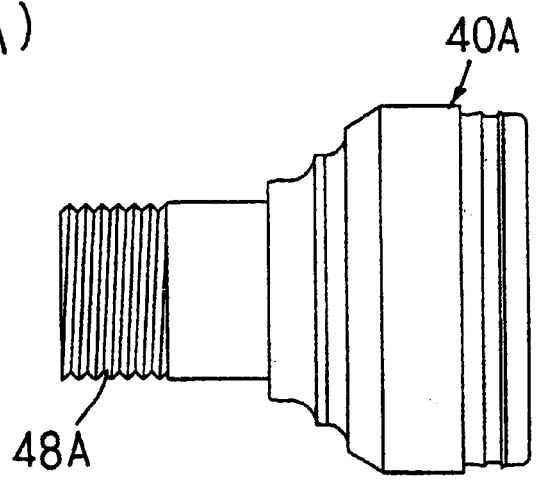
FIG. 3 is a front elevational view of an outer joint member showing a particular embodiment of an uneven portion.
Figure 3B:
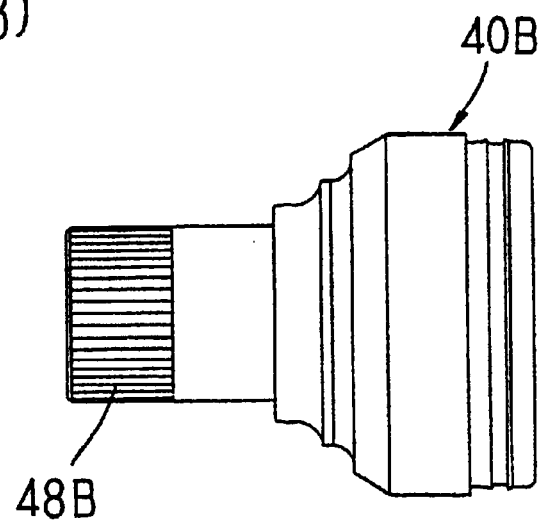
Figure 3C:
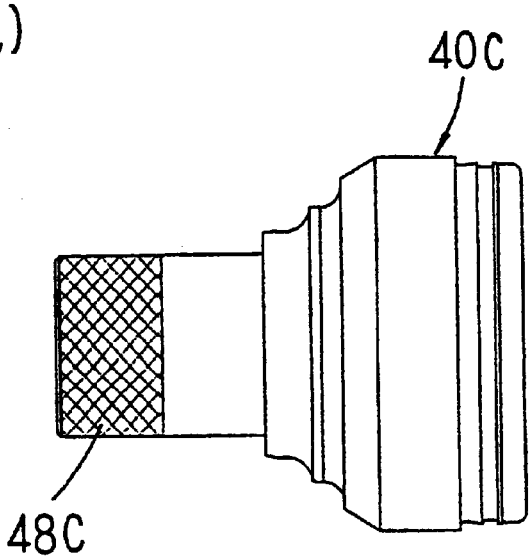

Particular embodiment of the uneven portion 48 can be exemplified as shown in FIG. 3. FIG. 3A shows a screw 48A, FIG. 3B shows a serration 48B and FIG. 3C shows a double-cut knurled shape 48C, respectively. Process conditions such as a shape, a size or the like of the screw, the serration, the double-cut knurled shape or the like can be variously designed according to required item and level. Further, a thickness of the stem portion 45 of the outer joint member 40 and of the hub 10 can be variously designed according to required item and level.

Figure 4:
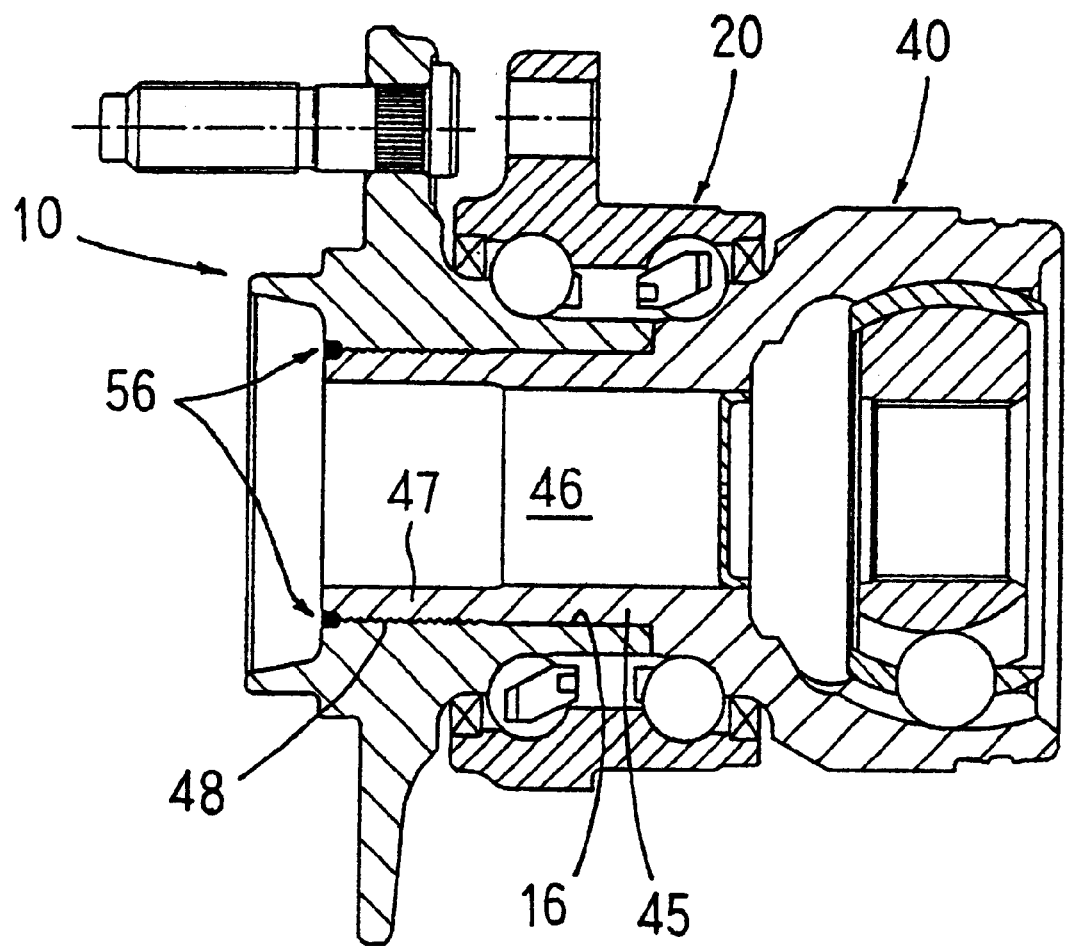
FIG. 4 is a vertical cross sectional view of a bearing apparatus for a wheel showing an embodiment.

An embodiment shown in FIG. 4 is structured such that the hub 10 and the stem portion 45 are securely connected by welding both elements at an end portion of the caulked portion 47 as shown by reference numeral 56. In this case, welding the fitted portion between the hub 10 and the stem portion 45 all around the periphery is exemplified.

Figure 5A:
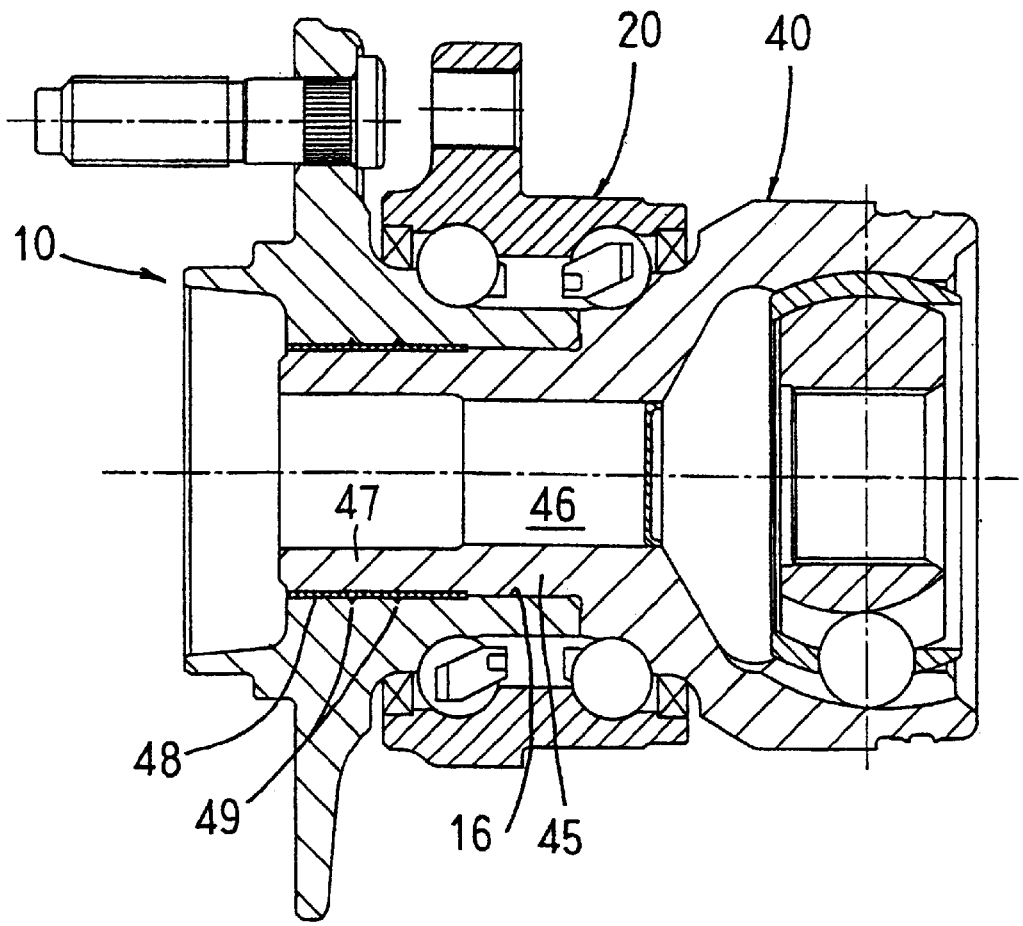
FIG. 5A is a vertical cross sectional views of a bearing apparatus for a wheel.
Figure 5C:
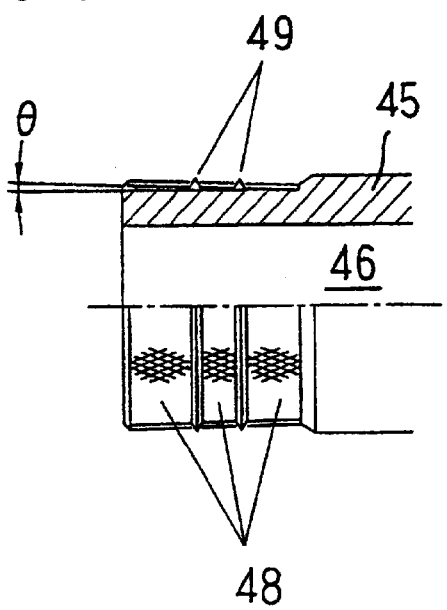
FIGS. 5B and 5C are half cross sectional views of a stem portion.
Figure 5B:
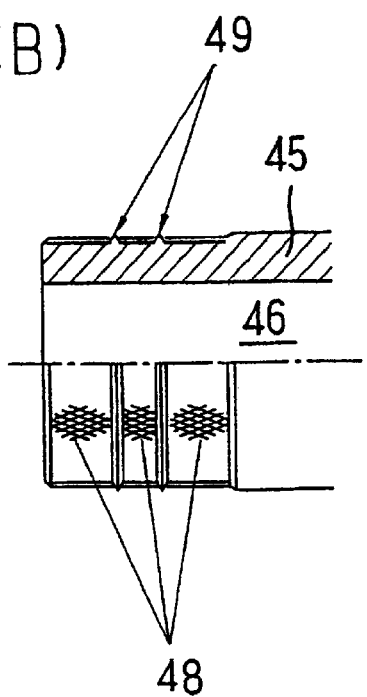

As shown in FIG. 5, come-out preventing means can be independently added to the uneven portion 48 of the stem portion 45. For example, as shown in FIG. 5B, a ring-like projection 49 is provided in an area of the uneven portion 48 of the stem portion 45. Accordingly, the ring-like projection 49 eats into the inner peripheral surface of the hub 10 when expanding the stem portion 45 from the inner diameter side to the outer diameter side (FIG. 5A), however, since an eating amount of the ring-like projection 49 is greater than an eating amount of the uneven portion 48, a come-out preventing effect is increased. Only one ring-like projection 49 may be provided, however, two or more ring-like projections may be arranged at a uniform interval or a random pitch. Further, the same effect can be obtained by providing a taper angle θ that the axial end side is greater, in the caulked portion of the stem portion 45 as shown in FIG. 5C. In this case, FIG. 5C shows using both of the ring-like projection 49 and the taper angle θ, however, it is possible to simply employ the taper angle θ.

Figure 6A:
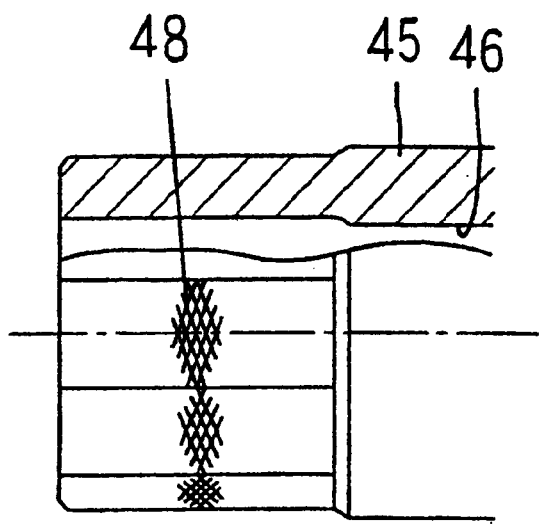
FIGS. 6A and 6C are front elevational views showing an axial end of a stem portion in a partly cross sectional manner.
Figure 6B:
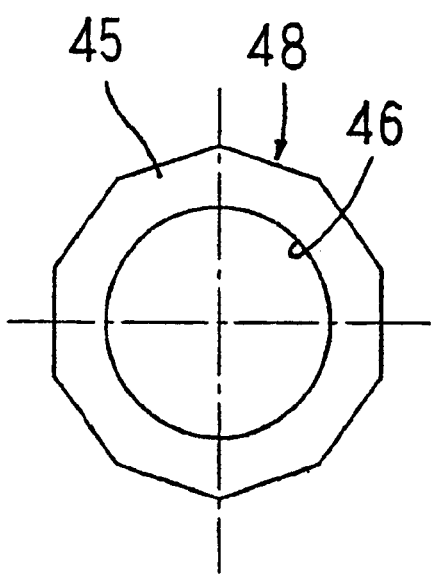
FIGS. 6B and 6D are end surface views.
Figure 6C:
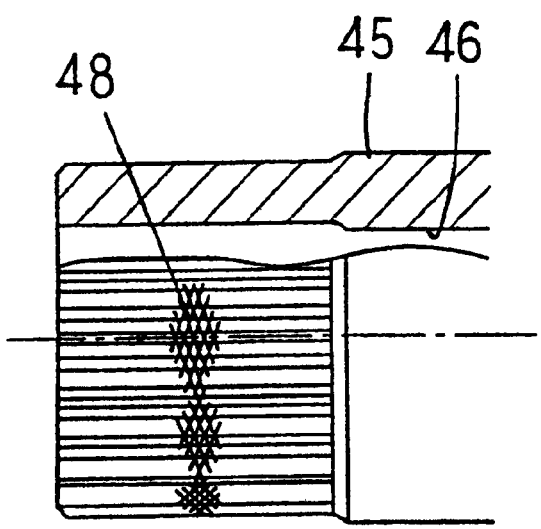
Figure 6D:
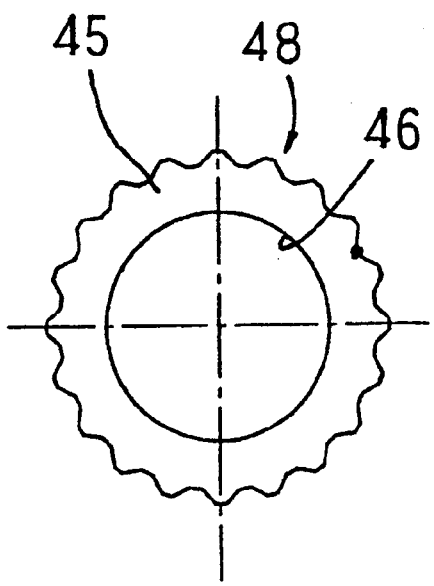

An embodiment shown in FIG. 6 is structured such that a cross sectional shape of a fitted surfaces between the hub 10 and the stem portion 45 fitted to each other is formed in a polygonal shape shown in FIGS. 6A and 6B, a serration shape shown in FIGS. 6C and 6D or the like and an uneven formation such as a knurled shape or the like is applied on a peripheral surface, whereby a torque transmission capacity can be improved.

Figure 7:
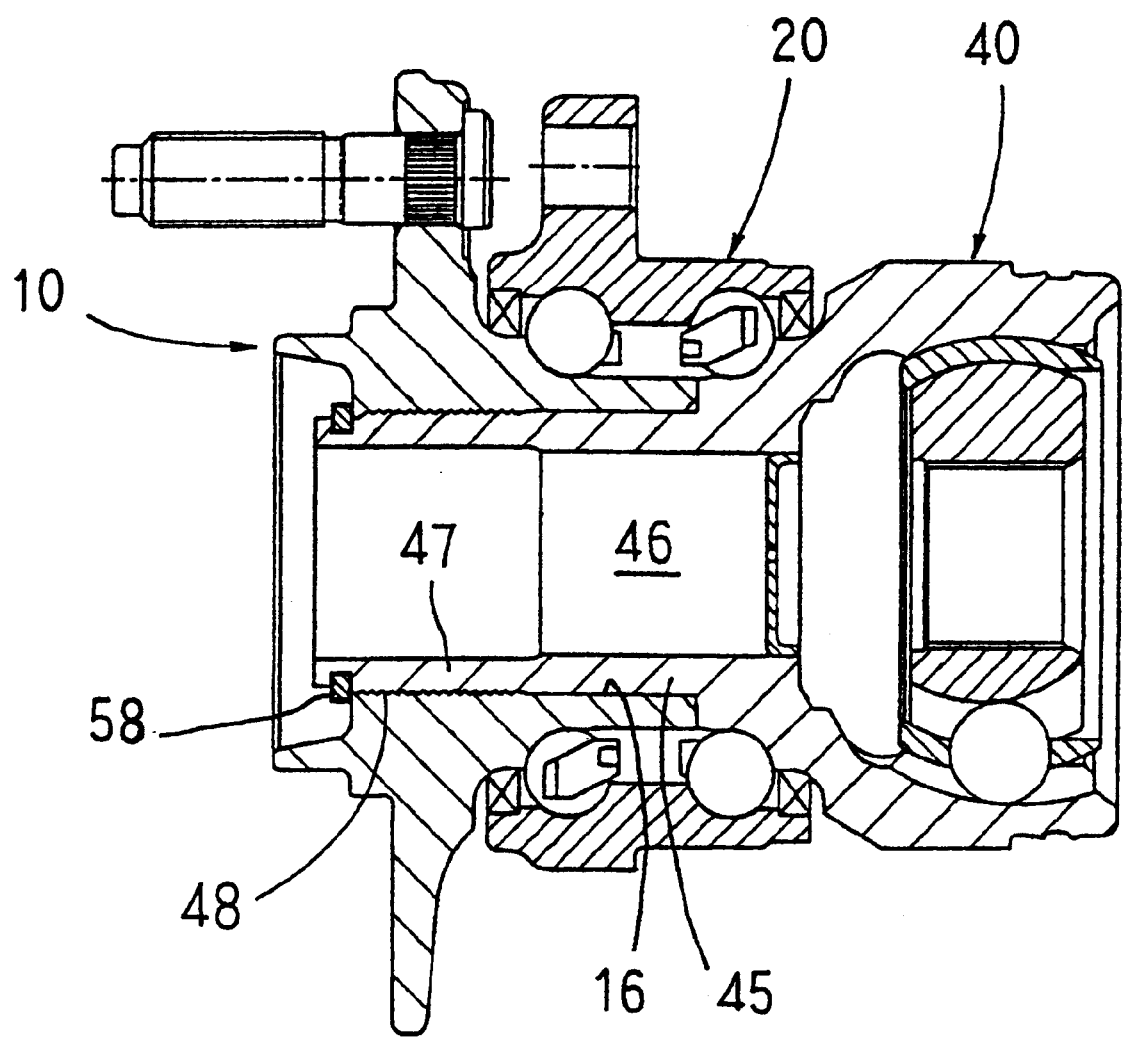
FIGS. 7 to 19 are vertical cross sectional views of a bearing apparatus for a wheel showing embodiments.

An embodiment shown in FIG. 7 is structured such that the axial end of the stem portion 45 is protruded from the hub 10 and the clip 58 is attached to an annular groove formed in an outer peripheral portion thereof, whereby the hub 10 and the outer joint member 40 are fixed in an axial direction so as to prevent come-out.

Figure 8:
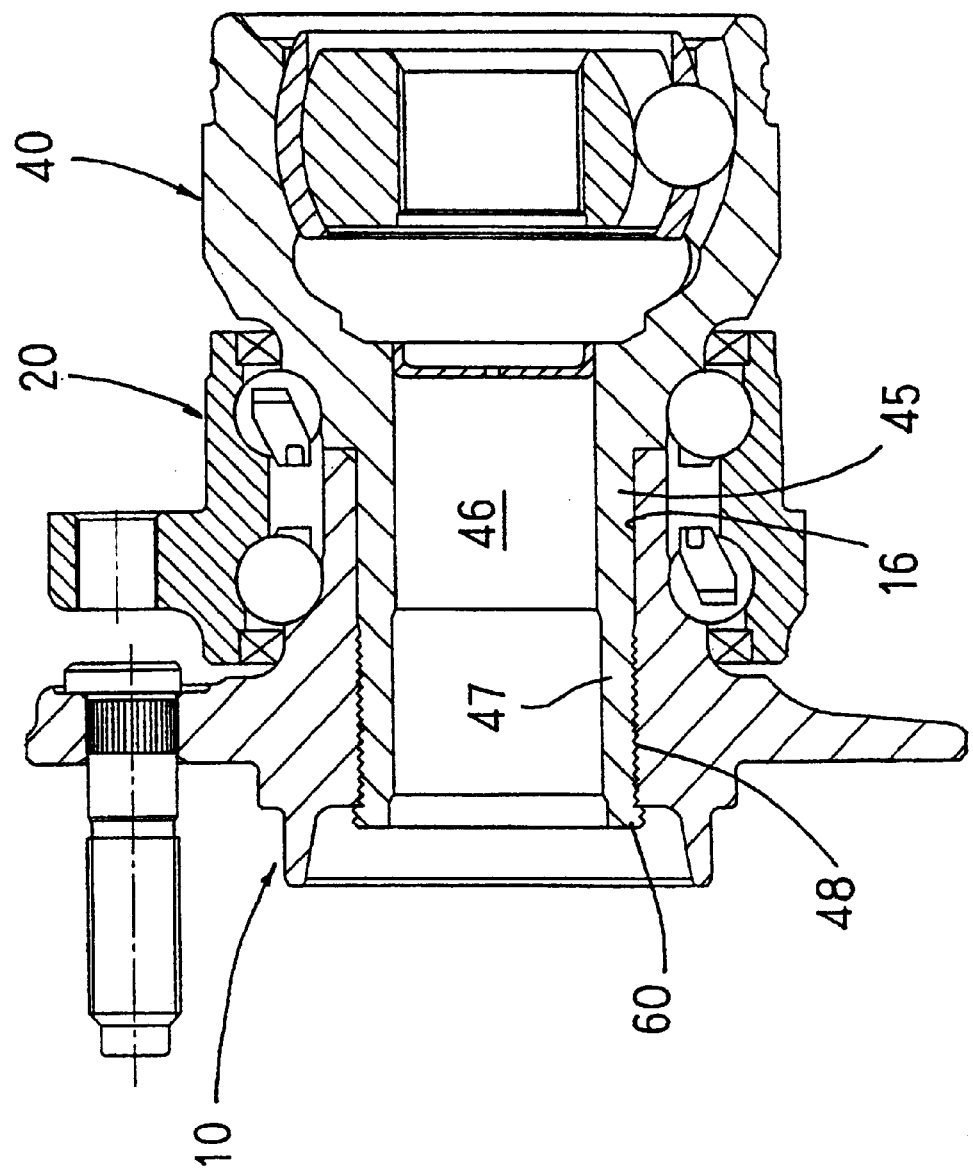

An embodiment shown in FIG. 8 is structured such that the axial end of the stem portion 45 is protruded from the hub 10, the uneven portion 48 is expanded by caulking as shown by reference numeral 47, and thereafter the axial end of the stem portion 45 is caulked at the end surface of the hub 10 as shown by reference numeral 60 so as to prevent come-out. In addition to separately caulking in two stages as mentioned above, it is possible to form both of the caulked portions 47 and 60 at one time.

Figure 9:
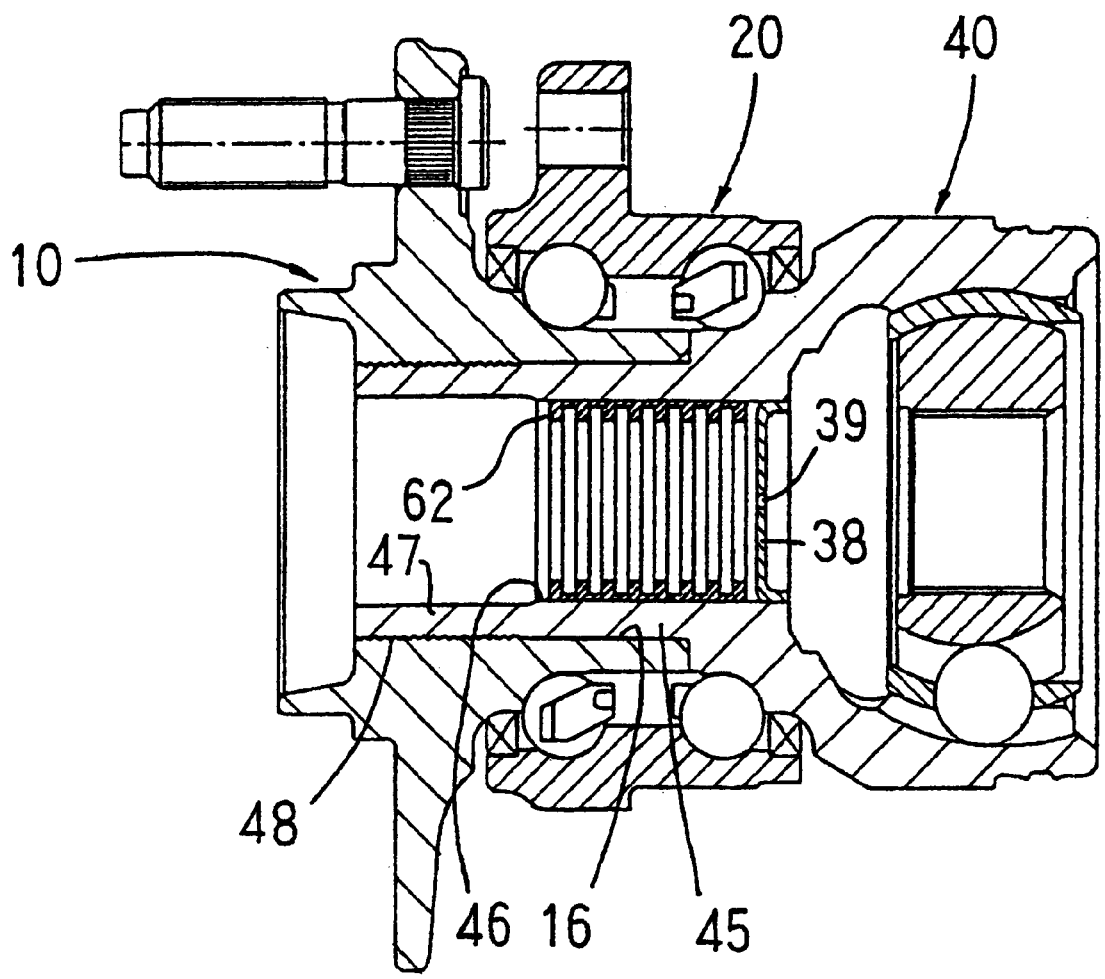

An embodiment shown in FIG. 9 is structured such that a cooling fin member 62 for radiating a heat is inserted into the through hole 46 of the outer joint member 40. A surface area is increased by a lot of fins provided in the fin member 62 and a heat radiating effect is increased. It is preferable to employ a material having a light weight and a good heat conductivity such as an aluminum or the like for the fin member 62.

Figure 10:
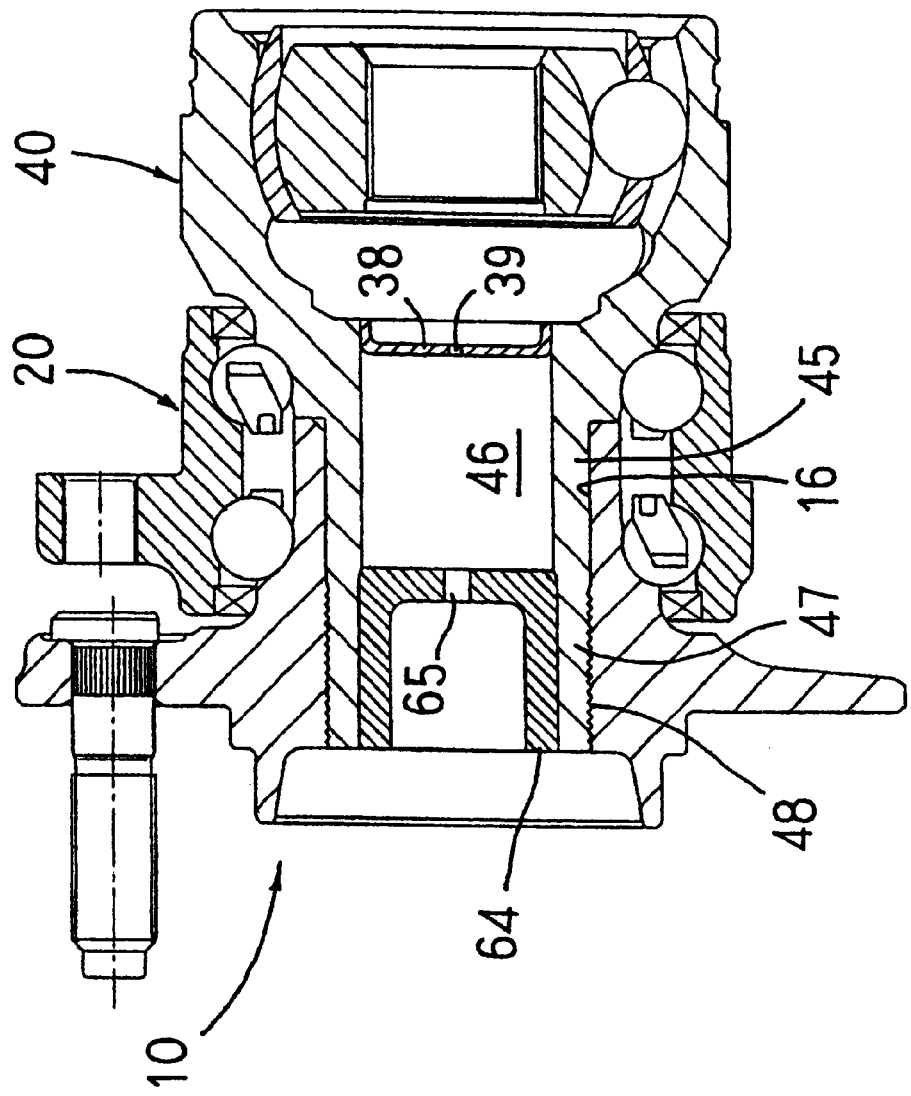

An embodiment shown in FIG. 10 is structured such that a reinforcing member 64 for reinforcing and stabilizing the caulked portion 47 is pressure fitted to the through hole 46 of the stem portion 45. The reinforcing member 64 serves to compensate for the reduction of rigidity of the caulked portion 47 after expanding, and may be formed in a solid short shaft shape in addition to the cylindrical shape with a bottom as illustrated. In any cases, in the case that the through hole 46 of the stem portion 45 is communicated with the mouth portion 43, it is desirable to provide a small hole 65 for ventilation communicating in an axial direction so as to prevent the temperature from increasing.

FIGS. 11 to 18 show embodiments structured such that a torque transmission between the hub 10 and the stem portion 45 of the outer joint member 40 is performed by the serration.

Figure 11:
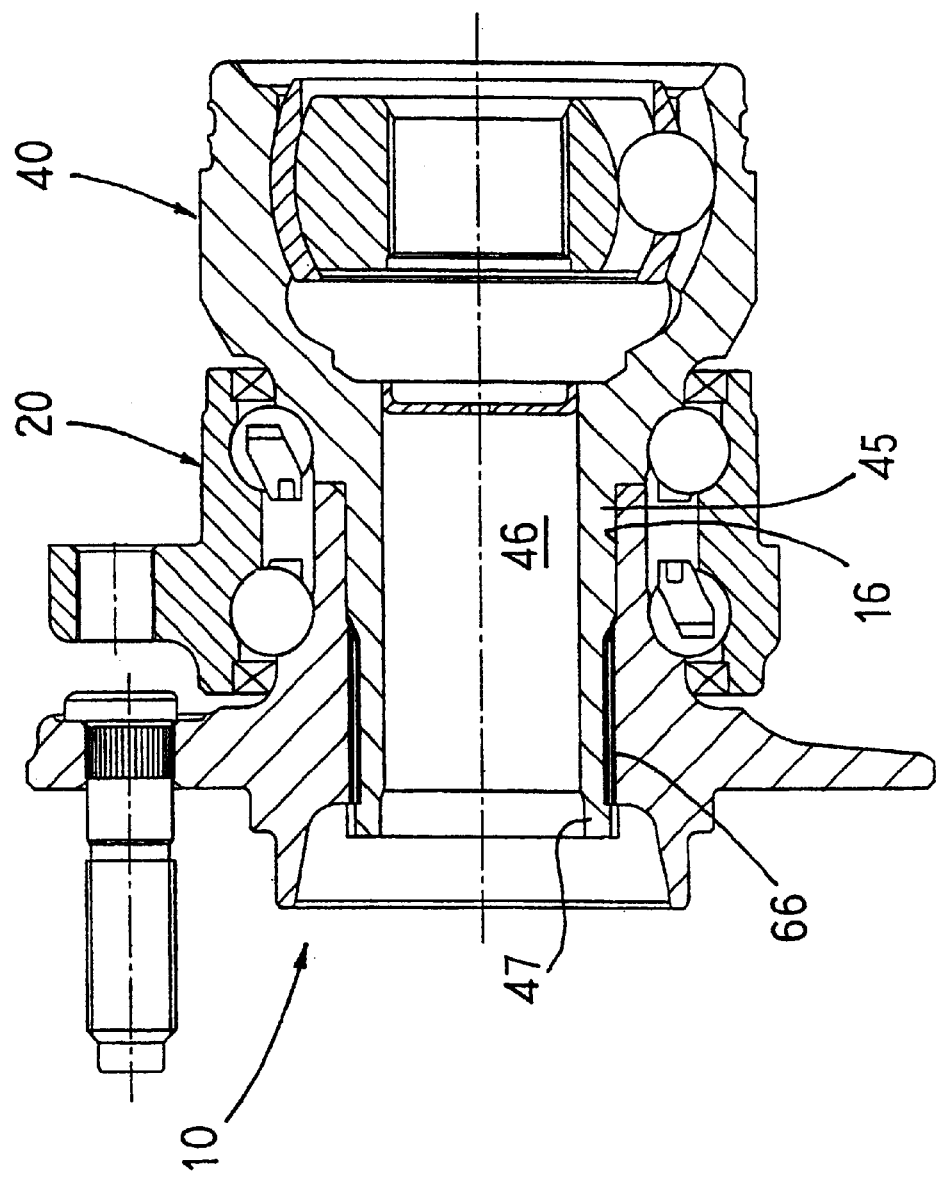

An embodiment shown in FIG. 11 is structured such that a serration portion 66 is provided in the hub 10 and the stem portion 45 and the axial end of the stem portion 45 is protruded from the hub 10 so as to expand the end portion thereof from the inner diameter side to the outer diameter side by caulking. As illustrated, in the case that the caulking operation is performed so that the caulked portion 47 partly extends to the serration end portion in the hub 10 side, it is possible to also utilize a play insert for the serration.

Figure 12:
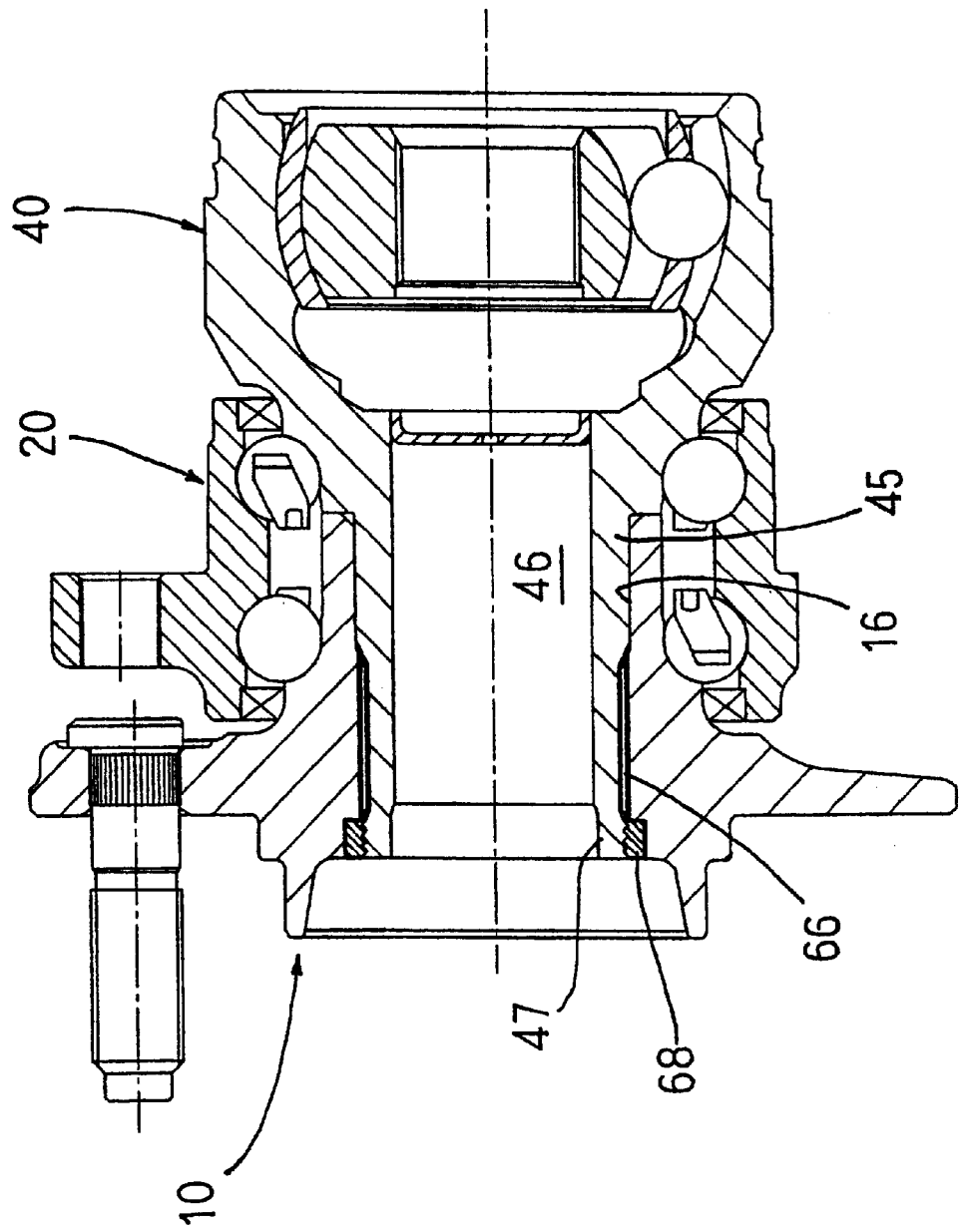

An embodiment shown in FIG. 12 is structured such that the serration portion 66 is provided in the hub 10 and the stem portion 45 and the axial end portion of the stem portion 45 is expanded by caulking via a spacer ring 68. In this case, an unevenness formation (refer to FIG. 3) such as a double-cut knurled shape or the like is applied to the outer peripheral surface of the stem portion 45 or the inner peripheral surface of the spacer ring 68. When the unevenness formation is applied to the outer peripheral surface of the spacer ring 68 or the inner peripheral surface of the hub 10, it is possible to more firmly caulk. In this case, as illustrated, in the case that the caulking operation is performed so that the caulked portion 47 partly extends to the serration end portion in the hub 10 side, it is possible to also utilize a play insert for the serration.

Figure 13:
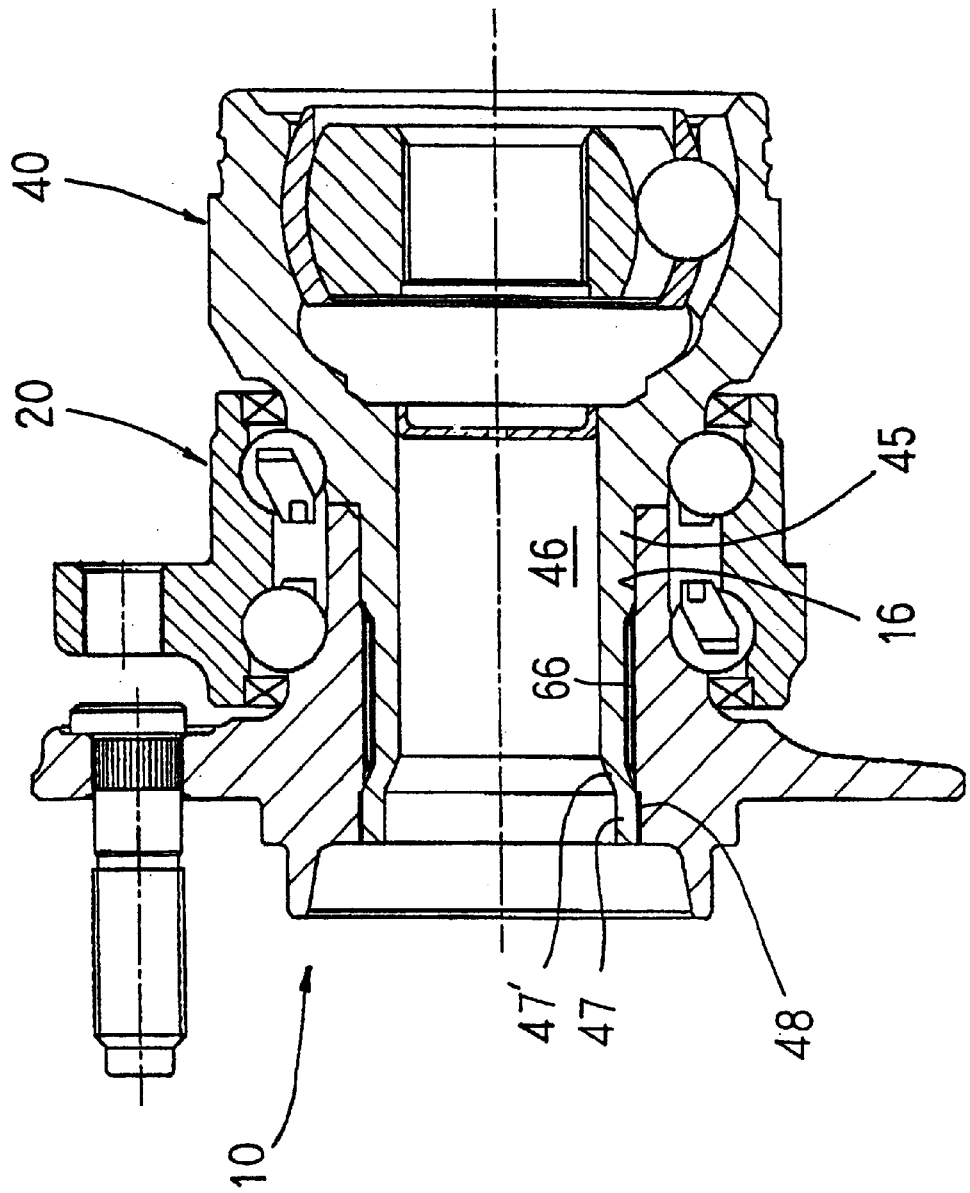
Figure 14:
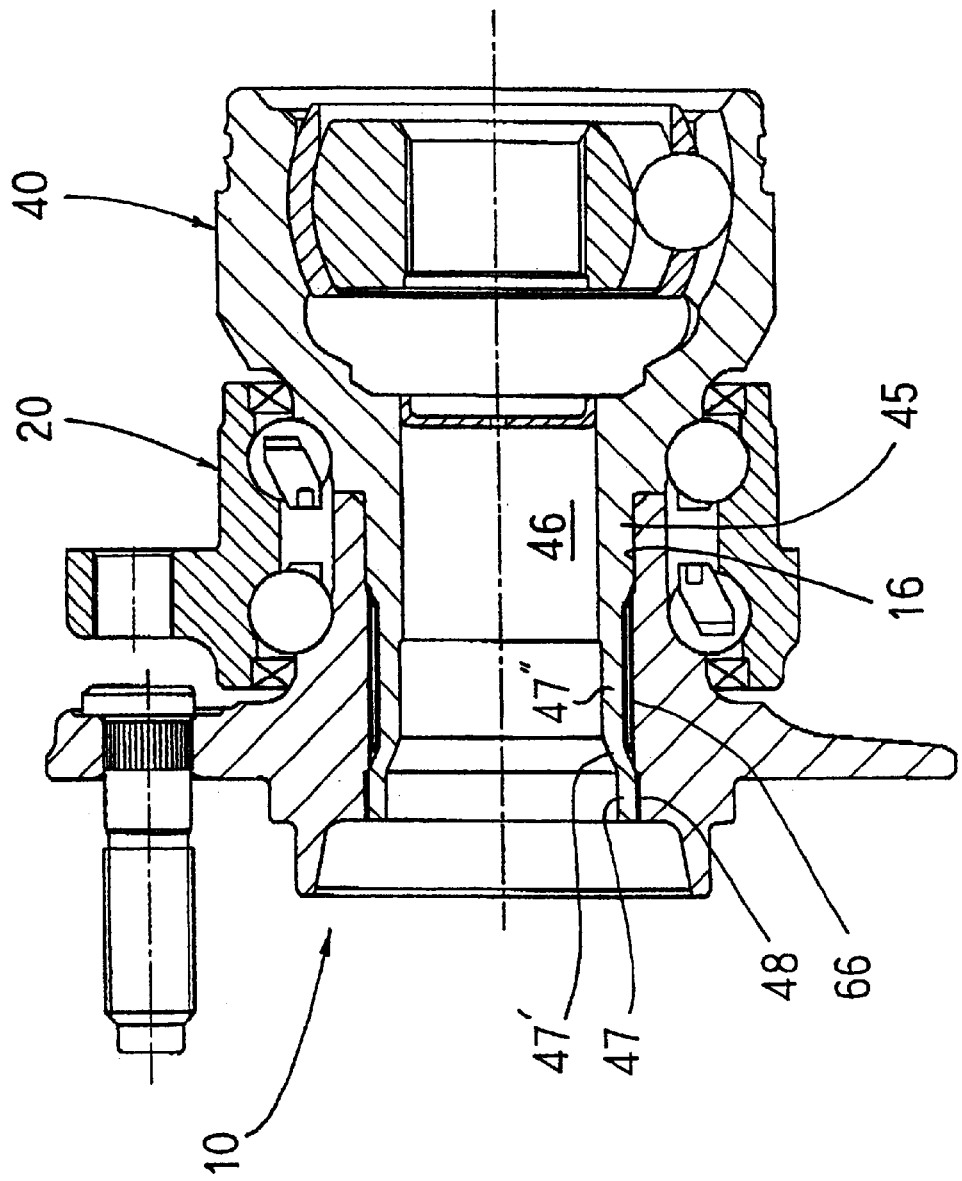

An embodiment shown in FIG. 13 is structured such that the serration connection and the caulking operation are combined, in which a portion 47' changing from the serration portion 66 to the caulked portion 47 is expanded according to a taper surface. In this case, the torque transmission is performed by the serration portion 66, and the hub 10 and the outer joint member 40 are prevented from coming out by the caulked portion 47. In the caulked portion 47, the unevenness formation (refer to FIG. 3) such as a double-cut knurled shape or the like is applied to at least one of the outer peripheral surface of the stem portion 45 and the inner peripheral surface of the hub 10. Further, as shown by reference symbol 47" in FIG. 14, the inner diameter portion of the serration portion 66 may be expanded by caulking, whereby it is possible to prevent a play of the serration, so that a loosening prevention effect can be further increased.

Figure 15:
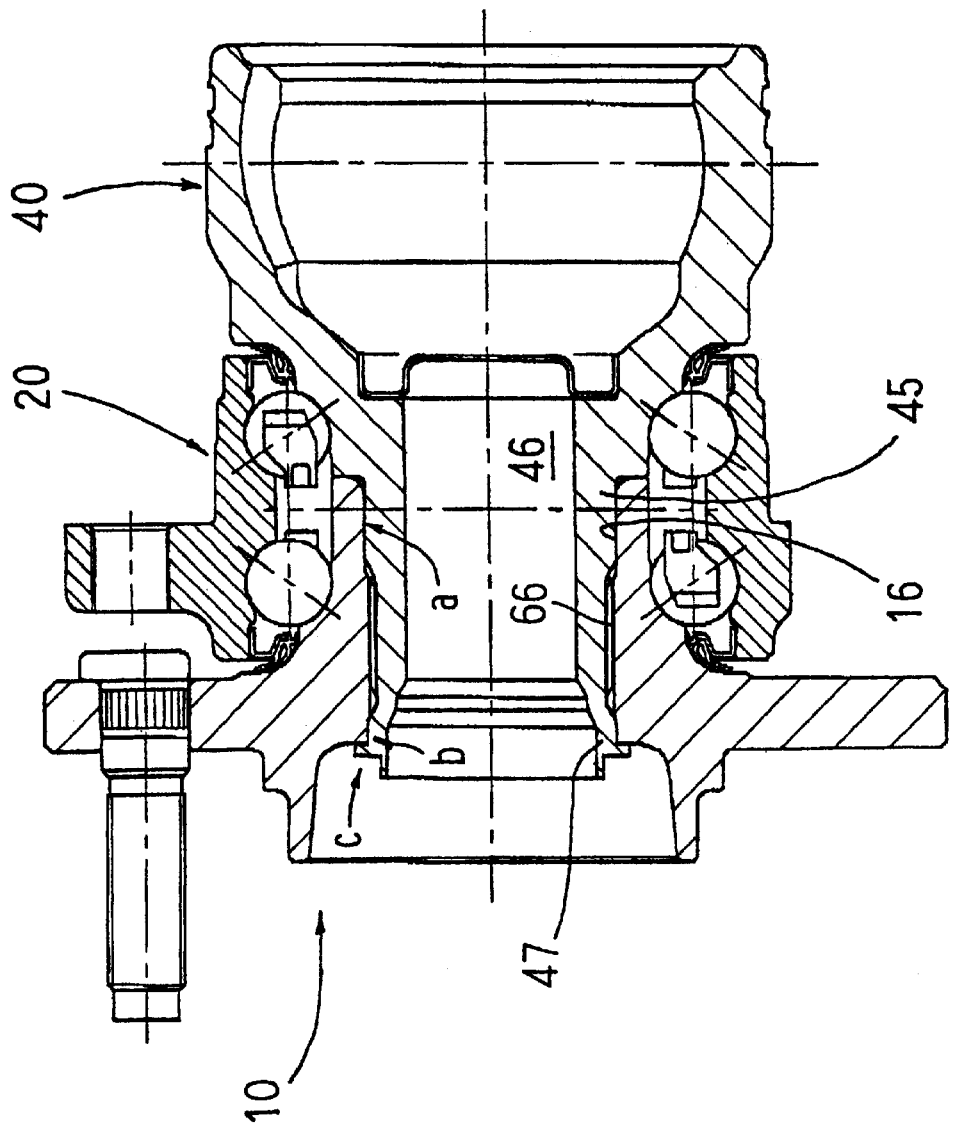
Figure 16:
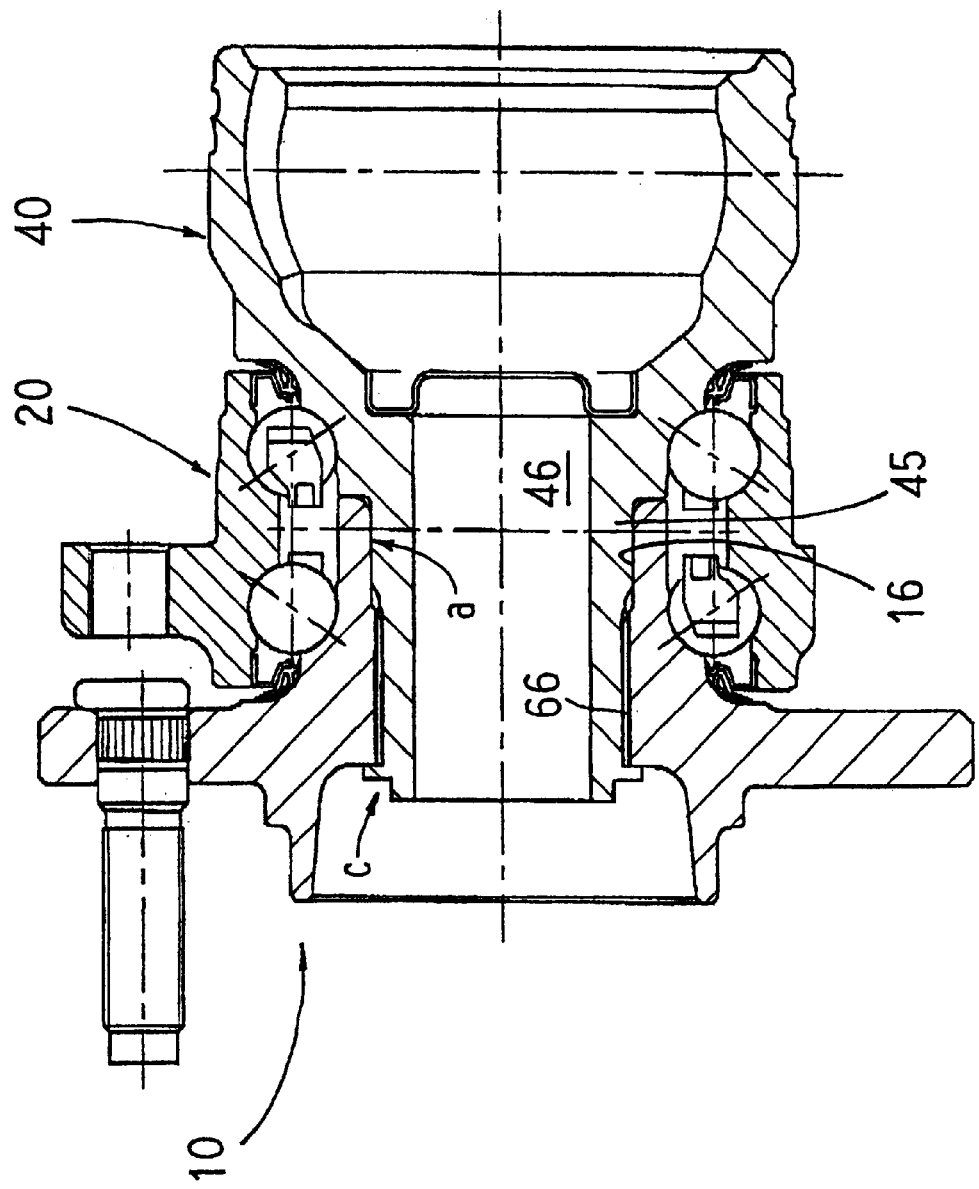

An embodiment shown in FIG. 15 is structured such that the front end portion of the stem portion 45 of the outer joint member 40 is expanded so as to be plastically connected to the inner peripheral surface of the hub 10, and the end surface is caulked so as to fix the hub 10 in an axial direction. In this case, a torque transmission is performed by the serration portion 66, and a fixation of the hub 10 in an axial direction is performed by a pressure fitting a of the cylinder surface, a plastic connection b of the caulked portion 47 and a caulked portion c of the end surface. At a time of caulking the end surface of the stem portion 45, a step portion within the mouth portion 43 of the outer joint member 40 is supported (refer to FIG. 2), and the end surface is plastically formed by a press formation so as to fix to the hub 10. According to the structure mentioned above, it is possible to securely prevent the creep of the hub 10, thereby providing a structure which can resist against the moment load due to the pressure fitted portion of the cylinder surface. The structure can be made such that the caulked portion 47 (FIG. 15) is omitted as shown in FIG. 16, the serration portion 66 is lightly expanded in place thereof, and an insufficient fastening force is compensated by the caulked portion c of the end portion.

Figure 17:
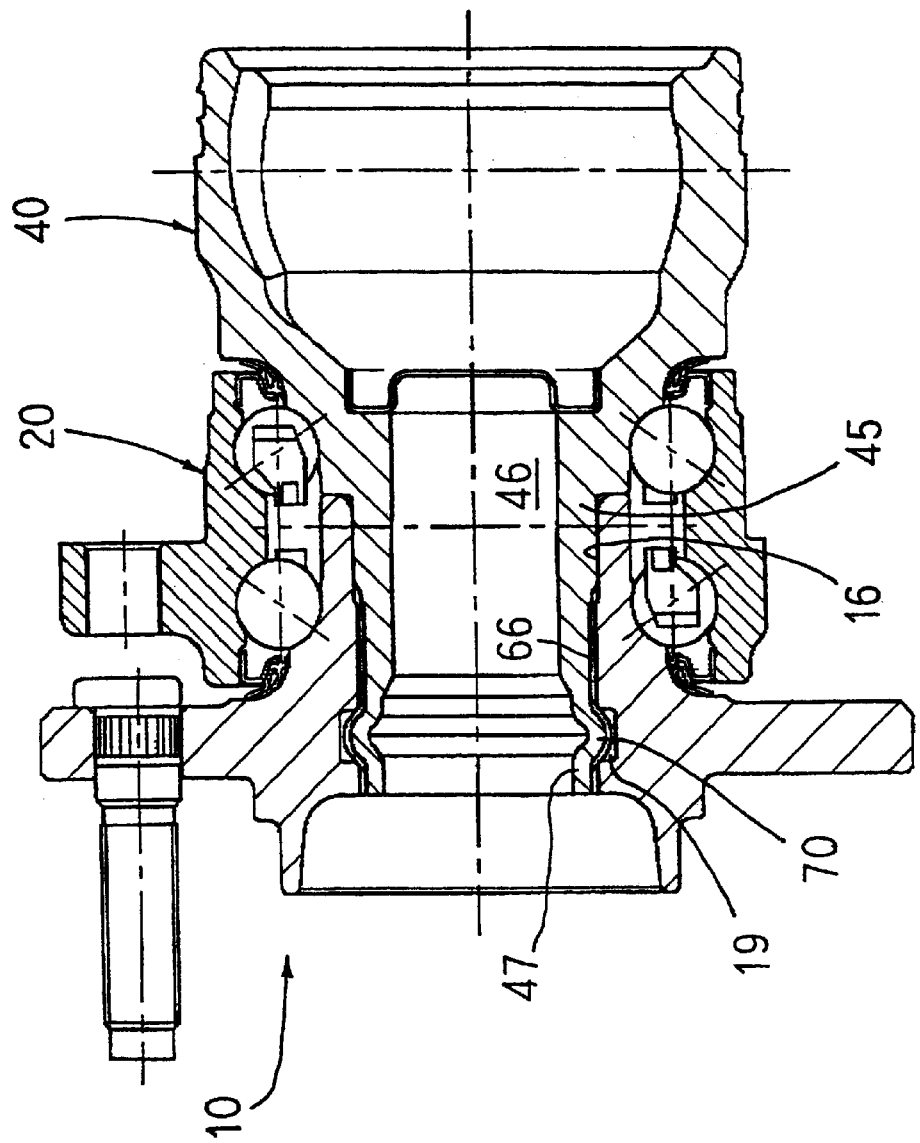

An embodiment shown in FIG. 17 is structured such that an annular groove 19 is formed in the inner peripheral portion of the hub 10 and the stem portion 45 is partly swelled as shown by reference numeral 70 so as to be fitted within the annular groove 19 at a time of expanding the stem portion 45 from the inner diameter side to the outer diameter side by caulking. Accordingly, since the swelled portion 70 and the annular groove 19 are engaged with each other and the rigidity of the caulked portion 47 is increased due to an existence of the swelled portion 70, a more secure come-out prevention can be achieved.

Figure 18:
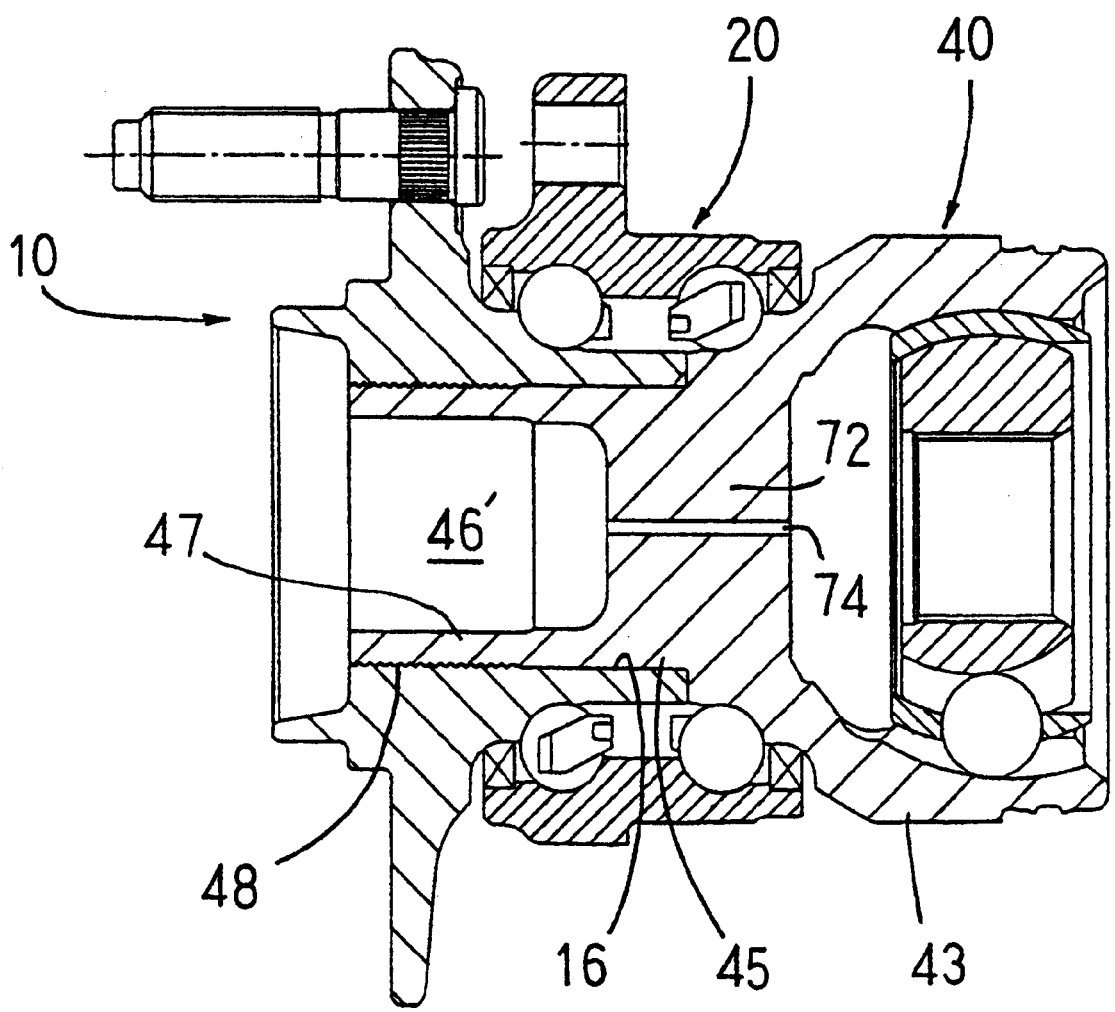

In the embodiments mentioned above, the stem portion 45 is hollow all along the length, however, it is possible to increase a rigidity by making a part of the stem portion 45 in an axial direction solid as shown by reference numeral 72, as shown in FIG. 18. Further, in the embodiment shown in FIG. 18, a ventilating small hole 74 for communicating the mouth portion 43 and a hollow portion 46' with the solid portion 72 is provided.

Figure 19:
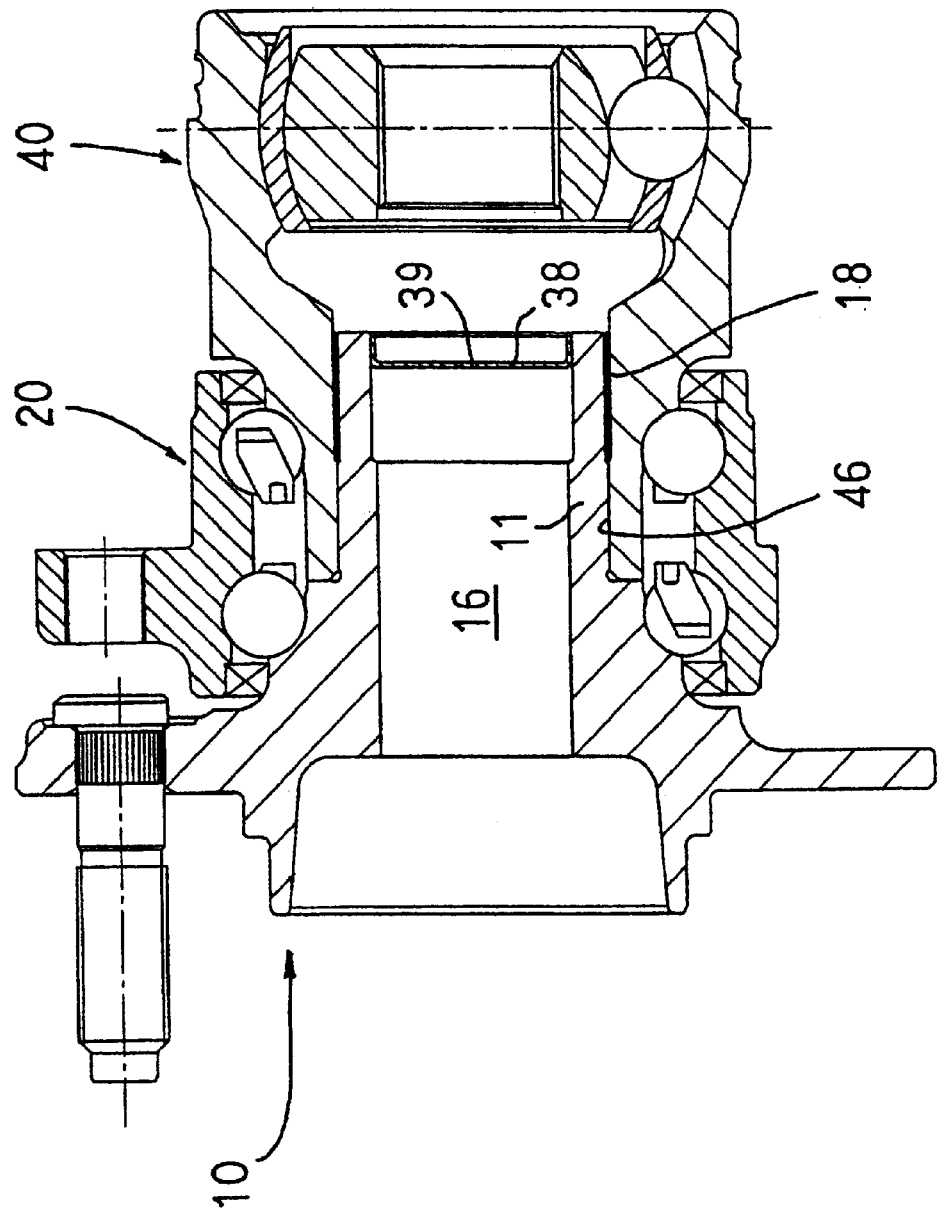

In the embodiments mentioned above, fitting the hub 10 and the outer joint member 40 is structured such that the hub 10 is set to an outer fitting member and the outer joint member 40 is set to an inner fitting member, however, the structure can be inversely made such that the hub 10 is set to an inner fitting member and the outer joint member 40 is set to an outer fitting member. For example, as shown in FIG. 19, the small diameter cylinder portion 11 is formed in the inboard side of the hub 10 and the small diameter cylinder portion 11 is fitted to the through hole 46 of the stem portion 45 of the outer joint member 40. Then, an unevenness formation (refer to FIG. 3) is applied to the outer peripheral surface of the small diameter cylinder portion 11 of the hub as shown by reference numeral 18, and the hub 10 and the outer joint member 40 are plastically connected by expanding the small diameter cylinder portion 11 from the inner diameter side to the outer diameter side by caulking.

Figure 20:
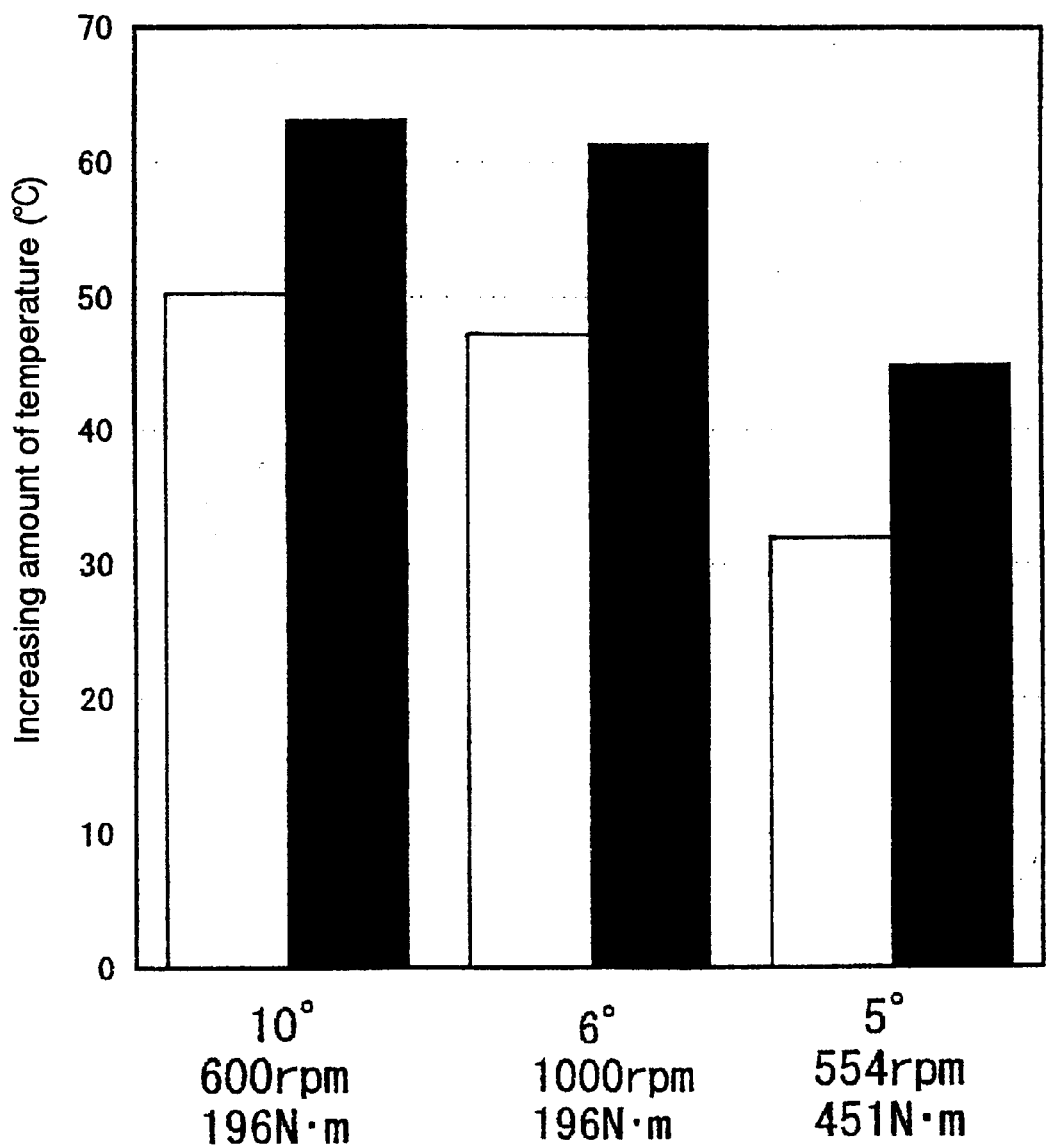
FIG. 20 is a bar graph showing a result of a temperature increasing test.

In the bearing apparatus, since the outer joint member is made hollow so as to communicate the bottom of the mouth portion with outside, it is possible to achieve a light weight and it is possible to restrict a temperature increase by improving a heat radiating condition. FIG. 20 shows a result of a temperature increasing test. FIG. 20 shows an increasing amount of a surface temperature of the outer joint member under three kinds of test conditions with respect to a structure that the stem portion of the outer joint member is solid (a comparative embodiment) and a structure that the stem portion is hollow (an embodiment) by using a bar graph. Black bars show the comparative embodiment and white bars show the embodiment, however, it is known that the temperature increase is about 10 to 15° C. lower in the embodiment under any test conditions.

Next, embodiments shown in FIGS. 21 to 27 are structured such that the hub 10 is set to an inner fitting member and the inner race 80 is set to an outer fitting member. A basic structure thereof will be shown by applying the same reference numerals to the substantially same elements as those of the embodiment shown in FIG. 1, and an overlapping explanation will be omitted.

The bearing apparatus for the wheel has the hub 10, the inner race 80, the outer race 21 and the rolling elements 29 as main constituting elements. The hub 10 has an axial through hole 16 in an axial core portion, and the inboard side end portion forms the small diameter cylinder portion 11. The inner race 80 is a ring-like member independent from the hub 10, and is fitted to the outer peripheral surface of the small diameter cylinder portion 11 of the hub 10. The inboard side inner raceway 42 is formed in the outer peripheral portion of the inner race 80, and the end surface 23 in the outboard side of the inner race 80 is brought into contact with the shoulder surface 13 of the small diameter cylinder portion 11 of the hub 10, whereby the size between the inner raceways 12, 42 is defined.

Figure 21:
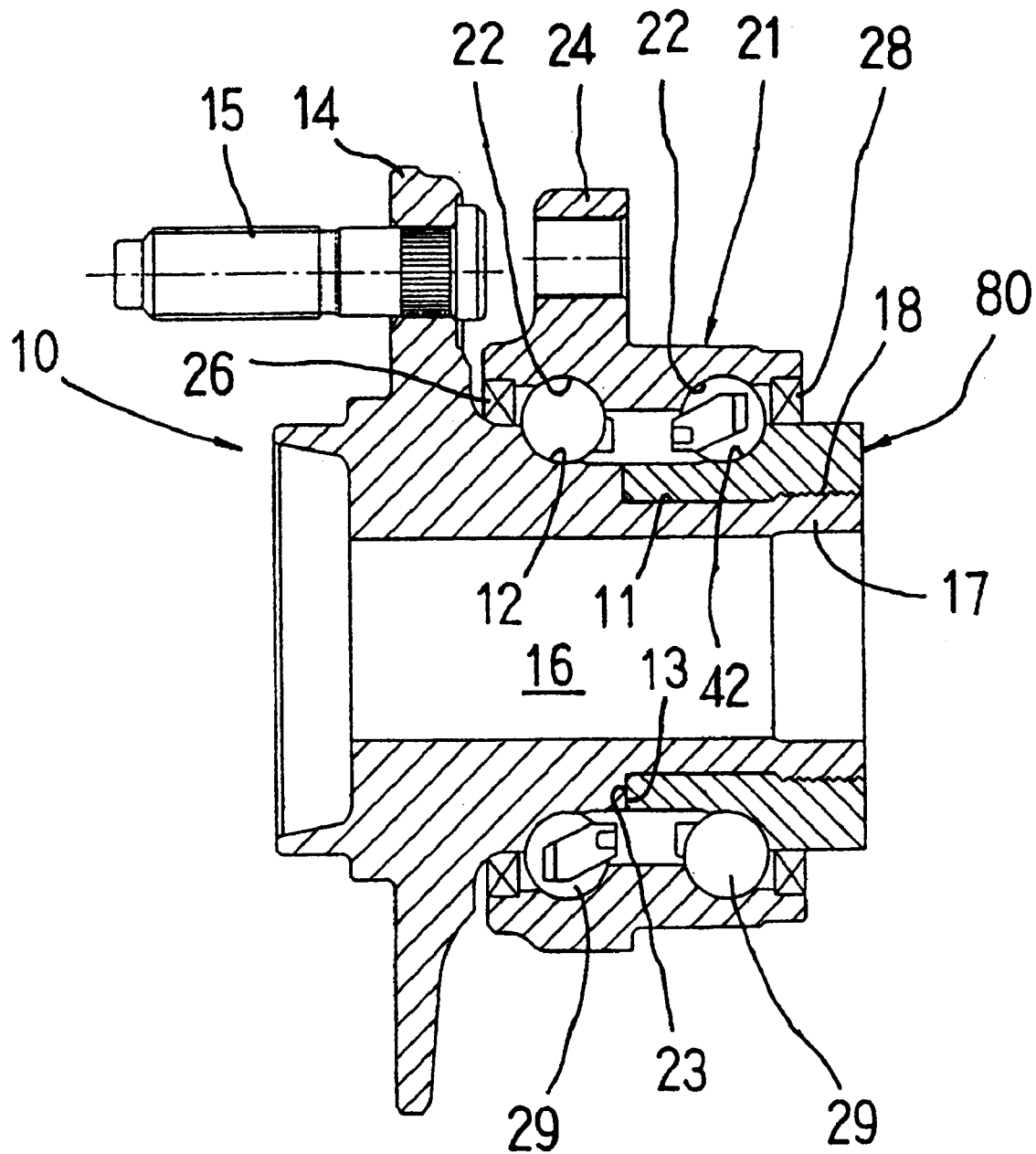
FIG. 21 is a vertical cross sectional view of a bearing apparatus for a wheel showing an embodiment.

FIG. 21 shows an embodiment structured such that the inner race 80 is fitted to the small diameter cylinder portion 11 of the hub 10 having an uneven portion 18 formed on an outer peripheral surface of the end portion. Then, by expanding a portion of the small diameter cylinder portion 11 in which the uneven portion 18 is formed, from an inner diameter side to an outer diameter side as shown by reference numeral 17, the uneven portion 18 eats into the inner peripheral surface of the inner race 80, thereby plastically connecting the hub 10 to the inner race 80.

Figure 22:
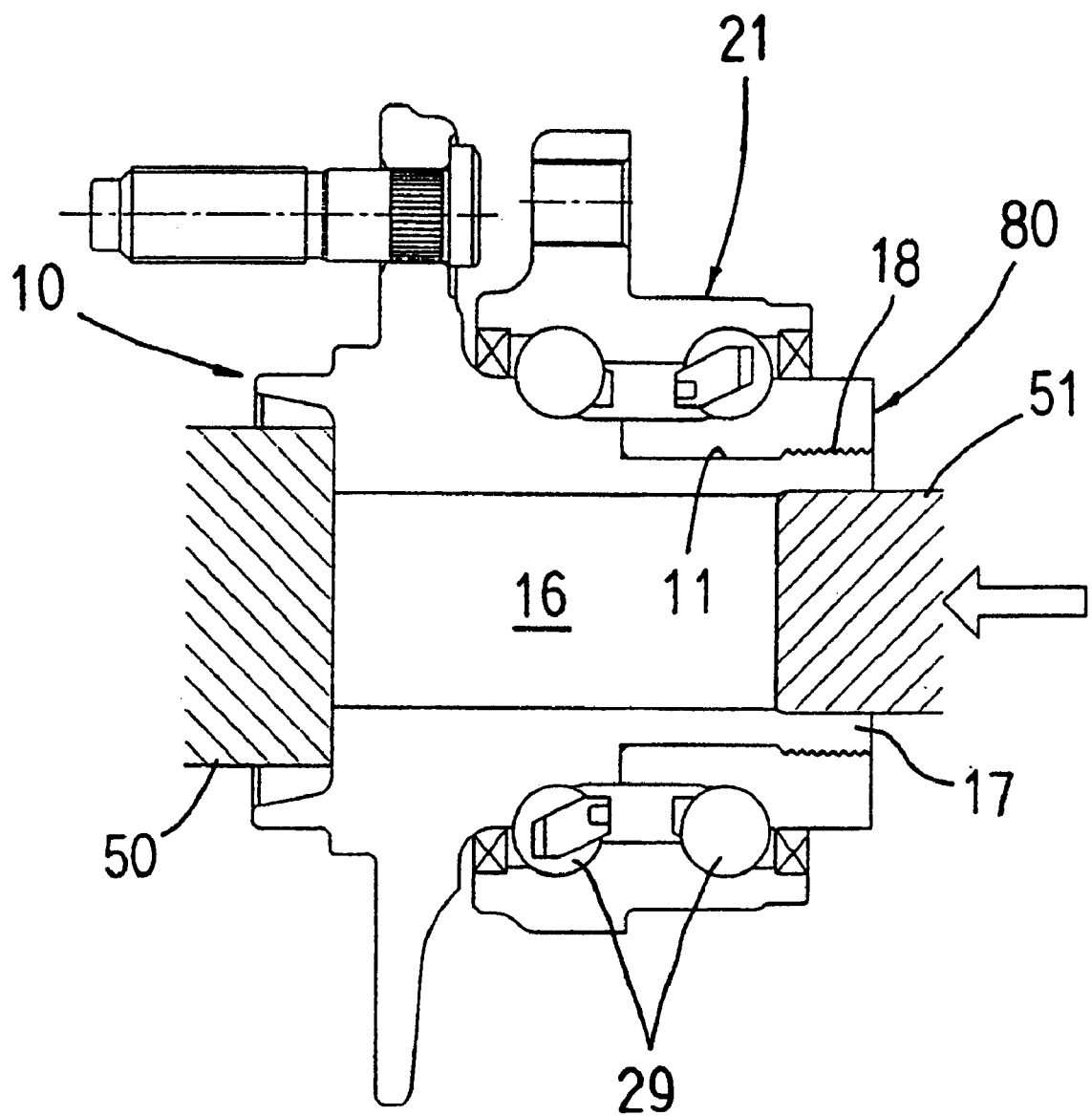
FIG. 22 is a vertical cross sectional view for explaining an expanding process.

In the case that the expansion mentioned above is performed by a press formation, for example, as shown in FIG. 22, the portion of the small diameter cylinder portion 11 having the uneven portion 18 formed is expanded from the inner diameter side to the outer diameter side by moving a caulking jig 51 having an outer diameter greater than an inner diameter of the through hole 16 of the hub 10 in a direction of an arrow so as to pressure fit into the through hole 16 in a state of supporting the inboard side end portion of the hub 10 by means of a backup jig 50. A portion of the small diameter cylinder portion 11 caulked by the expansion, that is, a caulked portion is denoted by reference numeral 17. Accordingly, the uneven portion 18 of the small diameter cylinder portion 11 eats into the inner peripheral surface of the inner race 80, whereby the hub 10 and the inner race 80 are plastically connected.

In this case, an illustration is omitted, however, it is possible to perform an accurate caulking process by employing a jig for restricting the outer diameter of the inner race 80 when expanding the uneven portion 18 from the inner diameter side by caulking, on the contrary, employing a jig for restricting the inner diameter of the small diameter cylinder portion 11 when contracting the inner race 80 from the outer diameter side by caulking.

Figure 23:
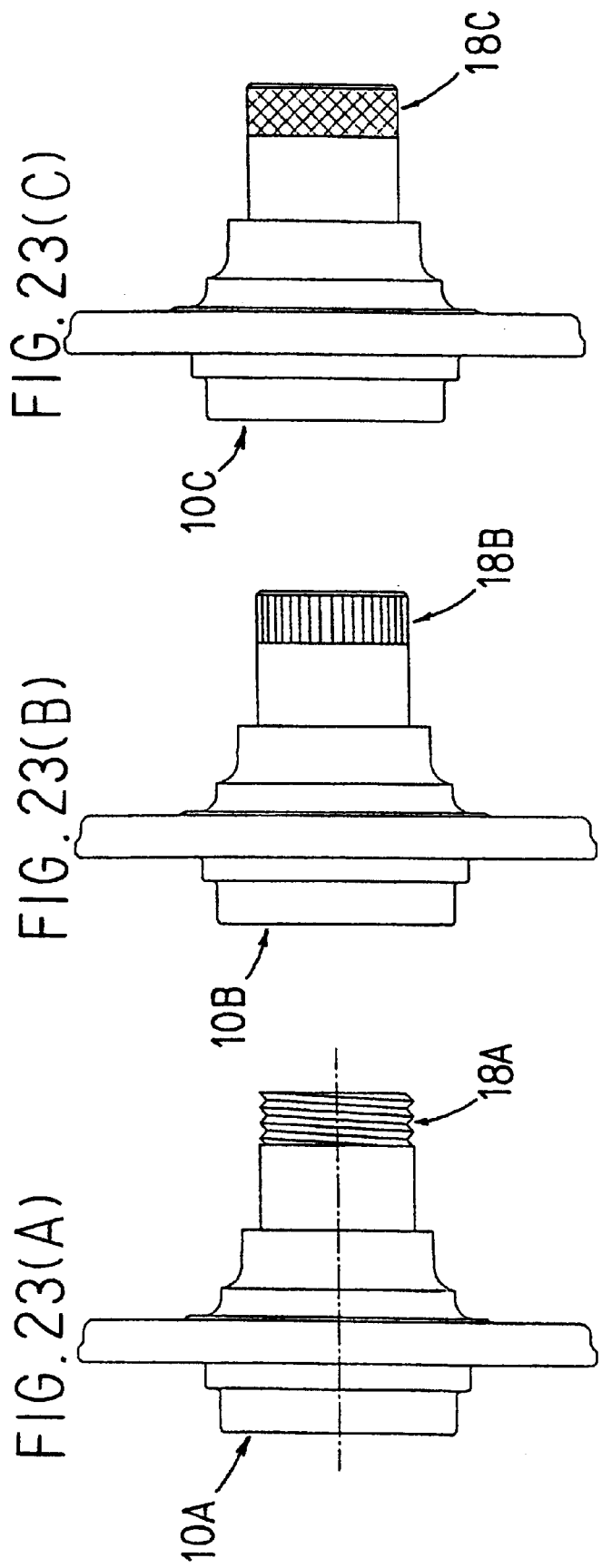
FIG. 23 is a front elevational view of a hub showing a particular embodiment of an uneven portion.

Particular embodiments of the uneven portion 18 can be exemplified as shown in FIG. 23. FIG. 23A shows a screw 18A, FIG. 23B shows a serration 18B and FIG. 23C shows a double-cut knurled shape 18C, respectively. Process conditions such as a shape, a size or the like of the screw, the serration, the double-cut knurled shape or the like can be variously designed according to required item and level. Further, a thickness of the small diameter cylinder portion 11 of the hub 10 and the inner race 80 can be variously designed according to required item and level.

A hardness of the uneven portion 18 becomes higher than that of the other portions due to a work hardening caused by the unevenness formation, however, it is possible to apply a hardening treatment according to a heat treatment. According to this treatment, since an elastic deformation after caulking by the expansion or the contraction is reduced, it is possible to increase a loosening prevention effect.

Figure 24:
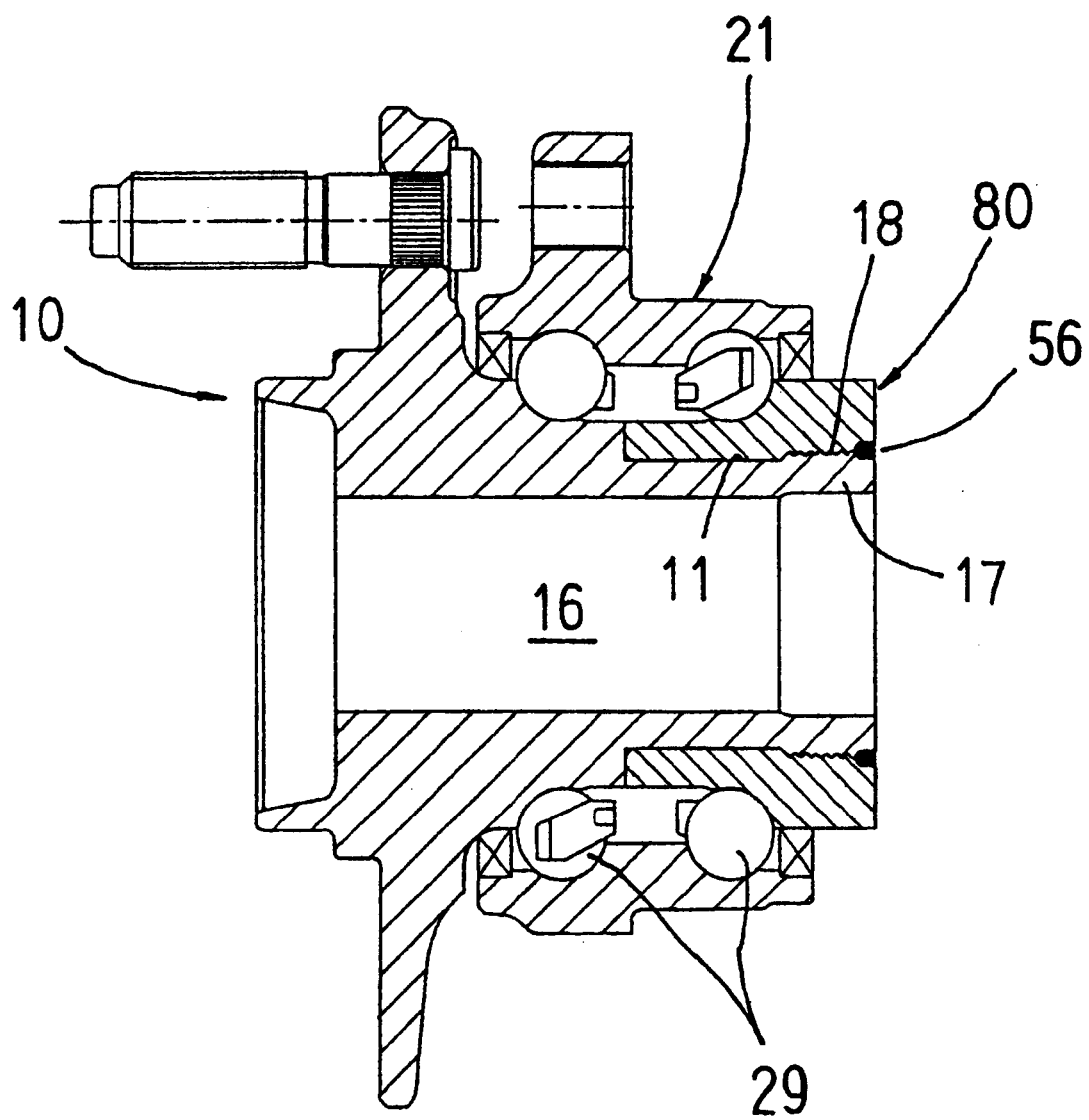
FIGS. 24 to 28 are vertical cross sectional views of a bearing apparatus for a wheel showing embodiments.

An embodiment shown in FIG. 24 is structured such that the hub 10 and the inner race 80 are securely connected by welding both elements at an end portion of the caulked portion 17 as shown by reference numeral 56. In this case, welding the fitted portion between the hub 10 and the inner race 80 all around the periphery is exemplified.

Figure 25:
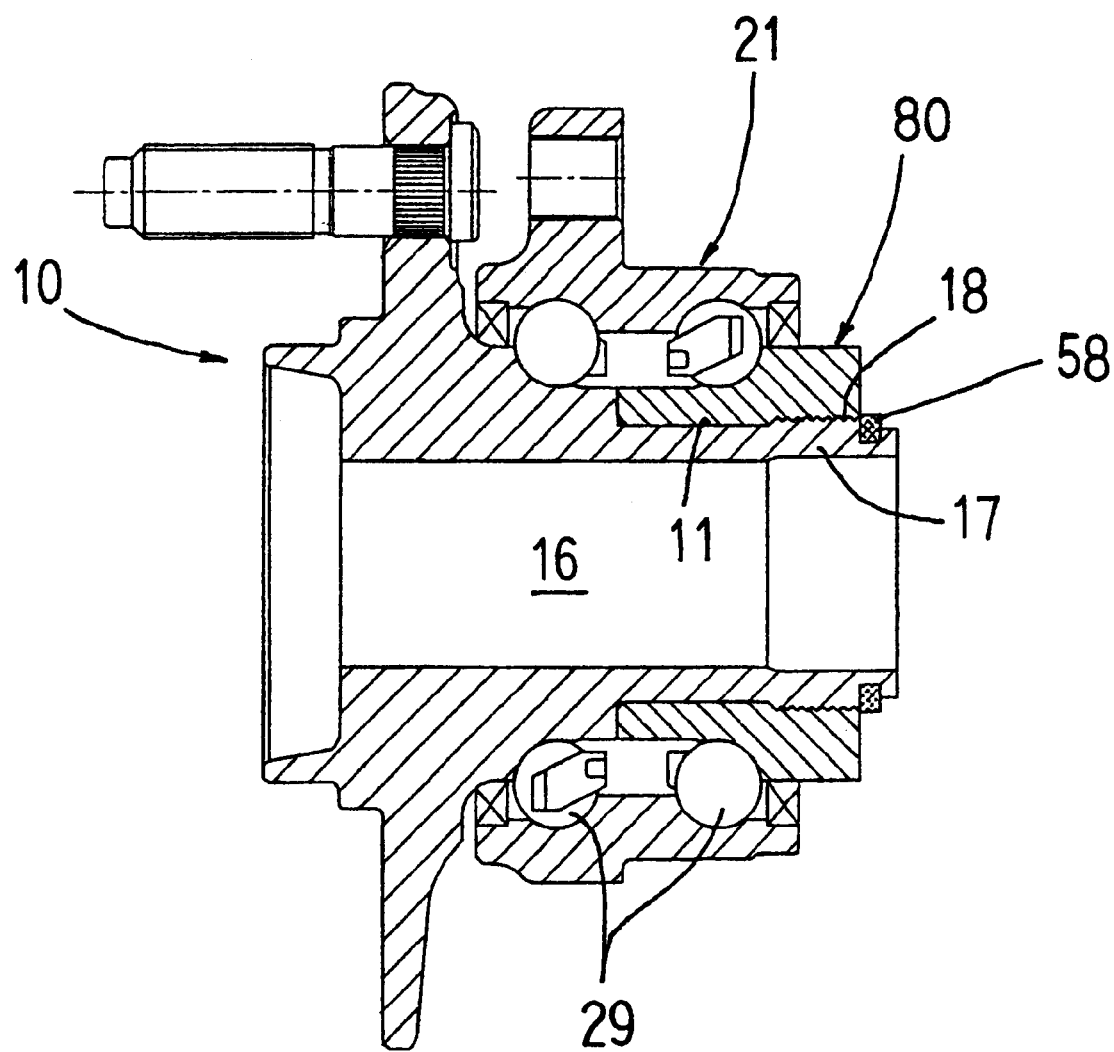

An embodiment shown in FIG. 25 is structured such that the axial end of the hub 10 is protruded from the inner race 80 and the clip 58 is attached to an annular groove formed in an outer peripheral portion thereof, whereby the hub 10 and the inner race 80 are fixed in an axial direction so as to prevent come-out of the inner race 80.

Figure 26:
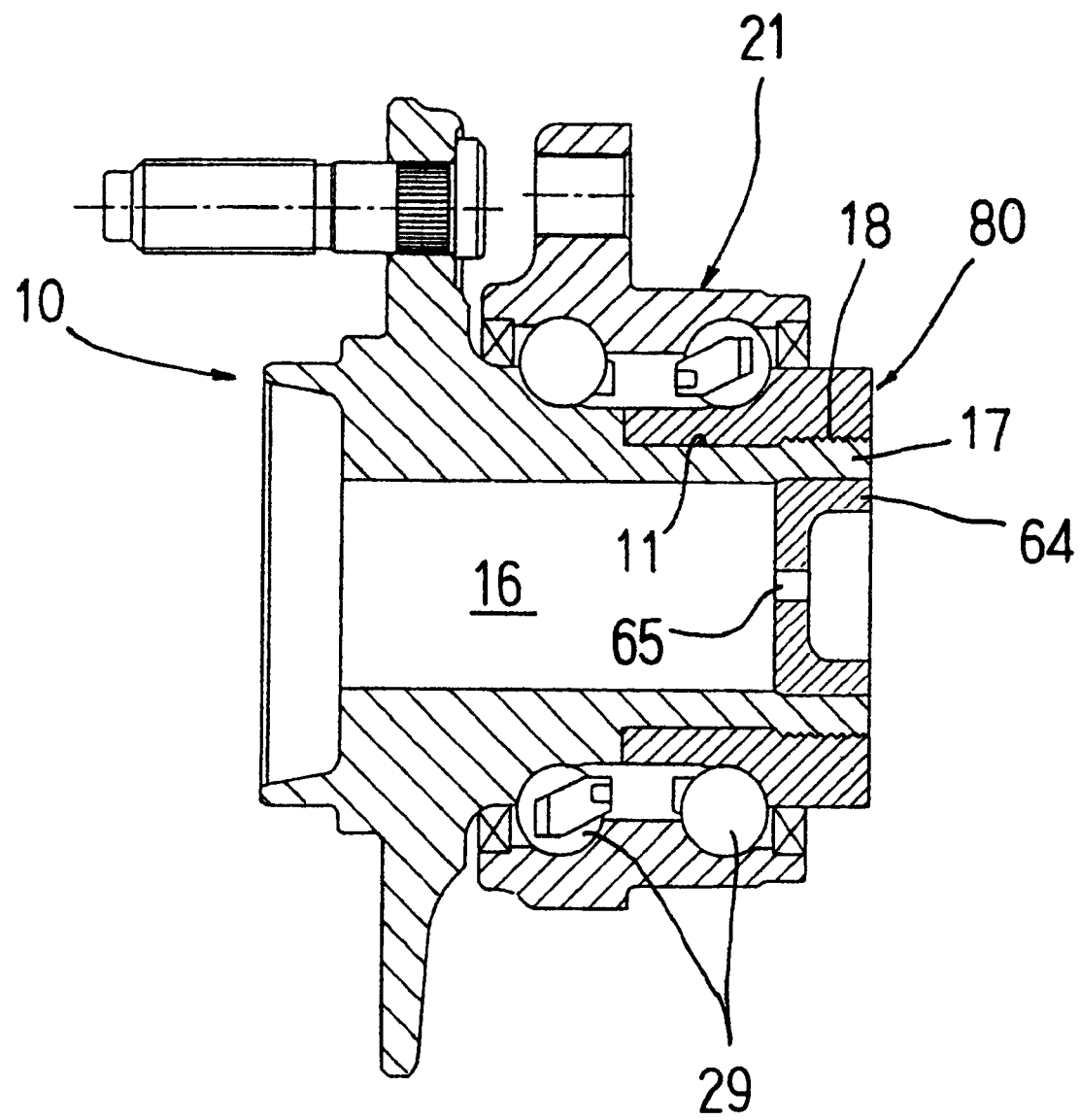

An embodiment shown in FIG. 26 is structured such that a reinforcing member 64 for reinforcing and stabilizing the caulked portion 17 is pressure inserted to the caulked portion 17 of the hub 10. The reinforcing member 64 serves to compensate for the reduction of rigidity of the caulked portion 17 after expanding, and may be formed in a solid short shaft shape in addition to the cylindrical shape with a bottom as illustrated. In any cases, in the case that the hub 10 has the through hole 16 extending all along the length, a small hole 65 extending through the reinforcing member 64 in an axial direction is provided so as to improve ventilation, whereby it is possible to restrict the temperature increase of the hub 10.

Figure 27:
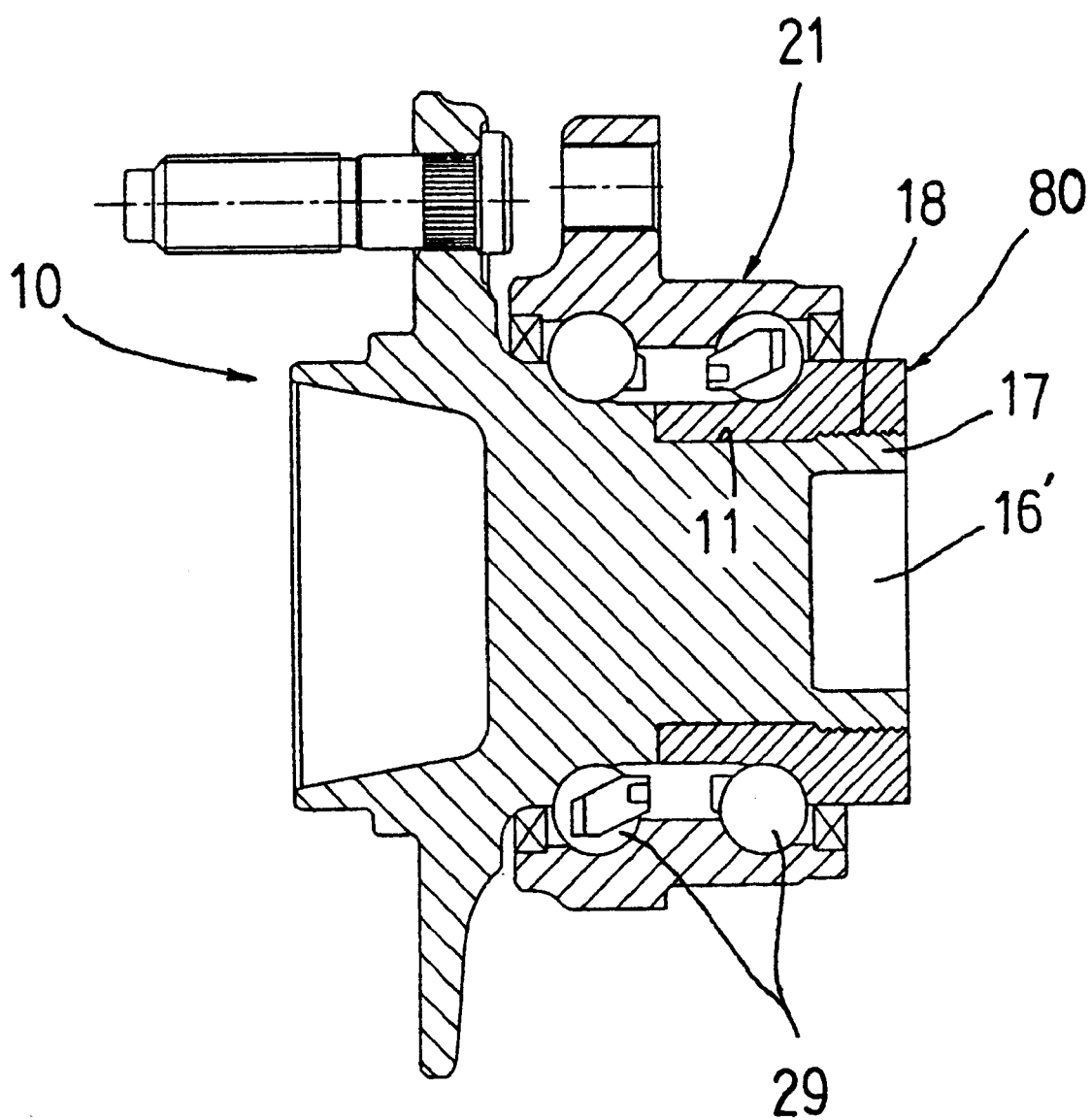

An embodiment shown in FIG. 27 is structured such that the hub 10 is made solid so as to increase a rigidity. In this case, as shown by reference numeral 16', a portion corresponding to the uneven portion 18 of the hub 10 is made hollow so as to make it possible to expand from the inner diameter side.

Next, a description will be given of an embodiment of setting the hub 10 to the outer fitting member and the inner race 80 to the inner fitting member with reference to FIGS. 28 to 34.

Figure 28:
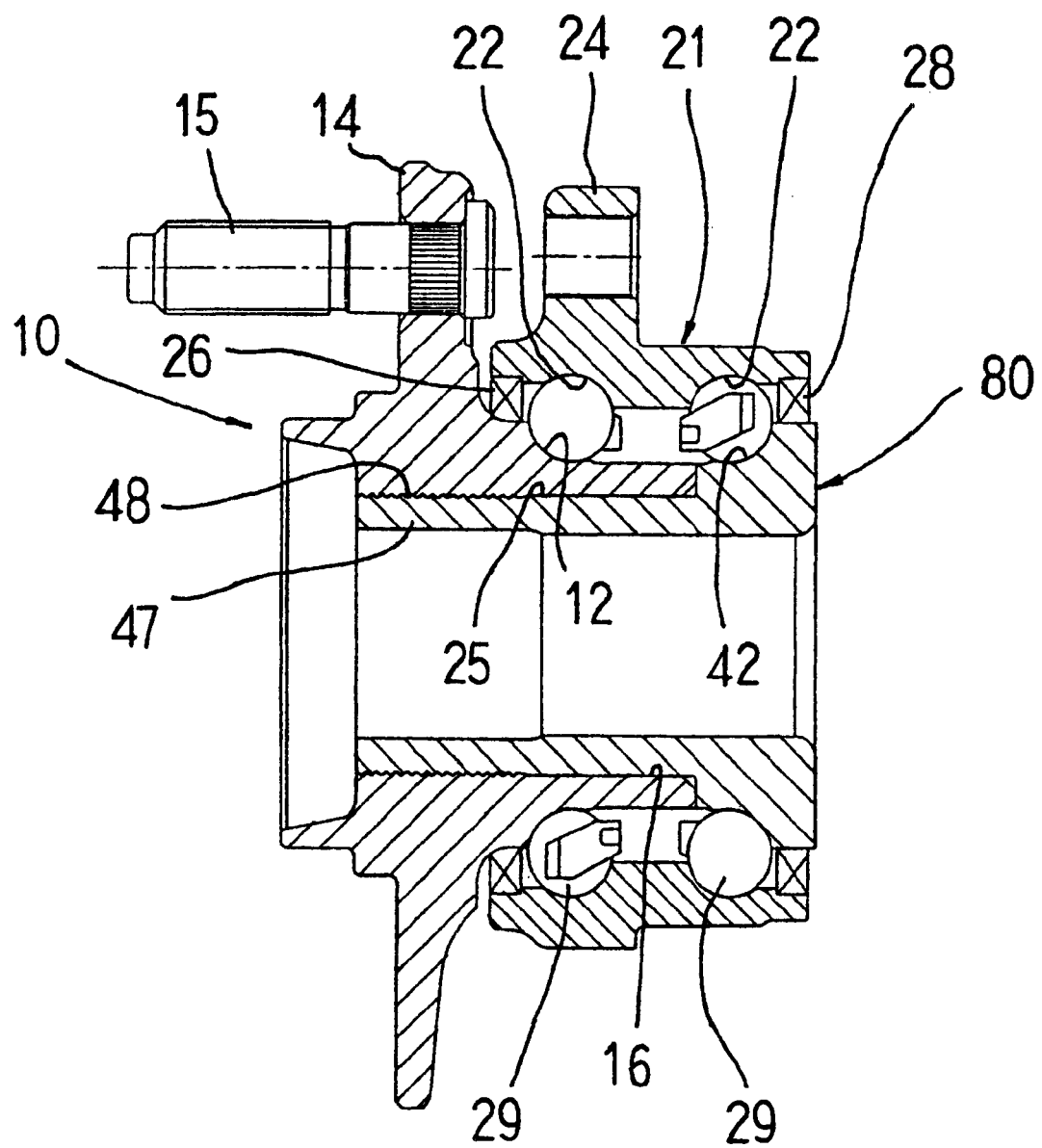

FIG. 28 shows an embodiment structured such that a small diameter cylinder portion 25 is formed by extending the outboard side of the inner race 80 and the inner diameter cylinder portion 25 is pressure fitted to the through hole 16 of the hub 10 so as to fit the both elements. In this case, the unevenness portion 48 is formed on an outer peripheral surface of the outboard side end portion of the small diameter cylinder portion 25. Then, the hub 10 and the inner race 80 are plastically connected by expanding the small diameter cylinder portion 25 from the inner side to the outer diameter side as shown by reference numeral 47.

Figure 29:
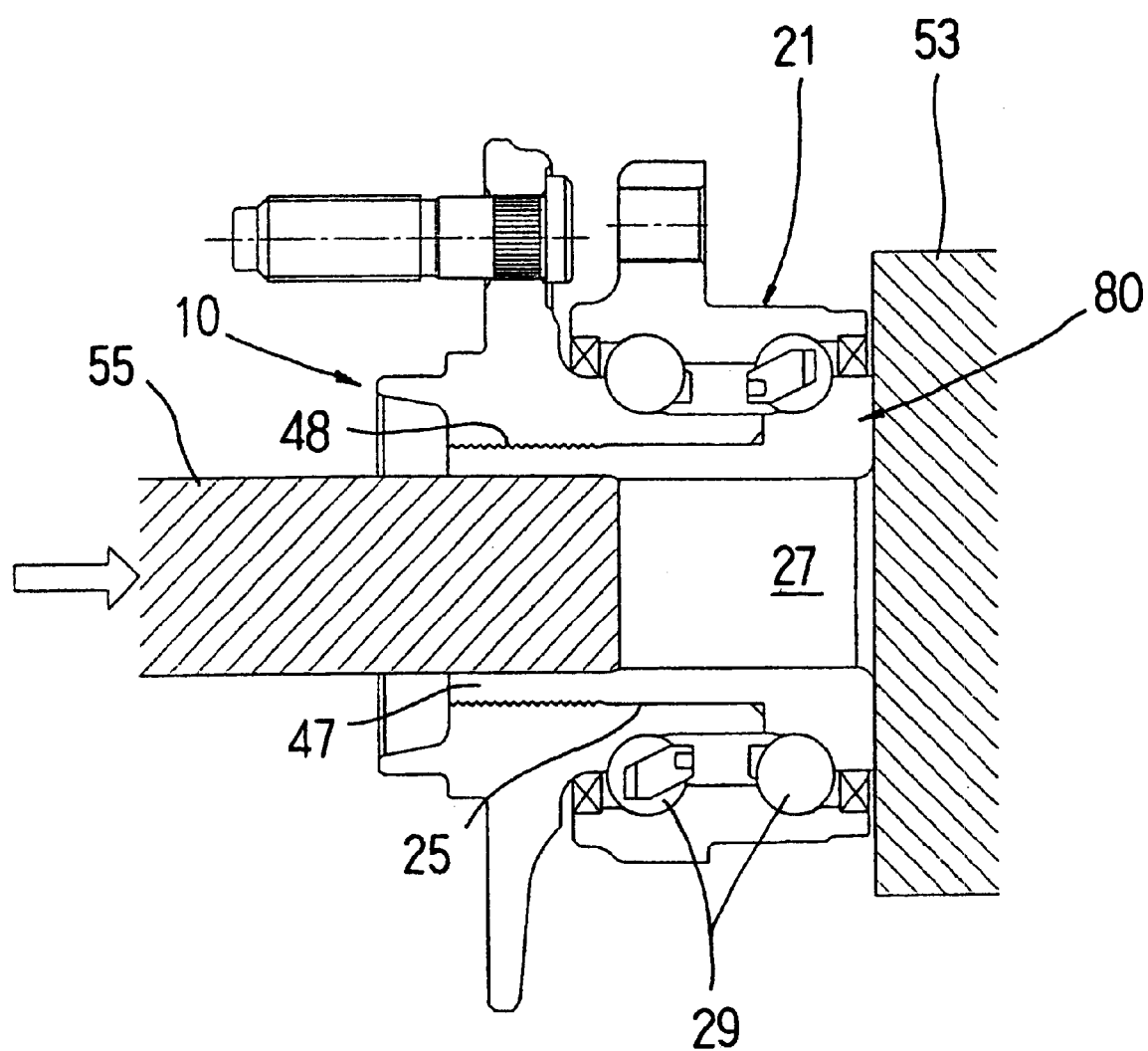
FIG. 29 is a vertical cross sectional view for explaining an expanding process.

In the case that the expansion mentioned above is performed by a press formation, for example, as shown in FIG. 29, the portion of the small diameter cylinder portion 25 having the uneven portion 48 formed is expanded from the inner diameter side to the outer diameter side by moving a caulking jig 55 having an outer diameter greater than an inner diameter of the through hole 27 of the inner race 80 in a direction of an arrow so as to pressure fit into the through hole 27 in a state of supporting the inboard side end portion of the inner race 80 by means of a backup jig 53. A portion of the small diameter cylinder portion 25 caulked by the expansion, that is, a caulked portion is denoted by reference numeral 47. Accordingly, the uneven portion 48 of the small diameter cylinder portion 25 eats into the inner peripheral surface of the through hole 16 of the hub 10, whereby the hub 10 and the inner race 80 are plastically connected.

In this case, an illustration is omitted, however, it is possible to perform an accurate caulking process by employing a jig for restricting the outer diameter of the hub 10 when expanding the uneven portion 48 from the inner diameter side by caulking, on the contrary, employing a jig for restricting the inner diameter of the small diameter cylinder portion 25 when contracting the hub 10 from the outer diameter side by caulking.

Figure 30A:
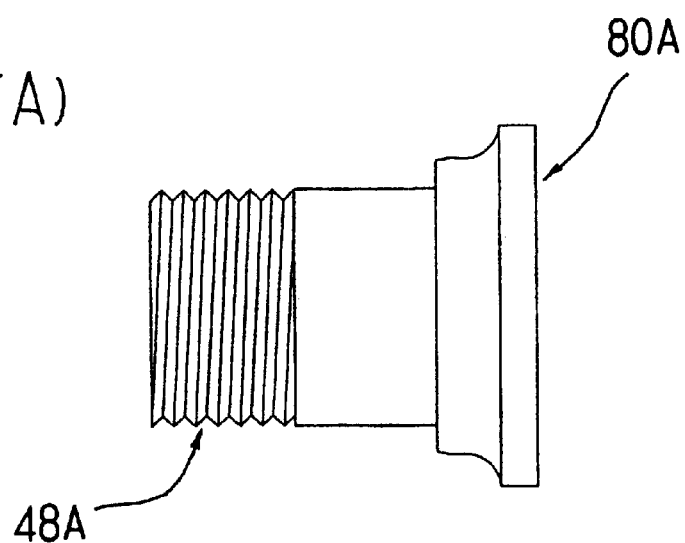
FIG. 30 is a front elevational view of an inner race showing a particular embodiment of an uneven portion.
Figure 30B:
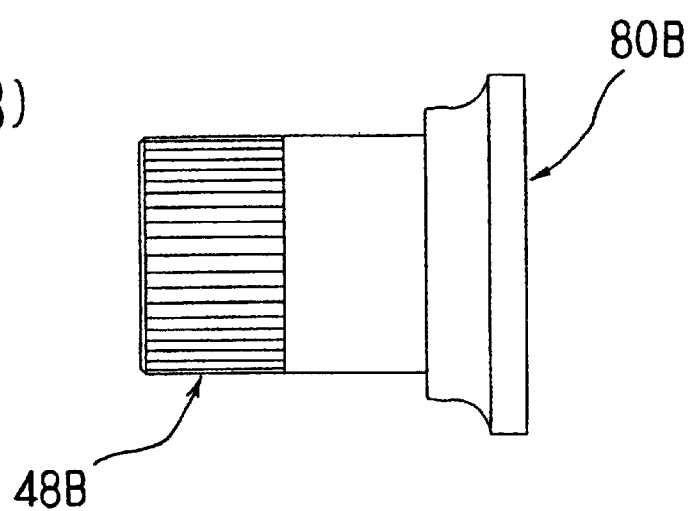
Figure 30C:
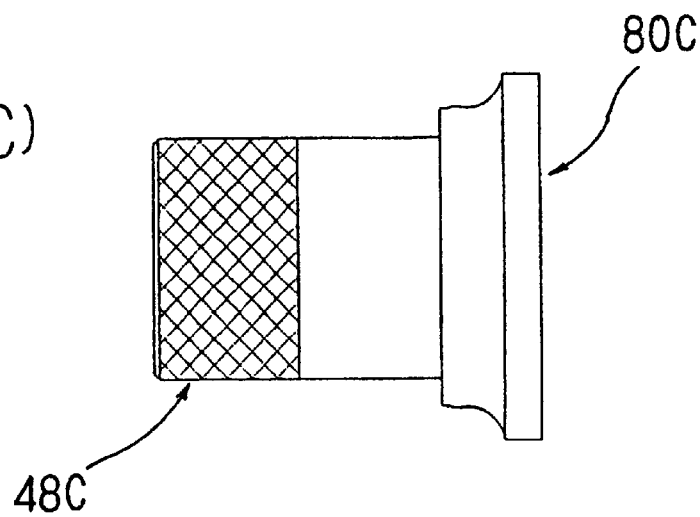

Particular embodiments of the uneven portion 48 can be exemplified as shown in FIG. 30. FIG. 30A shows a screw 48A, FIG. 30B shows a serration 48B and FIG. 30C shows a double-cut knurled shape 48C, respectively. Process conditions such as a shape, a size or the like of the screw, the serration, the double-cut knurled shape or the like can be variously designed according to required item and level. Further, a thickness of the small diameter cylinder portion 25 of the inner race 80 and the hub 10 can be variously designed according to required item and level.

Figure 31:
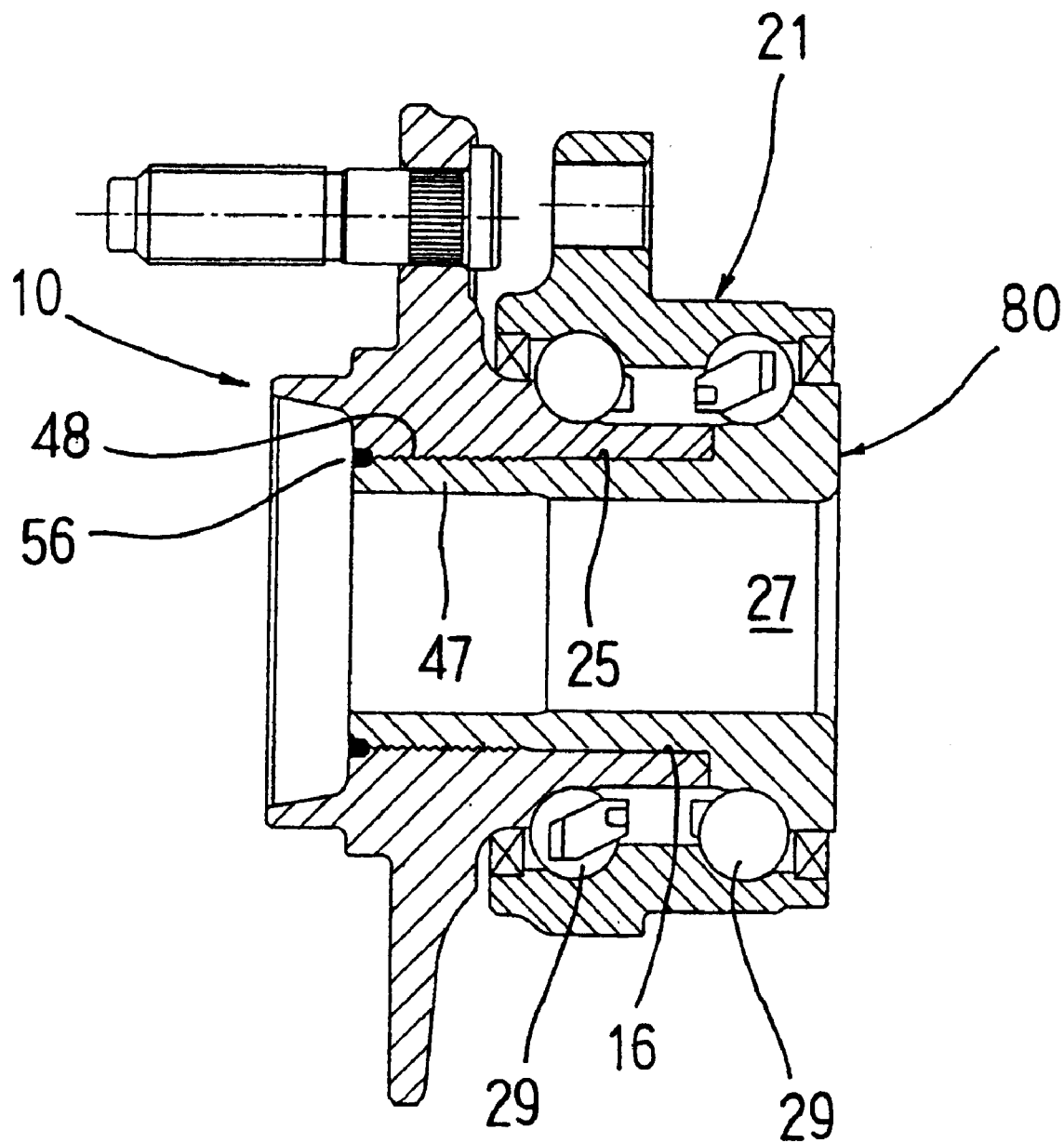
FIGS. 31 to 35 are vertical cross sectional views of a bearing apparatus for a wheel showing embodiments.

An embodiment shown in FIG. 31 is structured such that the hub 10 and the small diameter cylinder portion of the inner race 80 are securely connected by welding both elements at an end portion of the caulked portion 47 as shown by reference numeral 56. In this case, welding the caulked portion 47 between the hub 10 and the small diameter cylinder portion 25 of the inner race 80 all around the periphery is exemplified.

Figure 32:
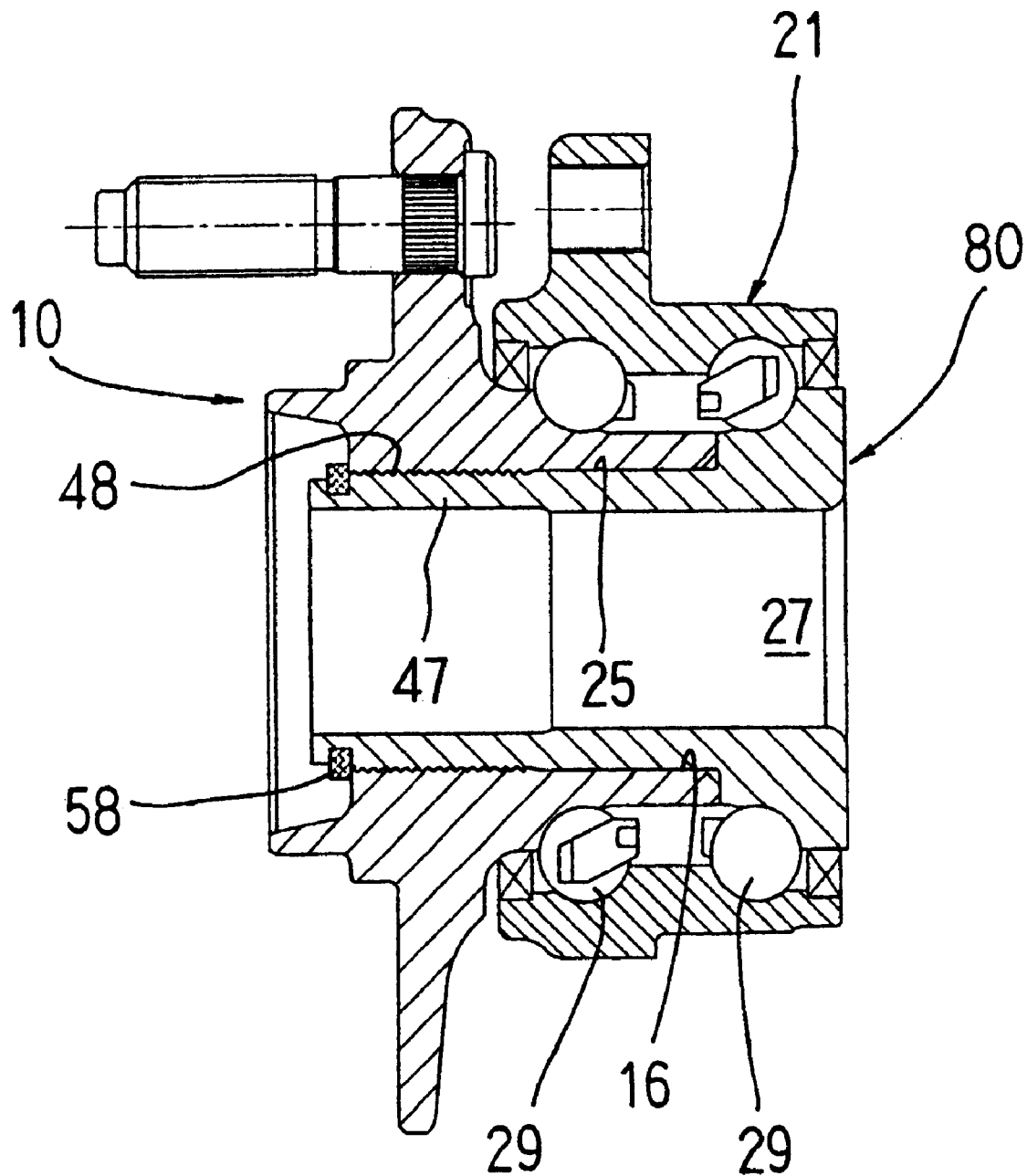

An embodiment shown in FIG. 32 is structured such that the axial end of the small diameter cylinder portion 25 of the inner race 80 is protruded from the hub 10 and the clip 58 is attached to an annular groove formed in an outer peripheral portion thereof, whereby the hub 10 and the inner race 80 are fixed in an axial direction so as to prevent come-out of the inner race 80.

Figure 33:
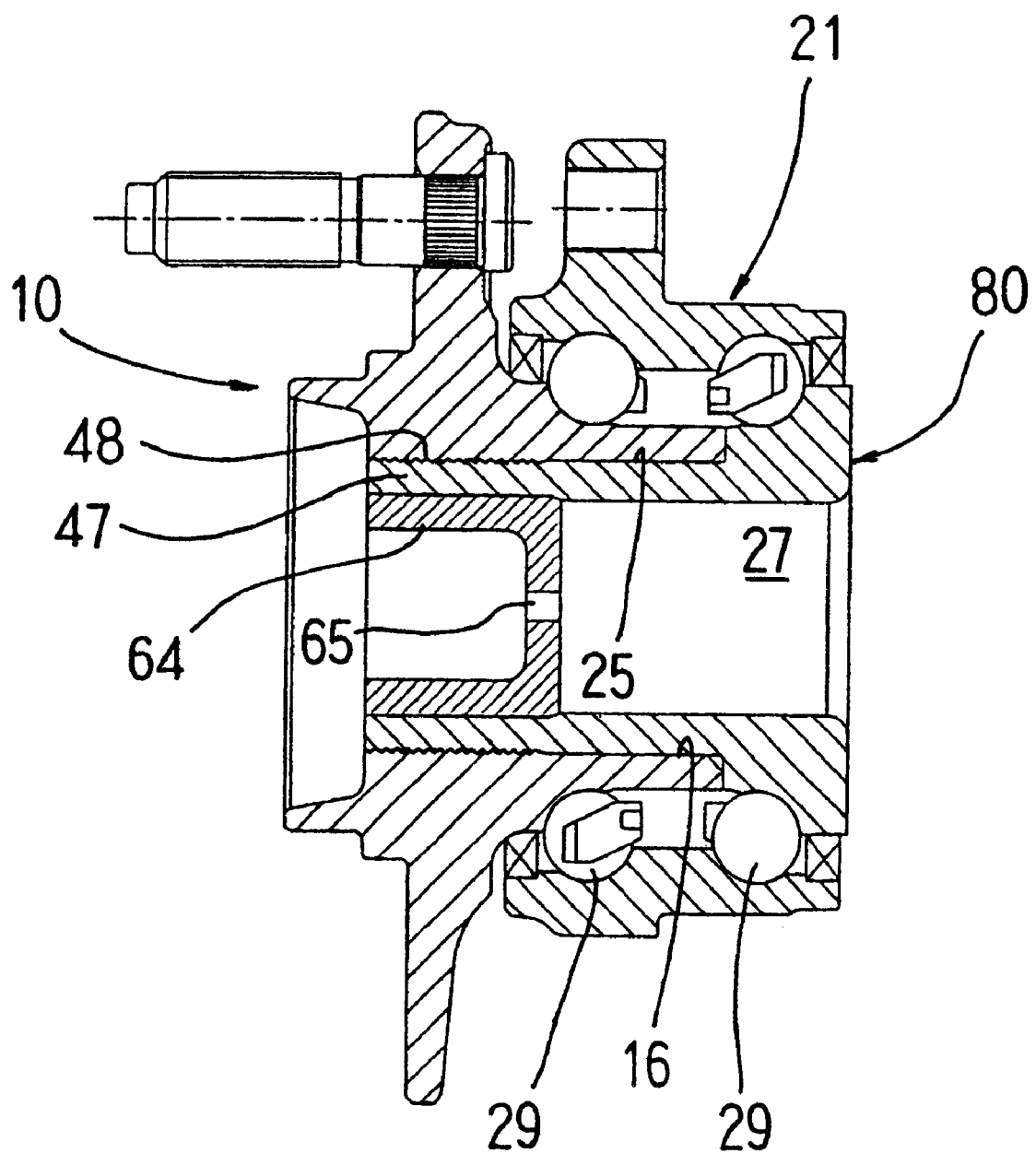

An embodiment shown in FIG. 33 is structured such that a reinforcing member 64 for reinforcing and stabilizing the caulked portion 47 is pressure fitted to the caulked portion 47 of the small diameter cylinder portion 25 of the inner race 80. The reinforcing member 64 serves to compensate for the reduction of rigidity of the caulked portion 47 after expanding, and may be formed in a solid short shaft shape in addition to the cylindrical shape with a bottom as illustrated. In any cases, in the case that the inner race 80 has the through hole 27 extending all along the length, a small hole 65 extending through in an axial direction is provided so as to improve ventilation, whereby it is possible to restrict the temperature increase of the inner race 80.

Figure 34:
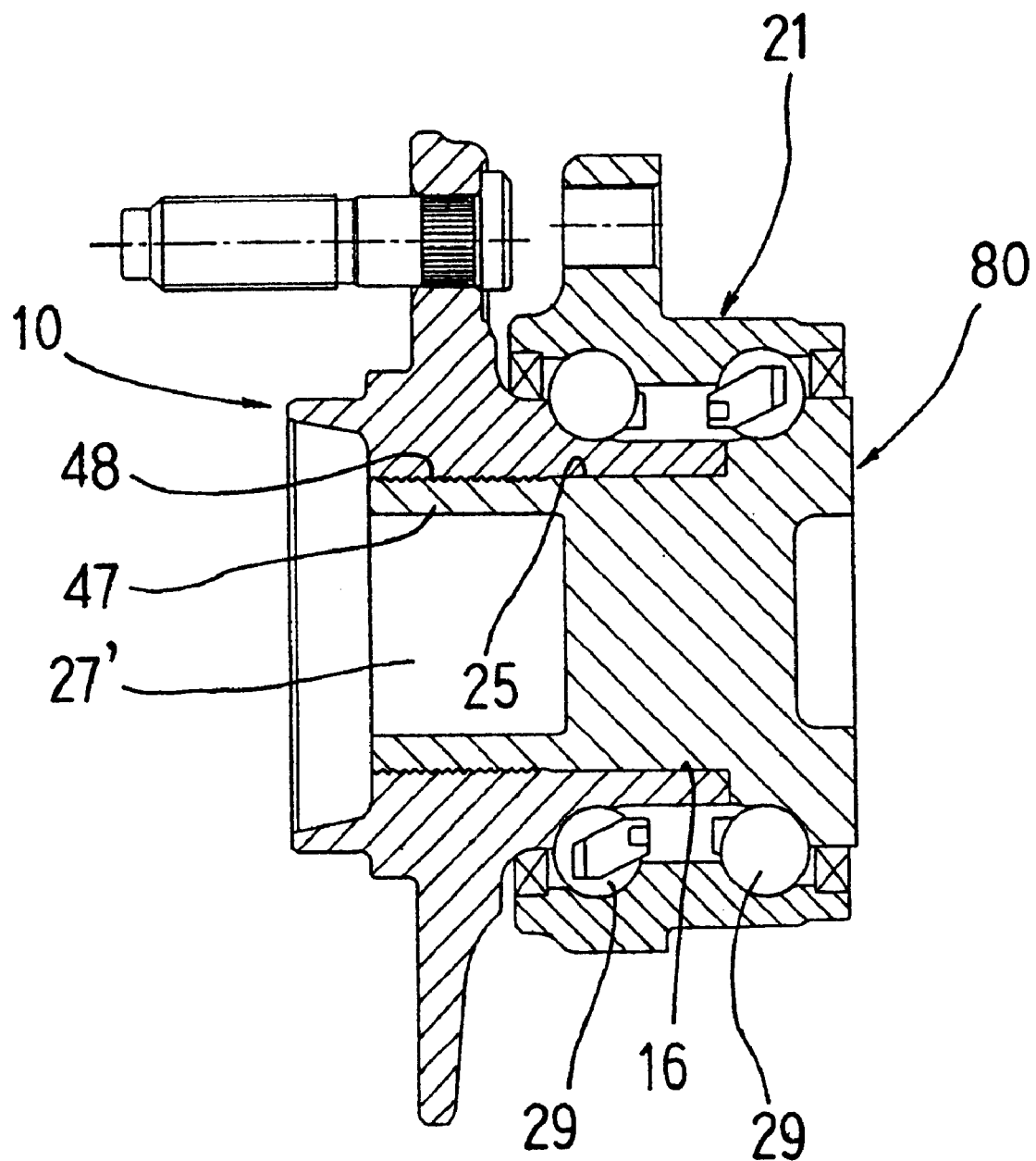

An embodiment shown in FIG. 34 is structured such that the inner race 80 is made solid so as to increase a rigidity. In this case, a recess portion 27' is provided in a portion corresponding to the uneven portion 48 of the inner race 80 so as to make it possible to expand from the inner diameter side.

Figure 35:
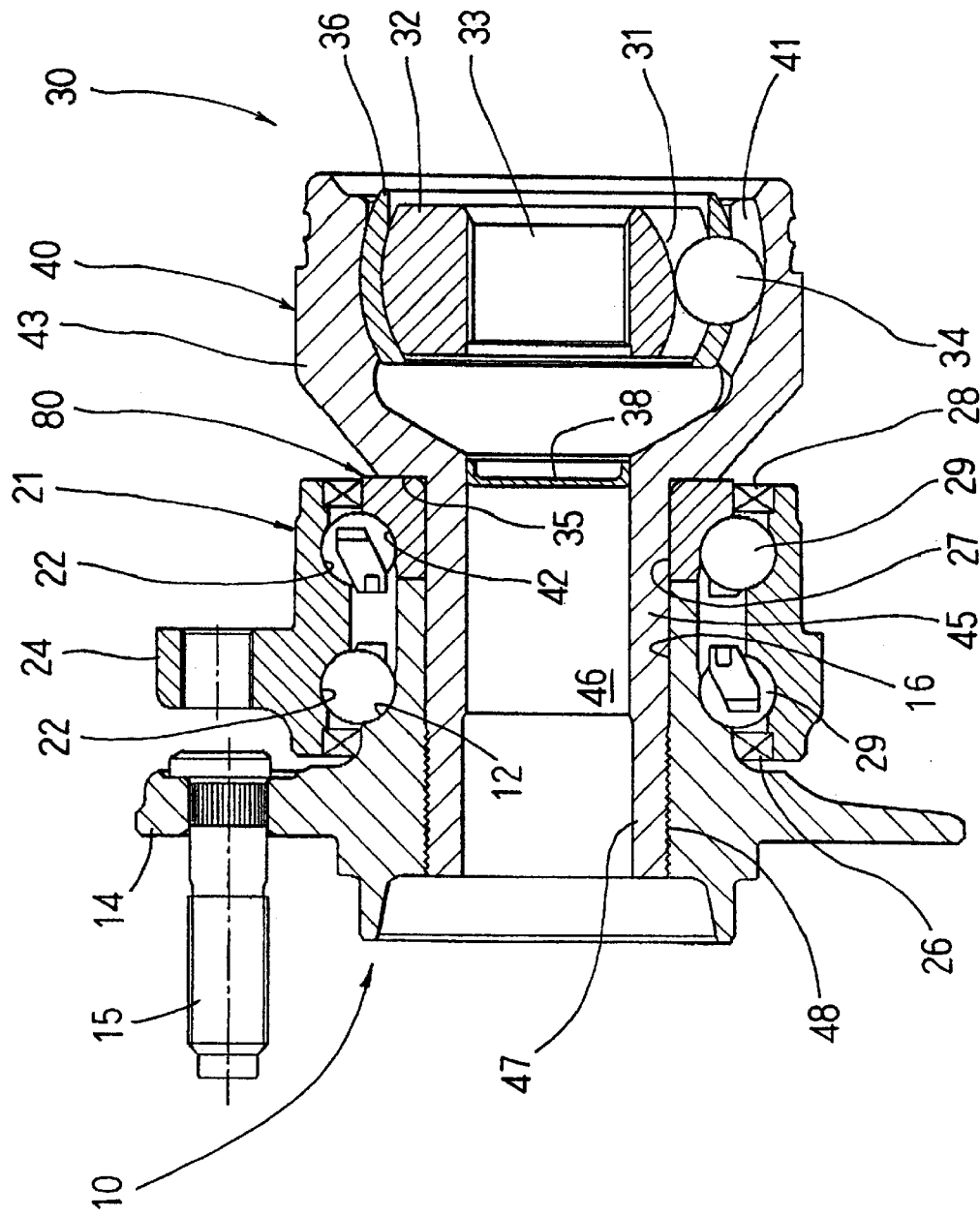
Figure 36A:
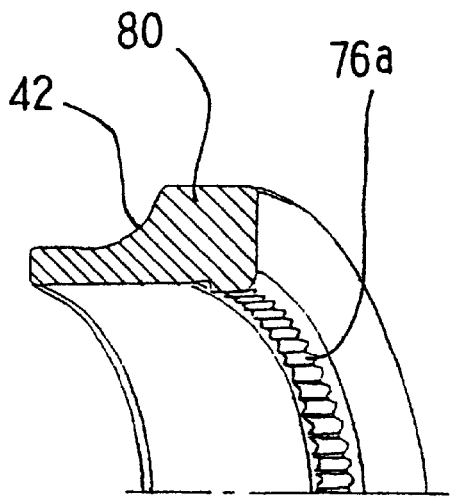
FIG. 36A is a partly broken perspective view of an inner race.
Figure 36C:
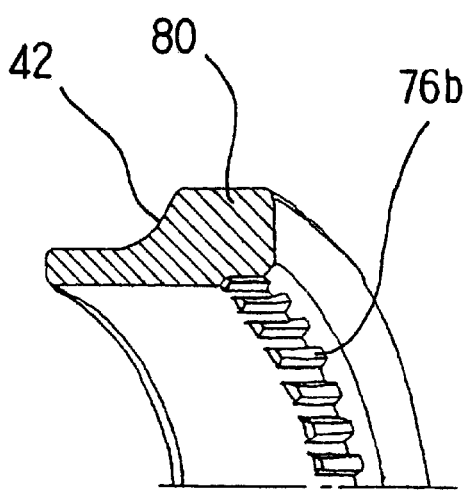
FIG. 36C is a partly broken perspective view of the inner race and FIG. 36D is a partly vertical cross sectional view of a bearing apparatus for a wheel employing the inner race shown in FIG. 36C.
Figure 36B:
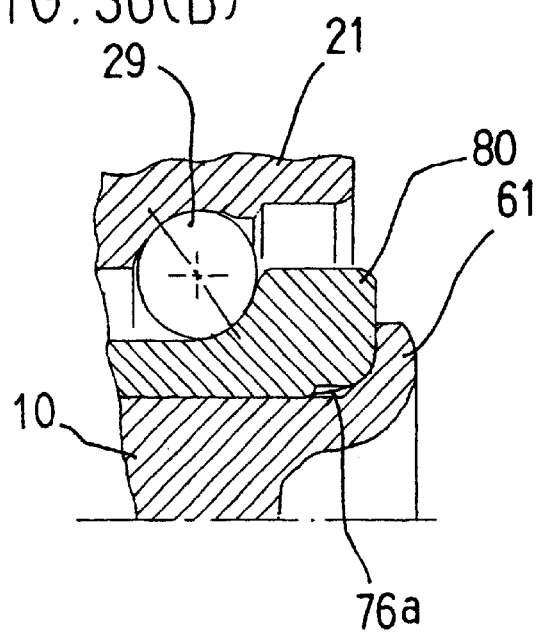
FIG. 36B is a partly vertical cross sectional view of a bearing apparatus for a wheel employing the inner race shown in FIG. 36A.
Figure 36D:
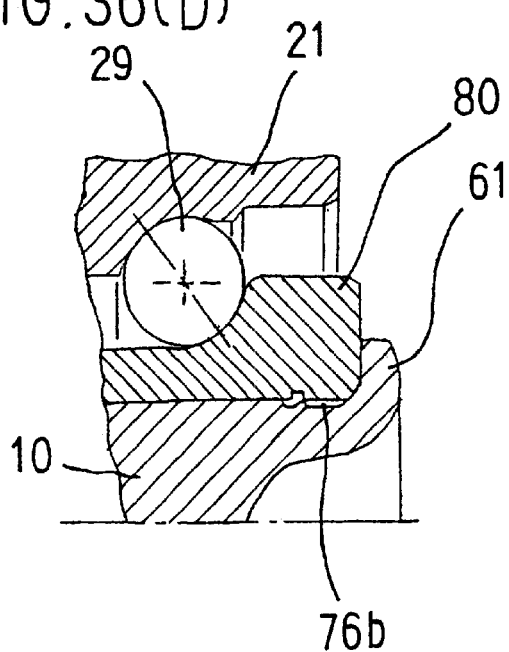

FIG. 35 shows an embodiment applied to an apparatus for a driving wheel, in which the hub 10 and the inner race 80 are fitted to the outer joint member 40 of the constant velocity universal joint 30. Accordingly, in this embodiment, the outer joint member 40 corresponds to an inner fitting member, and the hub 10 and the inner race 80 correspond to an outer fitting member. In this case, in FIG. 35, the same reference numerals are attached to the substantially same elements or portions as those of the embodiment shown in FIG. 1 and an overlapping description will be omitted.

The outer joint member 40 is constituted by the mouth portion 43 and the stem portion 45, and the shoulder surface 35 perpendicular to the axis forms a boundary between the both elements. The hub 10 and the inner race 80 are fitted to the cylindrical outer peripheral surface of the stem portion 45 of the outer joint member 40. The unevenness portion 48 such as a screw, a serration, a double-cut knurled shape or the like which is already mentioned with reference to FIGS. 23 and 30 is formed in a part of the area fitted to the hub 10 in the axial end side of the stem portion 45. Then, the stem portion 45 and the hub 10 are plastically connected by expanding the stem portion 45 as shown by reference numeral 47 in a state of pressure fitting the stem portion 45 to the through hole 27 of the inner race 80 and the through hole 16 of the hub 10 and gripping the inner race 80 between the end surface of the hub and the shoulder surface 35 of the outer joint member 40.

The bearing apparatus for the wheel shown in FIG. 44 is structured such that the inner race 80 is fixed to the hub 10 by forming a small diameter step portion 59 on an outer peripheral surface of the inboard side end portion of the hub 10, pressure fitting the independent inner race 80 with a suitable interference and caulking the inboard side end portion 61 of the hub 10 as shown in the drawing.

Figure 44B:
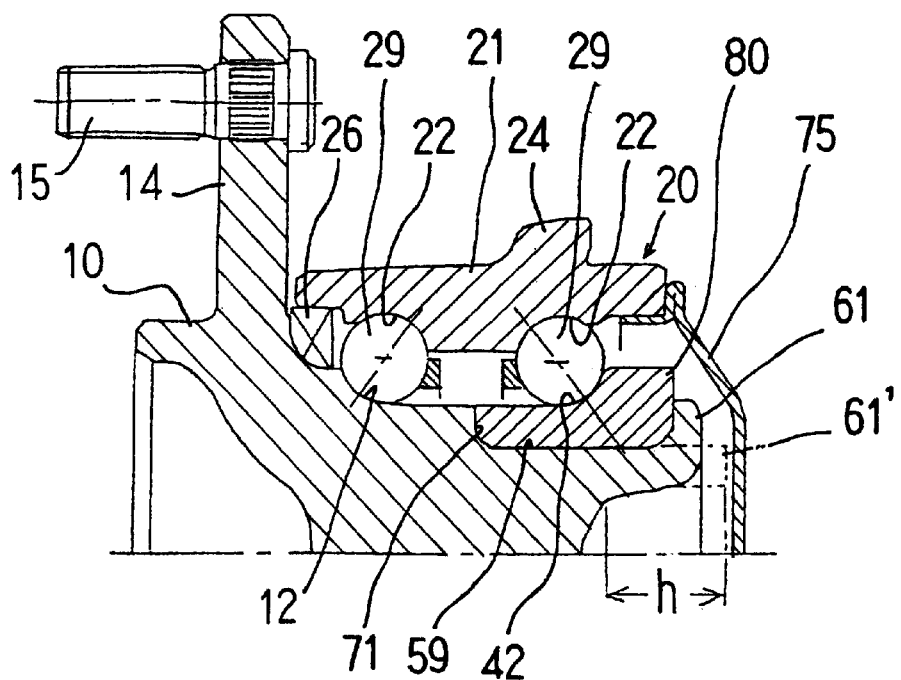
FIG. 44A is a vertical cross sectional view of a bearing apparatus for a driving wheel and FIG. 44B is a vertical cross sectional view of a bearing apparatus for a driven wheel.
Figure 44A:
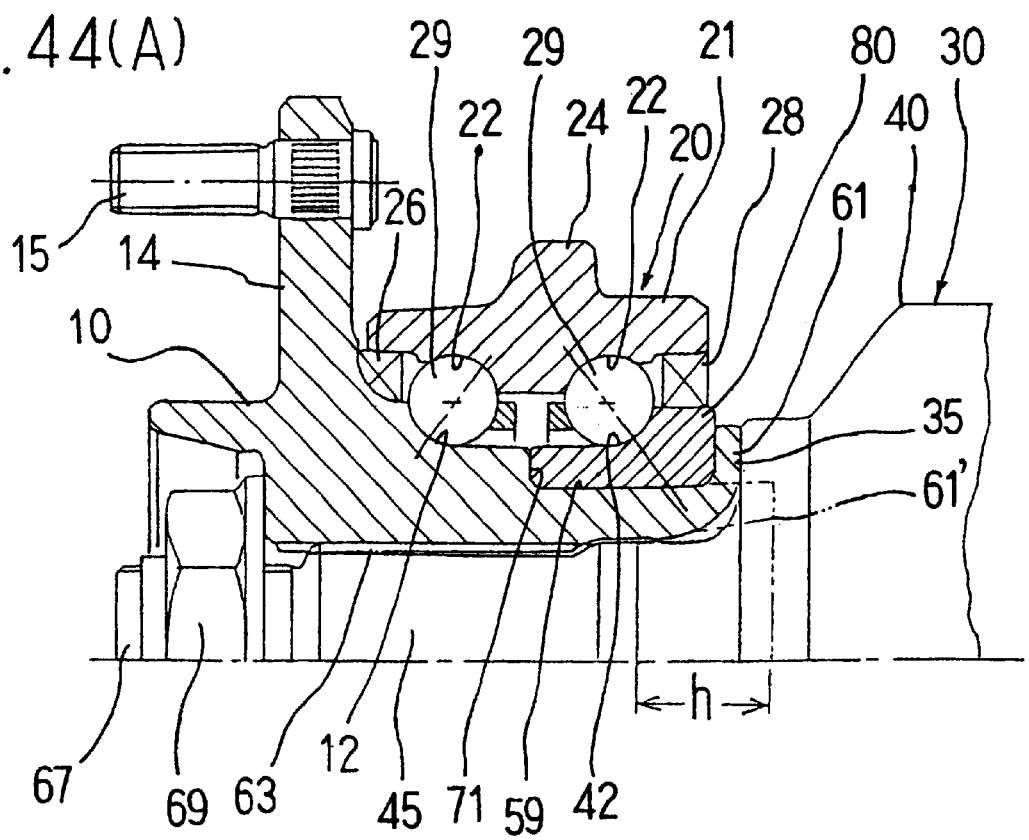

In this case, in the bearing apparatus shown in FIG. 44B, there is exemplified a case that a thin cylinder portion 61' for caulking is formed by providing a recess portion having a depth h in the solid hub 10, however, it is possible to make the hub 10 itself hollow even in the case of the apparatus for the driven wheel. Further, in the case of the apparatus for the driving wheel, the bearing 20 and the constant velocity universal joint 30 are united by inserting the stem portion 45 of the outer joint member 40 of the constant velocity universal joint 30 to the serration hole 63 of the hub 10 as shown in FIG. 44A so as to serration fit and fastening a nut 69 to a male screw portion 67 formed in the front end portion.

The shoulder surface 35 of the outer joint member 40 is brought into contact with the caulked end portion 61, however, this structure has the following problem. That is, the end portion 61 is not hardened so as to enable to be caulked, on the contrary, a surface hardening treatment is generally applied to the shoulder surface 35 of the outer joint member 40. Accordingly, since a fretting friction is easily generated by bringing members having different hardness into contact with each other, a clamping force of the constant velocity universal joint is reduced and a play is generated in the serration fitted portion.

Figure 42:
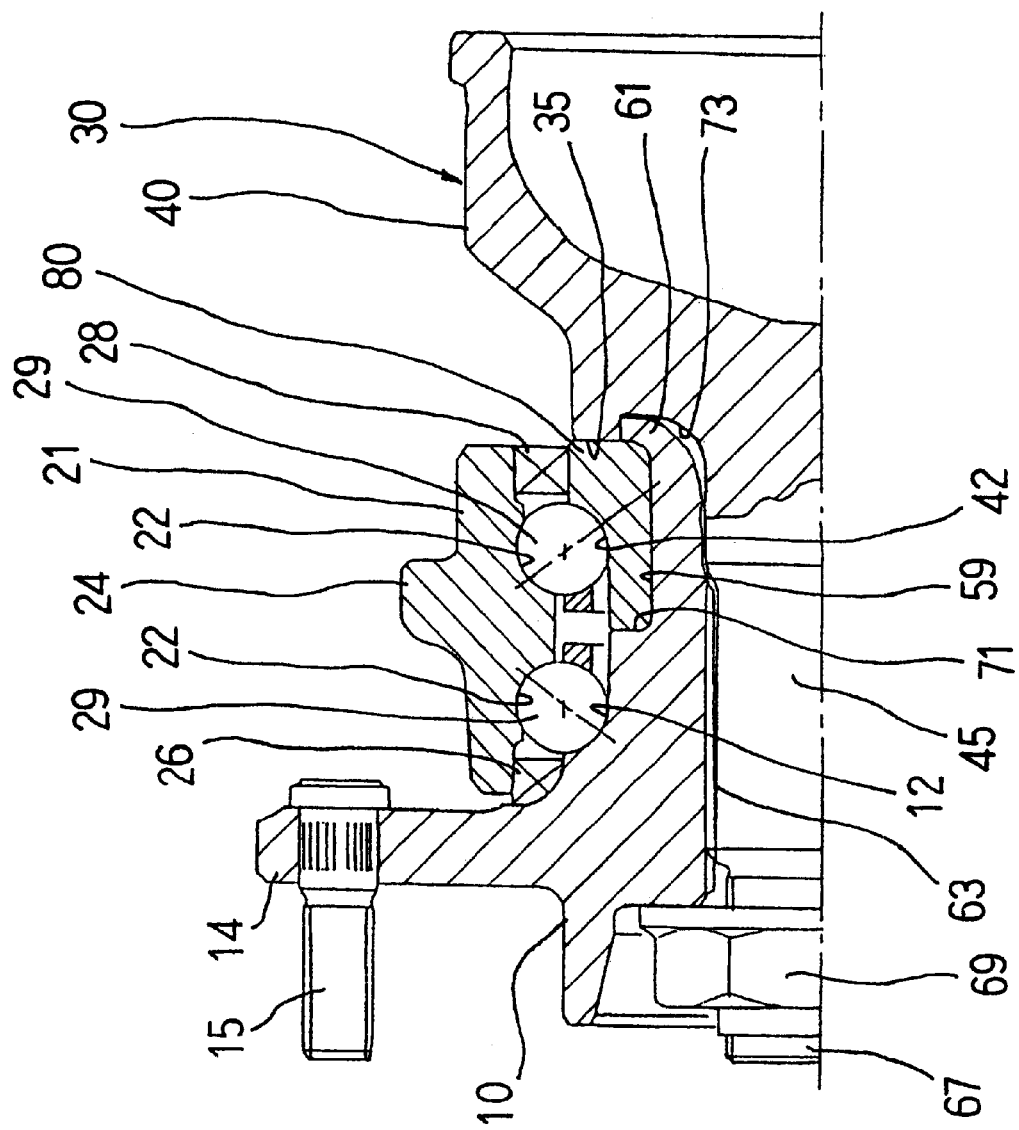
FIG. 42 is a vertical cross sectional view of a bearing apparatus for a driving wheel.
Figure 43:
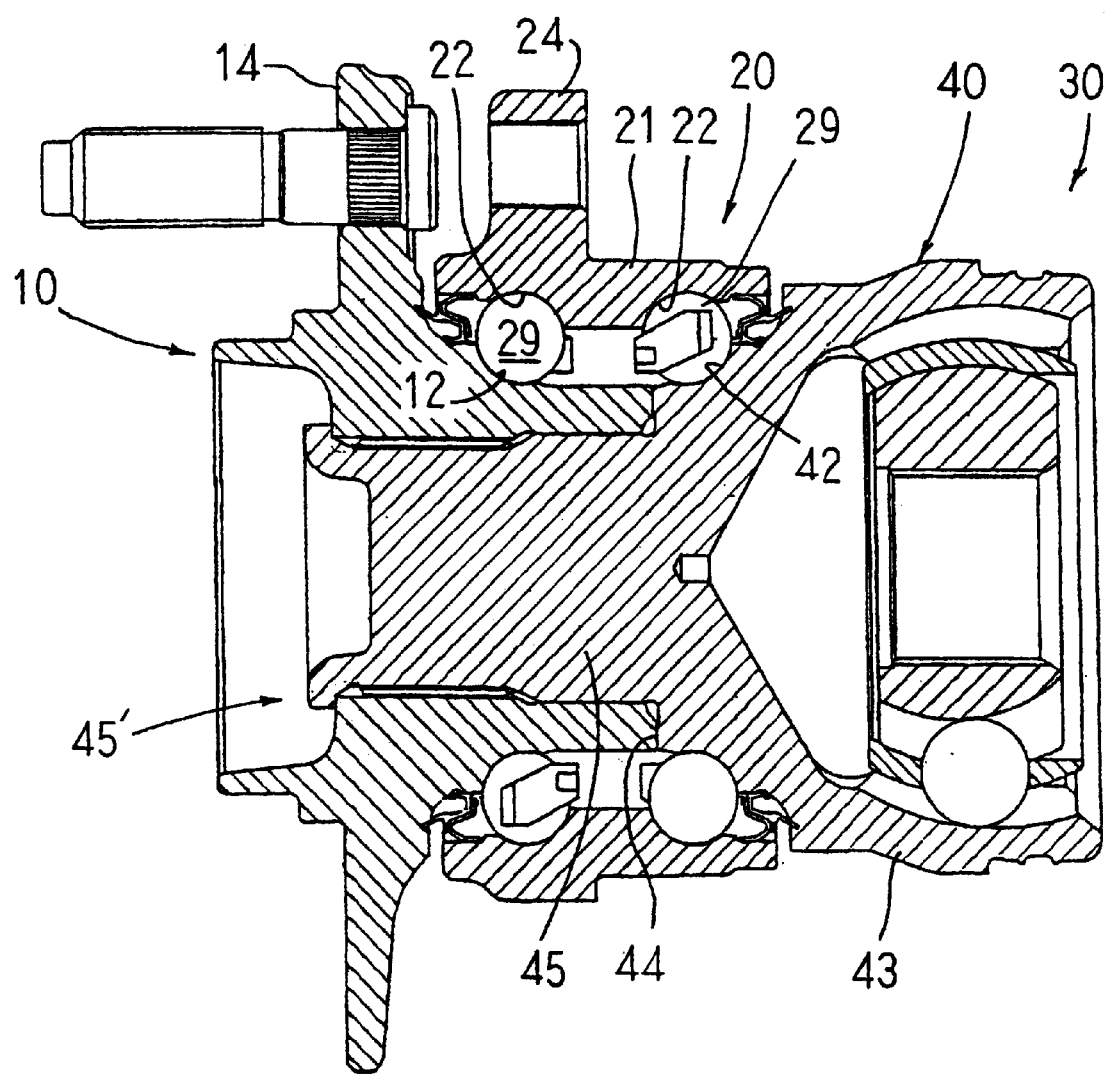
FIG. 43 is a vertical cross sectional view of a bearing apparatus for a driving wheel.

In order to solve the problem mentioned above, it is preferable that the inner race 80 is held between the shoulder surface 35 and the shoulder surface 71 of the small diameter step portion 59 of the hub 10 as shown in FIG. 42 so as to fix in an axial direction the shoulder surface 35 of the outer joint member 40 extends perpendicular to the axis, however, an annular recess portion 73 is provided in the inner diameter side of the shoulder surface 35 and the caulked end portion 61 of the hub 10 is received within the annular recess portion 73. Since the shoulder surface 35 of the outer joint member 40 is brought into contact with the end surface of the inner race 80 having a hardness about HRC 58 to 64 not with the end portion 61 of the hub 10, a clamping force of the constant velocity universal joint 30 can be maintained.

The seals 26 and 28 are attached to the opening portions at both ends of the bearing apparatus for the wheel, thereby preventing the grease charged therewithin from leaking and the water and foreign matters from entering from the outside. In this case, in the case of the apparatus for the driven wheel, the opening end portion in the inboard side is closed by attaching an end cap 75 in place of the seal 28.

Next, a description will be given of a structure for preventing the hub 10 and the inner race 80 from relatively rotating in view of a creep countermeasure.

An embodiment shown in FIG. 36 is structured such that recess grooves 76a, 76b are formed on an inner peripheral surface of the inner race 80. In the drawings, there is exemplified a case that the recess grooves 76a, 76b are provided all the periphery of the inner peripheral surface of the inner race 80 so as to form a serration hole. The structure can be made such that a convex portion between the recess grooves 76a is protruded from the inner diameter surface of the inner race 80 as shown in FIGS. 36A and 36B, or the recess groove 76b is recessed from the inner diameter surface of the inner race 80 as shown in FIGS. 36C and 36D. In any cases, the structure is made such as to prevent both elements from relatively rotating by eating the end portion of the hub 10 into the recess grooves 76a, 76b of the inner race 80 by means of a rolling caulking or the like and caulking the end portion 61 of the hub 10 so as to fix the inner race 80.

Embodiments shown in FIGS. 37 and 38 are structured such that recess portions 78, 78' having peripheral walls 77, 77' in which a distance from an axial core of the inner race 80 is not uniform in a circumferential direction are provided on the end surface of the inner race 80, and the end portion 61 of the hub 10 is caulked along the recess portions 78, 78', thereby preventing the hub 10 and the inner race 80 from relatively rotating so as to achieve a countermeasure of the creep of the inner race 80.

Figure 37A:
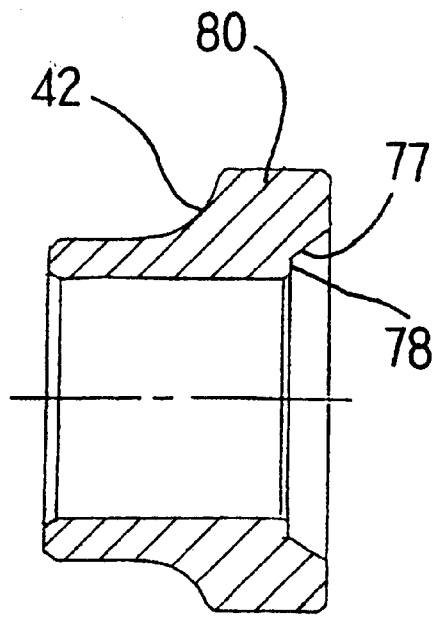
FIG. 37A is a vertical cross sectional view of an inner race.
Figure 37B:
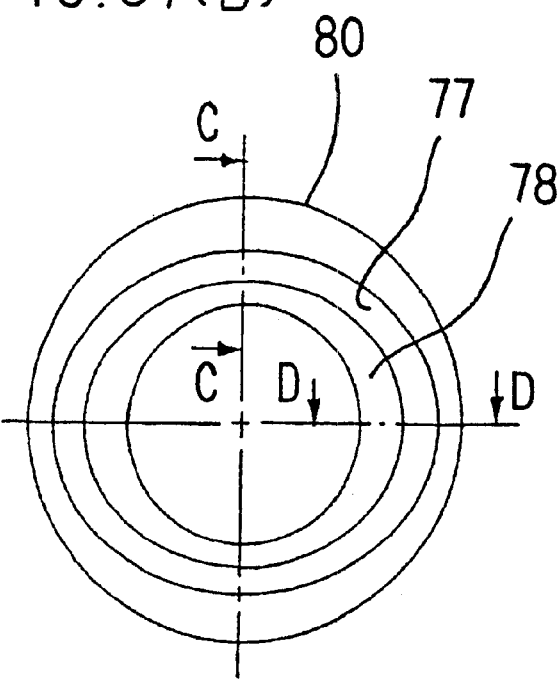
FIG. 37B is a side elevational view of the inner race.
Figure 37C:
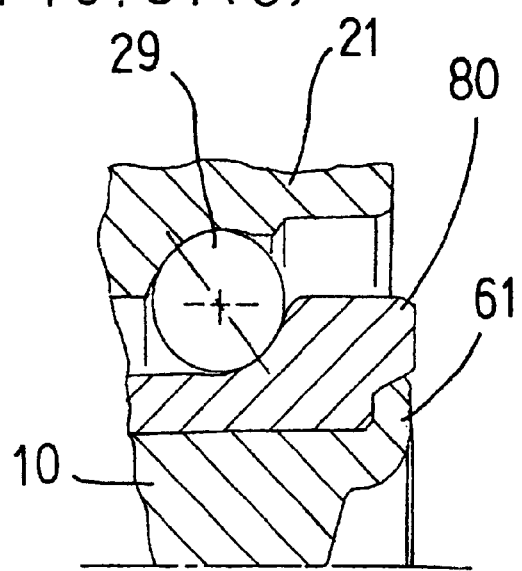
FIG. 37C is a partly vertical cross sectional view of a bearing apparatus for a wheel taken along a line C—C in FIG. 37B
Figure 37D:
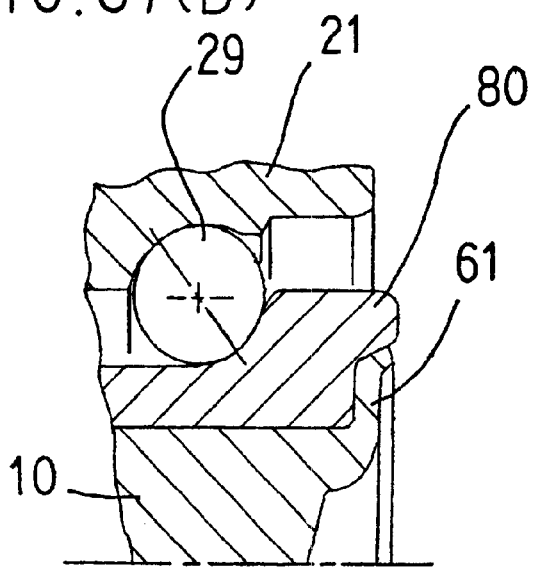
FIG. 37D is a partly vertical cross sectional view of a bearing apparatus for a wheel taken along a line D—D in FIG. 37B.
Figure 38A:
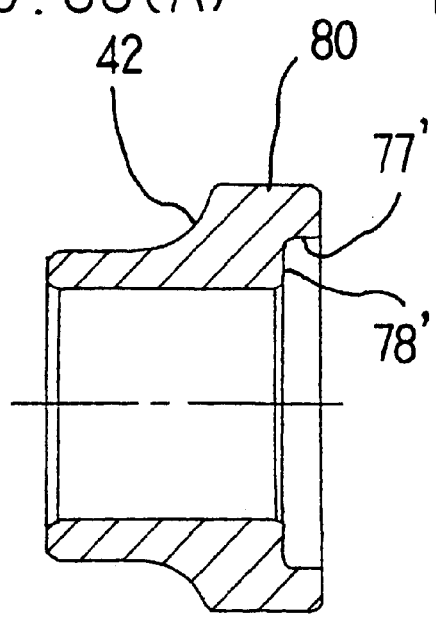
FIG. 38A is a vertical cross sectional view of an inner race.
Figure 38B:
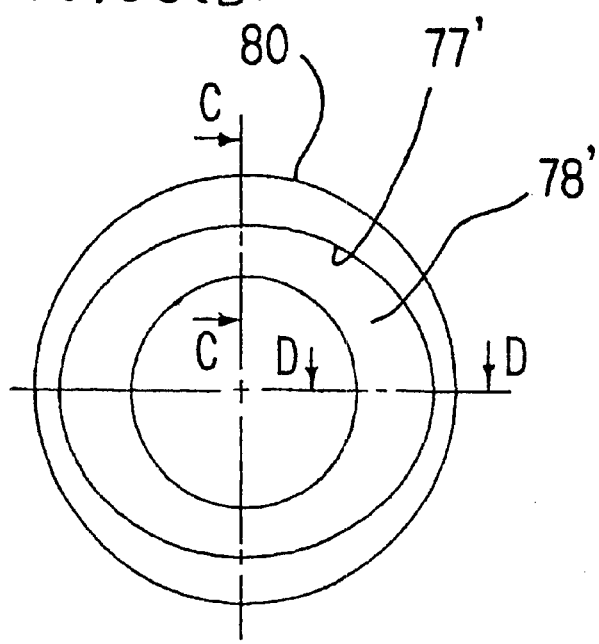
FIG. 38B is a side elevational view of the inner race.
Figure 38C:
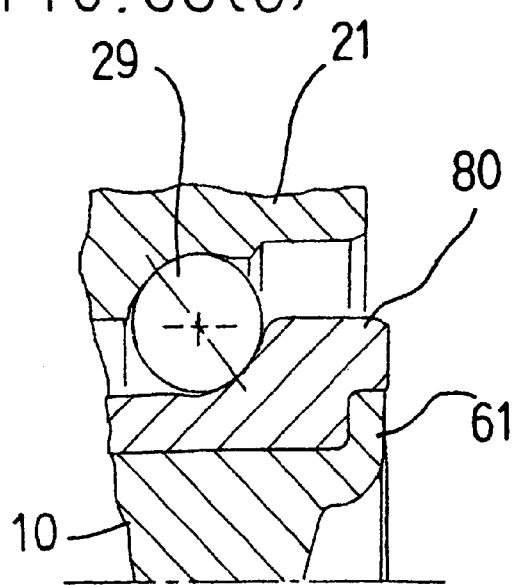
FIG. 38C is a partly vertical cross sectional view of a bearing apparatus for a wheel taken along a line C—C in FIG. 38B
Figure 38D:
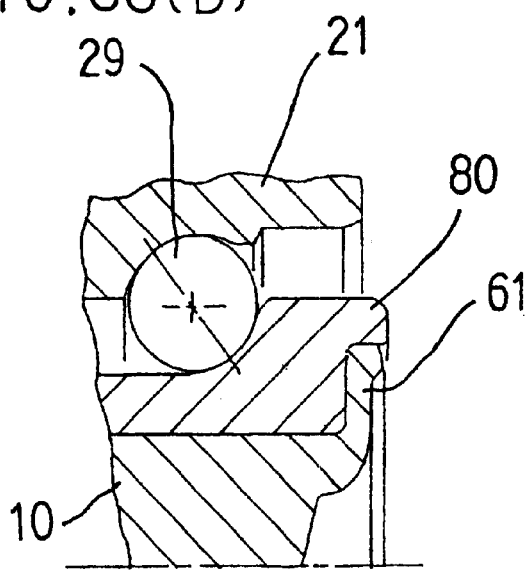
FIG. 38D is a partly vertical cross sectional view of a bearing apparatus for a wheel taken along a line D—D in FIG. 38B.

In particular, the recess portion 78 shown in FIG. 37A is structured such that the peripheral wall 77 is inclined with respect to the axis and is formed in an oval shape as is known from FIG. 37B. Accordingly, as shown in FIGS. 37C and 37D, a width of the caulked end portion 61 is not uniform in a circumferential direction. The recess portion 78' shown in FIG. 38A is structured such that the peripheral wall 77' is parallel to the axis and is formed in an oval shape as is known from FIG. 38B. Accordingly, as shown in FIGS. 38C and 38D, a width of the caulked end portion 61 is not uniform in a circumferential direction.

As mentioned above, since a desired effect can be obtained when the distance between the peripheral walls 77, 77' and the axial core of the inner race 80 is not uniform in a circumferential direction, the contour of the recess portions 78, 78' is not limited to the oval shape as illustrated, and can be formed in an optional shape such as an irregular shape other than the complete round, a polygonal shape or the like. Further, even in the complete round, since the distance of the peripheral wall from the axial core of the inner race 80 is not uniform in a circumferential direction by making eccentric with respect to the axial core of the inner race 80, it is possible to employ the structure.

Figure 39A:
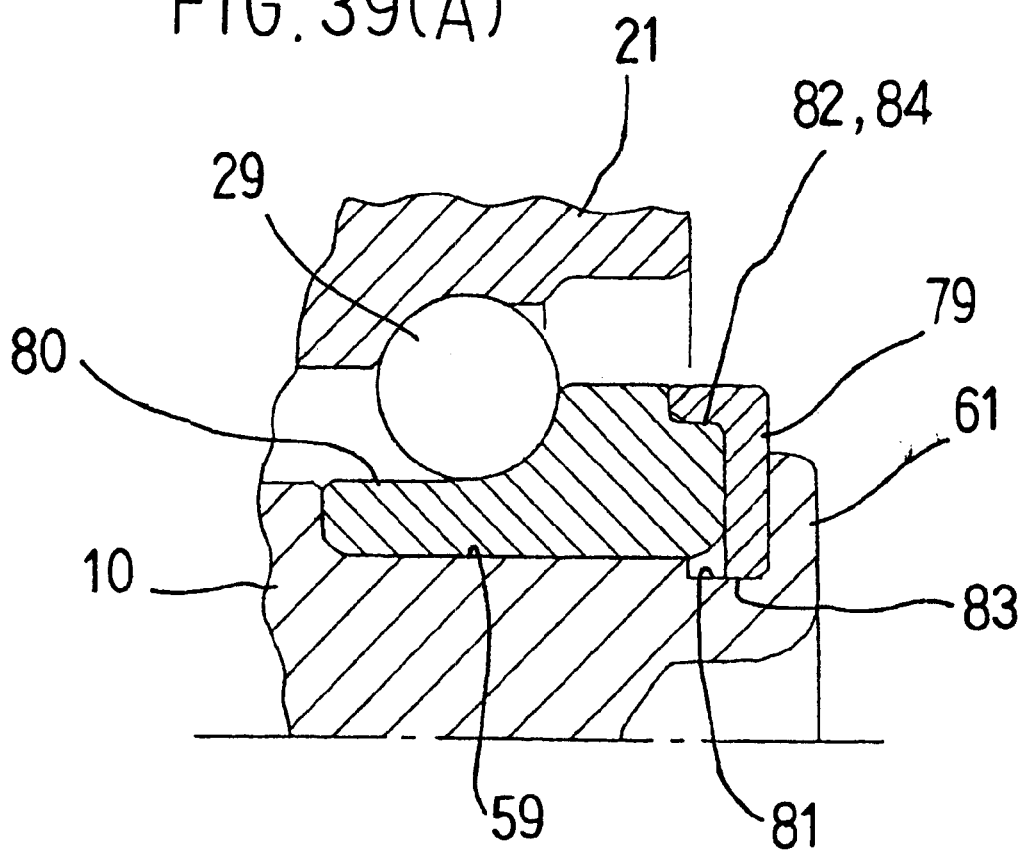
FIG. 39A is a vertical cross sectional view of a bearing apparatus for a wheel.
Figures 39B, 39C:
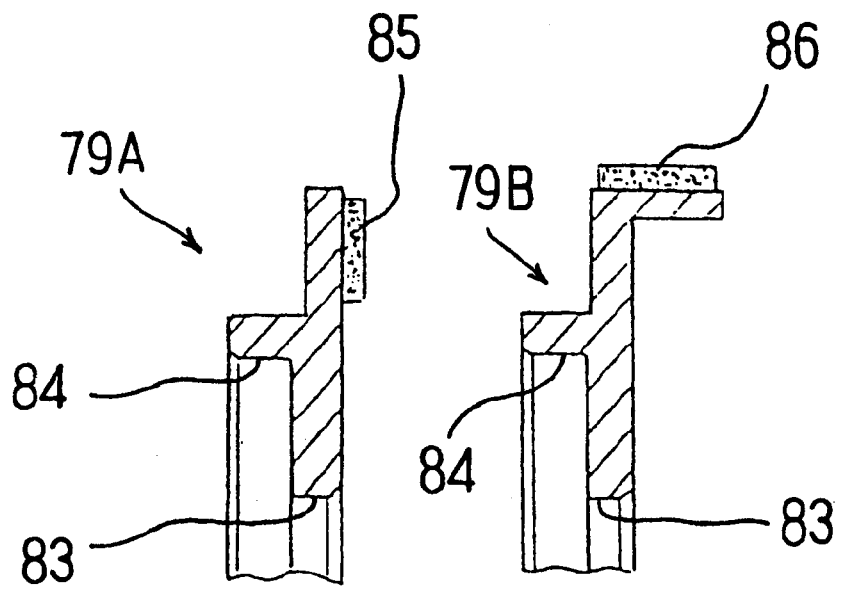
FIG. 39B is a partly cross sectional view showing a modified embodiment of a spacer and FIG. 39C is a partly cross sectional view showing another modified embodiment of the spacer.
Figure 40:
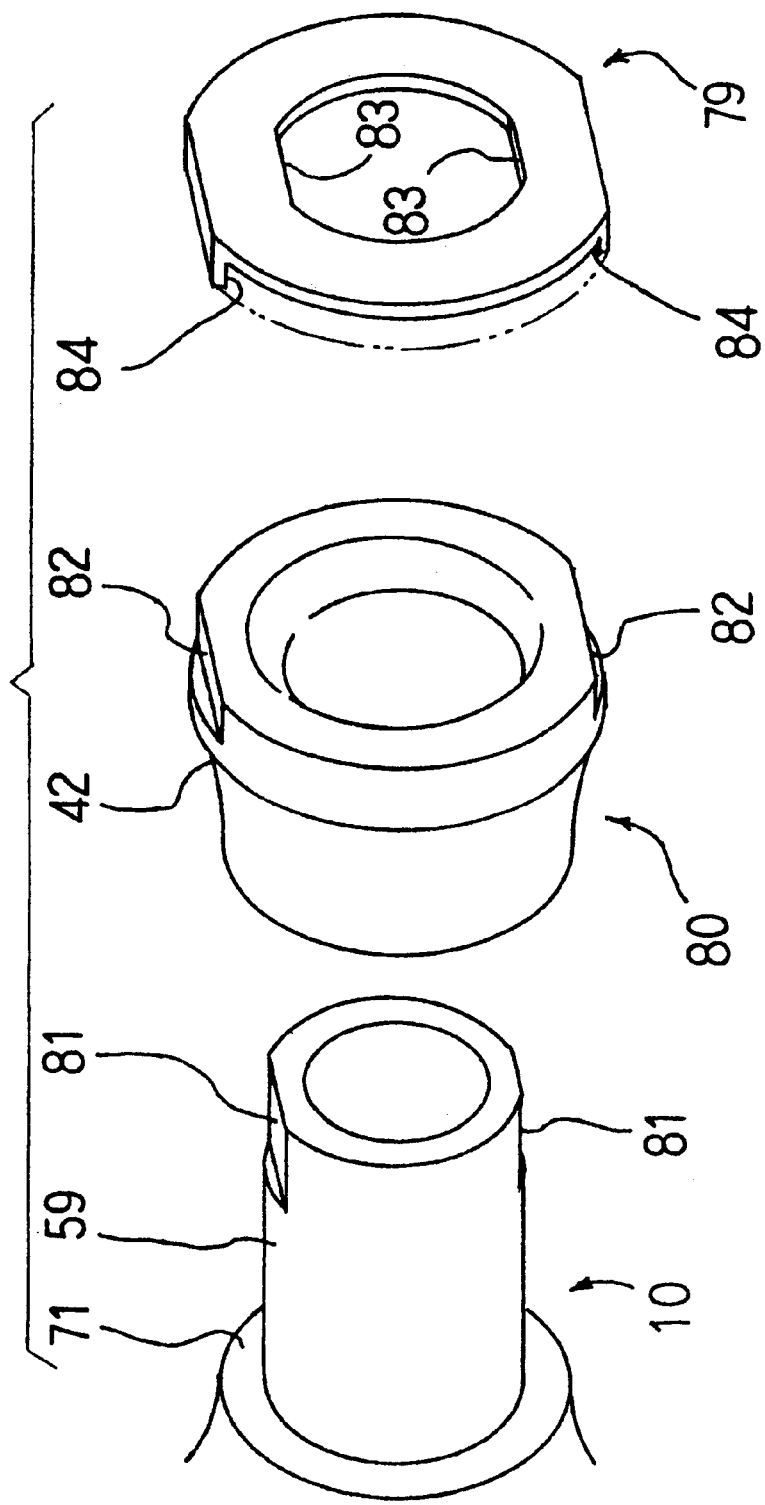
FIG. 40 is an exploded perspective view of a hub, an inner race and a spacer.

Embodiments shown in FIGS. 39 and 40 are structured such that the hub 10 and the inner race 80 are fixed by caulking the inner race 80 via an independent member, that is, a spacer 79 having two surface widths, thereby preventing the creep of the inner race 80. As shown in FIG. 40, flat surfaces 81, 82 formed by two notches are provided on the outer peripheral surface of the end portion of the small diameter step portion 59 of the hub 10 and the outer peripheral surface of the inner race 80, and flat surfaces 83, 84 are provided in an inner peripheral portion and an outer peripheral portion of the spacer 79 in correspondence thereto.

The inner race 80 is pressure fitted to the hub 10, thereafter the spacer 79 is fitted, the flat surface 83 of the inner peripheral portion is engaged with the flat surface 81 of the hub 10, and the flat surface 84 of the outer peripheral portion is engaged with the flat surface 82 of the inner race 80. Thereafter, as shown in FIG. 39A, the end portion 61 of the hub 10 is caulked and the inner race 80 is fixed via the spacer 79.

In the illustrated embodiment, there is exemplified a case that a pair of flat surfaces are arranged at positions opposing to each other in a diametrical direction, however, they can be arranged at one portion or three portions as far as the relative rotation between the hub 10 and the inner race 80 can be prevented, and further it is not necessary to always arrange in a symmetrical manner. Further, the flat surface 83 of the inner peripheral portion and the flat surface 84 of the outer peripheral portion in the spacer 79 can be arranged in a different phase in addition to the arrangement in the same phase as illustrated. As a modified embodiment of the spacer 79, it is possible to mount a rubber magnet 85 and a pulsar ring 86 such as a gear or the like as exemplified in FIGS. 39B and 39C.

An embodiment shown in FIG. 41 is structured such that a depth h of the thin cylinder portion 61' of the axial end is made shallower than a position a at which the load applying line of the rolling element 29 to the inner raceway 42 of the inner race 80 crosses to the inner diameter surface of the inner race 80. Accordingly, since the thin caulked portion is disposed at a position shunting from the load application line, it is useful for maintaining a desired rigidity and preventing a creep of the inner race 80.

FIG. 41A shows a case of the apparatus for the driven wheel, the structure is made such that a recess portion having a depth h is provided in the end portion of the solid hub 10 as shown by a two-dot chain line so as to form the thin cylinder portion 61' and the thin cylinder portion 61' is caulked as shown by a solid line. FIG. 41B shows a case of the apparatus for the driving wheel, the structure is made such that the thin cylinder portion 61' having a depth h from the end surface is provided in the end portion of the hub 10 as shown by a two-dot chain line and the thin cylinder portion 61' is caulked as shown by a solid line. An angle formed between the load application line and the rolling element center line, that is, a contact angle $\alpha$ is, for example, about 30° to 40°.

What is claimed is:

1. A bearing apparatus for a wheel comprising:
   a hub, a constant velocity universal joint and a bearing, these elements being united; and
   at least one of double rows of inner raceways of the bearing being integrally formed with an outer joint member of the constant velocity universal joint,
   wherein the hub and the outer joint member are fitted to each other, and the fitted portion is at least partly expanded or contracted by caulking,
   wherein an uneven portion is formed in any one or both of the fitted surface of the hub and the fitted surface of the outer joint member, and
   wherein a hardening treatment due to a heat treatment is applied to said uneven portion.

2. A bearing apparatus for a wheel according to claim 1, wherein an end portion in an axial direction of said fitted portion is welded.

3. A bearing apparatus for a wheel according to claim 1, wherein a taper angle is provided between the fitted surface of the hub and the fitted surface of the outer joint member.

4. A bearing apparatus for a wheel according to claim 1, wherein a cross sectional shape of the fitted surfaces of the hub and the outer joint member fitted to each other is formed in a polygonal shape or a serration shape.

5. A bearing apparatus for a wheel according to claim 1, wherein a cross sectional shape of the fitted surfaces of the hub and the outer joint member fitted to each other at an axial position which is different from the fitted portion to be expanded or contracted is set to a polygonal shape or a serration shape.

6. A bearing apparatus for a wheel according to claim 1, wherein a stem portion of the outer joint member in which at least an axial end portion is formed in a hollow cylindrical shape is fitted to a through hole of the hub.

7. A bearing apparatus for a wheel according to claim 6, wherein a clip is attached to an end portion of the stem portion protruding from the hub.

8. A bearing apparatus for a wheel according to claim 6, wherein the axial end portion of the stem portion in the outer joint member is caulked to the end surface of the hub.

9. A bearing apparatus for a wheel according to claim 6, wherein a reinforcing member is pressure fitted into the hollow portion of the stem portion.

10. A bearing apparatus for a wheel according to claim 6, wherein a through hole communicating with the bottom of a mouth portion is provided in the stem portion of the outer joint member.

11. A bearing apparatus for a wheel according to claim 10, wherein a cooling fin member is attached within the stem portion.

12. A bearing apparatus for a wheel according to claim 11, wherein an area closer to the axial end side than a serration portion of the stem portion in the outer joint member is expanded by caulking.

13. A bearing apparatus for a wheel according to claim 12, wherein the caulked portion is partly extended to the serration portion.

14. A bearing apparatus for a wheel according to claim 12, wherein the serration portion of the stem portion is expanded by caulking.

15. A bearing apparatus for a wheel according to claim 12, wherein a portion changing to the caulked portion from the serration portion of the stem portion is gradually expanded.

16. A bearing apparatus for a wheel according to claim 12, wherein an annular groove is provided on an inner peripheral surface of the hub and a swelled portion of the stem portion in the outer joint member is eaten into said annular groove.

17. A bearing apparatus for a wheel according to claim 12, wherein a spacer ring is interposed between the fitted surfaces of the stem portion and the hub.

18. A bearing apparatus for a wheel according to claim 17, wherein an unevenness formation is applied on an outer peripheral surface of the stem portion, an inner peripheral surface of the spacer ring or both of these surfaces.

19. A bearing apparatus for a wheel according to claim 17, wherein an unevenness formation is applied to an outer peripheral surface of the spacer ring, an inner peripheral surface of the hub or both of these surfaces.

20. A bearing apparatus for a wheel comprising a hub, a constant velocity universal joint and a bearing, these elements being united; and at least one of double rows of inner raceways of the bearing being integrally formed with an outer joint member of the constant velocity universal joint, wherein the hub and the outer joint member are fitted to each other, and the fitted portion is at least partly expanded or contracted by caulking, and wherein a projection is provided on the fitted portion of the hub or the fitted surface of the outer joint member.

21. A bearing apparatus for a wheel comprising a hub, a constant velocity universal joint and a bearing, these elements being united; and at least one of double rows of inner raceways of the bearing being integrally formed with an outer joint member of the constant velocity universal joint, wherein the hub and the outer joint member are fitted to each other, and the fitted portion is at least partly expanded or contracted by caulking, and wherein a small diameter cylinder portion of the hub is fitted to a through hole of the outer joint member.

22. A method of manufacturing a bearing apparatus for a wheel comprising a hub, a constant velocity universal joint and a bearing, these elements being united; and at least one of double rows of inner raceways of the bearing being integrally formed with an outer joint member of the constant velocity universal joint, fitting a cylinder portion of the hub to a hollow portion of the outer joint member; and thereafter expanding a fitted portion of the hub by caulking.

23. A method of manufacturing a bearing apparatus for a wheel comprising a hub, a constant velocity universal joint and a bearing, these elements being united; and at least one of double rows of inner raceways of the bearing being integrally formed with an outer joint member of the constant velocity universal joint, fitting a stem portion of the outer joint member to a through hole of the hub; and thereafter contracting a fitted portion of the hub by caulking.

24. A method of manufacturing a bearing apparatus for a wheel comprising a hub, a constant velocity universal joint and a bearing, these elements being united; and at least one of double rows of inner raceways of the bearing being integrally formed with an outer joint member of the constant velocity universal joint, fitting a cylinder portion of the hub to a hollow portion of the outer joint member; and thereafter contracting a fitted portion of the outer joint member by caulking.

* * * * *